(12) United States Patent
Resch et al.

(10) Patent No.: US 9,767,109 B2
(45) Date of Patent: *Sep. 19, 2017

(54) SECURE DATA MIGRATION IN A DISPERSED STORAGE NETWORK

(71) Applicant: International Business Machines Corporation, Armonk, NY (US)

(72) Inventors: Jason K. Resch, Chicago, IL (US); Wesley Leggette, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,614

(22) Filed: Jul. 21, 2016

(65) Prior Publication Data
US 2016/0328177 A1    Nov. 10, 2016

Related U.S. Application Data

(63) Continuation of application No. 13/718,985, filed on Dec. 18, 2012, now Pat. No. 9,514,132.
(Continued)

(51) Int. Cl.
| | | |
|---|---|---|
| *G06F 17/00* | (2006.01) | |
| *G06F 17/30* | (2006.01) | |
| *G06F 11/08* | (2006.01) | |
| *G06F 11/10* | (2006.01) | |

(Continued)

(52) U.S. Cl.
CPC ........ *G06F 17/30106* (2013.01); *G06F 3/064* (2013.01); *G06F 3/067* (2013.01);
(Continued)

(58) Field of Classification Search
CPC ................. G06F 11/1096; G06F 11/08; G06F 17/30002; G06F 17/30106
(Continued)

(56) References Cited

U.S. PATENT DOCUMENTS 7,263,588 B1 *  8/2007  Moritz ................ G06F 21/6227
                                                             707/999.01
7,769,711 B2 *  8/2010  Srinivasan ............ G06F 17/302
                                                             707/609
(Continued)

*Primary Examiner* — Phong Nguyen
(74) *Attorney, Agent, or Firm* — Garlick & Markison; Patricia A. Markison

(57) ABSTRACT

A method begins by a dispersed storage (DS) processing module identifying a candidate dispersed storage (DS) unit of a dispersed storage network (DSN). In response to a data migration request, the method continues with the DS processing module receiving a migration receptiveness message from the candidate DS unit. In response to a data migration reference message, the method continues with the DS processing module receiving, from another DS unit of a set of DS units, a migration reference response that includes an indication of storage utilized by the other DS unit. The method continues with the DS processing module determining a storage utilization of the candidate DS unit based on the migration reference response and when the determined storage utilization compares favorably to the reported storage utilization, enabling transfer of data from a DS unit of another set of DS units to the candidate DS unit.

9 Claims, 54 Drawing Sheets

Related U.S. Application Data

(60) Provisional application No. 61/593,116, filed on Jan. 31, 2012.

(51) Int. Cl.
*G06F 21/60* (2013.01)
*G06F 3/06* (2006.01)
*H04L 29/08* (2006.01)

(52) U.S. Cl.
CPC .......... *G06F 3/0619* (2013.01); *G06F 3/0647* (2013.01); *G06F 3/0653* (2013.01); *G06F 11/08* (2013.01); *G06F 11/1004* (2013.01); *G06F 11/1076* (2013.01); *G06F 11/1096* (2013.01); *G06F 17/30002* (2013.01); *G06F 17/30079* (2013.01); *G06F 17/30091* (2013.01); *G06F 17/30194* (2013.01); *G06F 21/602* (2013.01); *H04L 67/1097* (2013.01); *G06F 11/1092* (2013.01)

(58) Field of Classification Search
USPC .................................................. 707/609, 741
See application file for complete search history.

(56) References Cited

U.S. PATENT DOCUMENTS

| | | | |
|---|---|---|---|
| 2004/0236798 A1* | 11/2004 | Srinivasan | G06F 17/302 707/E17.01 |
| 2007/0226331 A1* | 9/2007 | Srinivasan | G06F 17/302 709/223 |
| 2008/0222223 A1* | 9/2008 | Srinivasan | G06F 17/30067 707/E17.01 |
| 2010/0058476 A1* | 3/2010 | Isoda | G06F 21/6227 726/26 |
| 2010/0332751 A1* | 12/2010 | Quigley | H04L 69/08 711/114 |

* cited by examiner

DST allocation info 242 | data partition info 320: ⓦ data ID; No. of partitions; Addr. info for each partition; format conversion indication

| | | task execution info 322 | | | intermediate result info 324 | | |
|---|---|---|---|---|---|---|---|
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

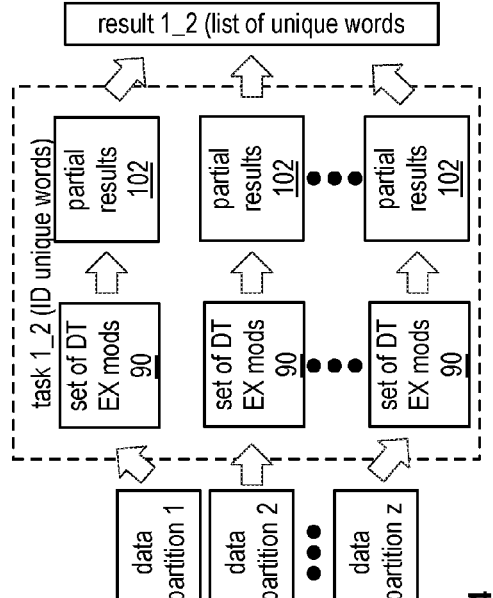
FIG. 34
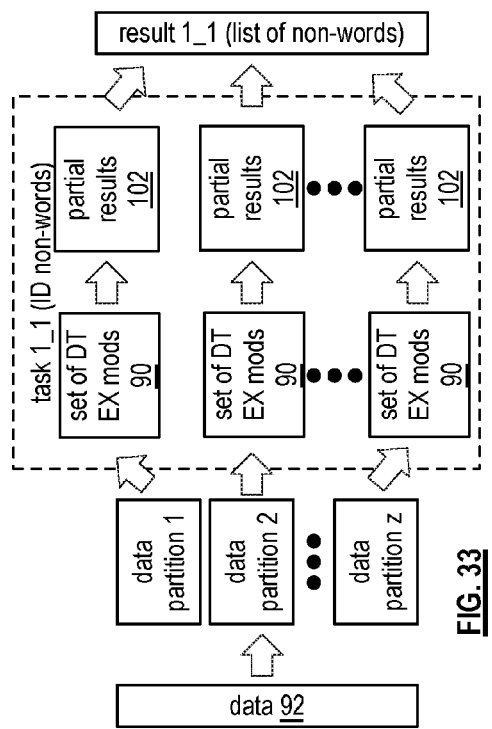
FIG. 33
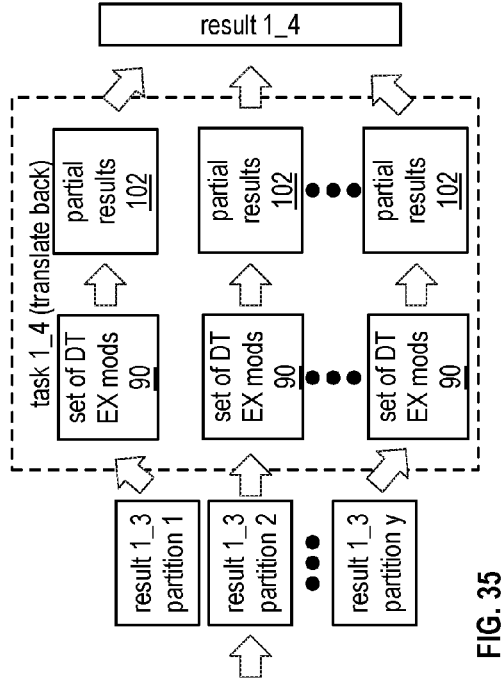
FIG. 35
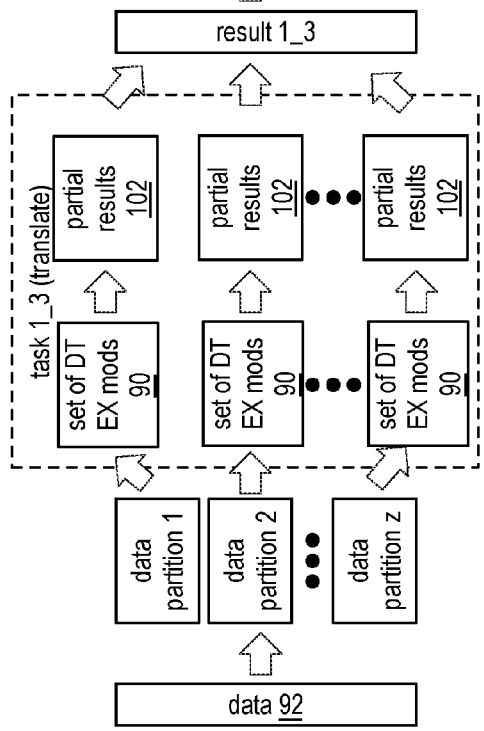

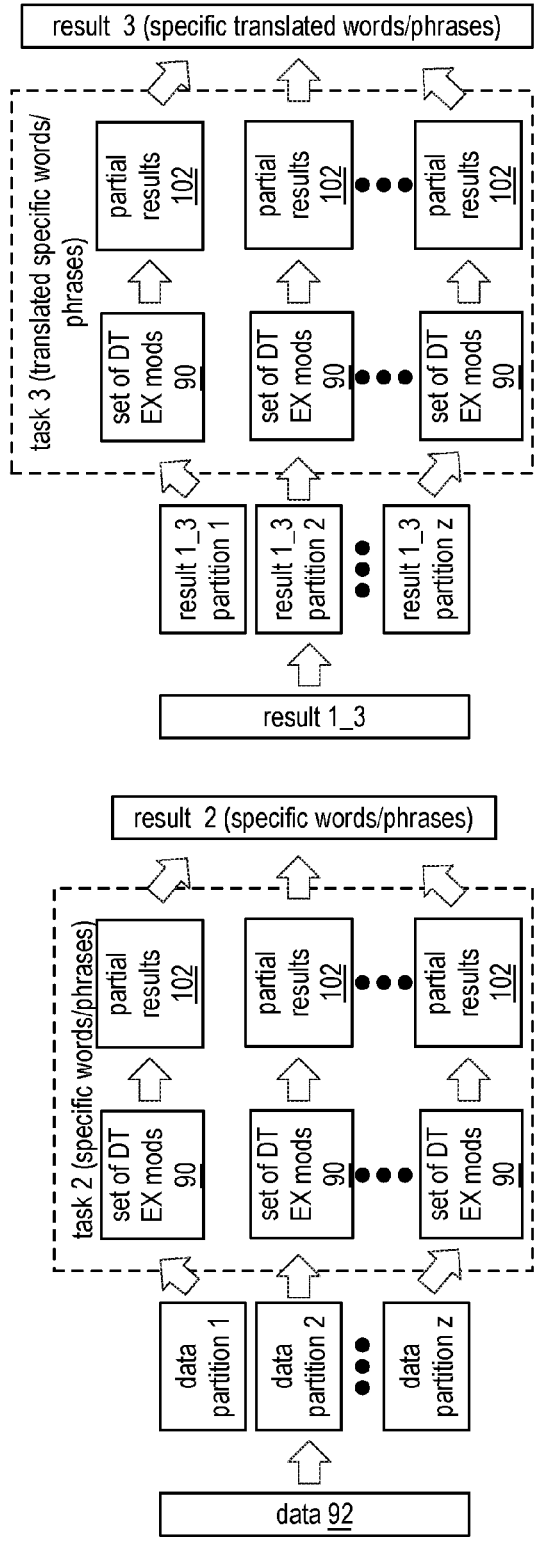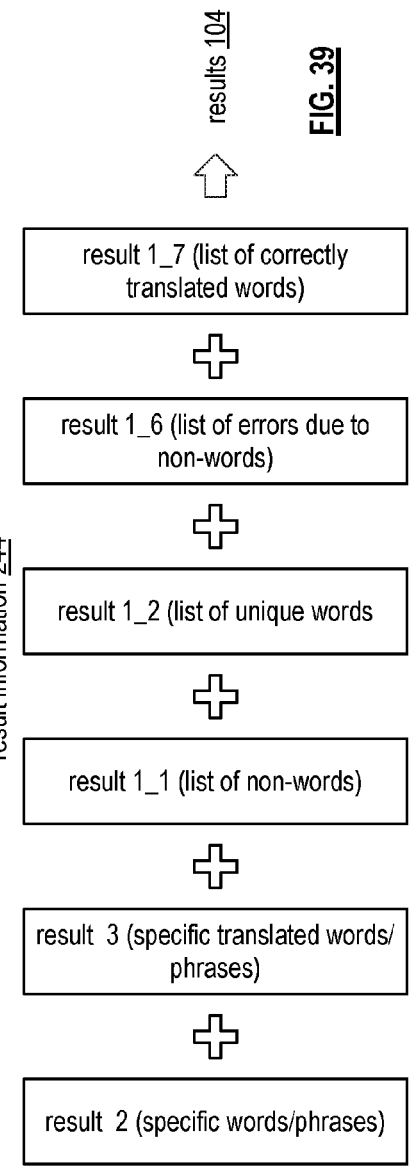

554 — establish a first level as a current level

556 — sort a list of legacy directory values in accordance with a comparing function to produce a sorted list of candidate node minimum index key values 558 — partition the sorted list to produce minimum index key values of a set of leaf nodes 560 — generate one or more index node levels based on aggregating leaf nodes of each child level in accordance with the comparing function 562 — generate node content for the one or more index node levels and the set of leaf nodes 564 — store the nodes in a DSTN

FIG. 41C

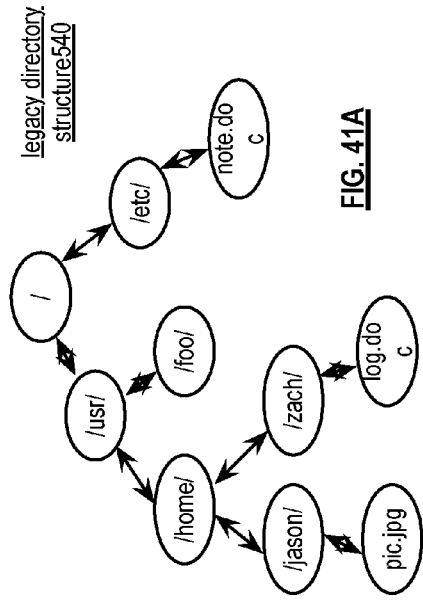

FIG. 41A legacy directory structure 540

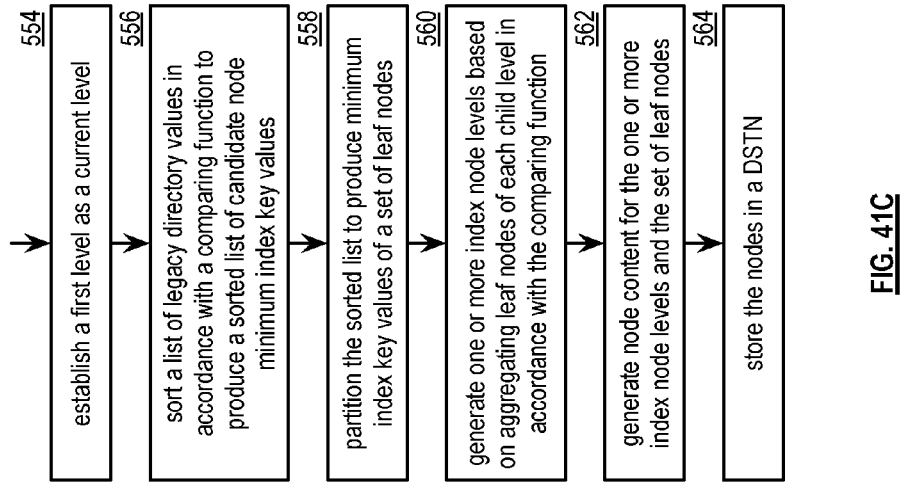

FIG. 41B index list by level 542

| level 544 | original value 546 | leaf source name 548 | index source name 550 | index source name 552 |
|---|---|---|---|---|
| 1 | / | 1BC | 1AC | 457 |
| 2 | /etc/ | | | |
| 2 | /etc/note.doc | | | |
| 2 | /usr/ | | | |
| 3 | /usr/foo/ | B63 | D43 | |
| 3 | /usr/home/ | | | |
| 4 | /usr/home/jason/ | E62 | | |
| 4 | /usr/home/jason/pic.jpg | | | |
| 4 | /usr/home/zach/ | E76 | | |
| 4 | /usr/home/zach/log.doc | | | |

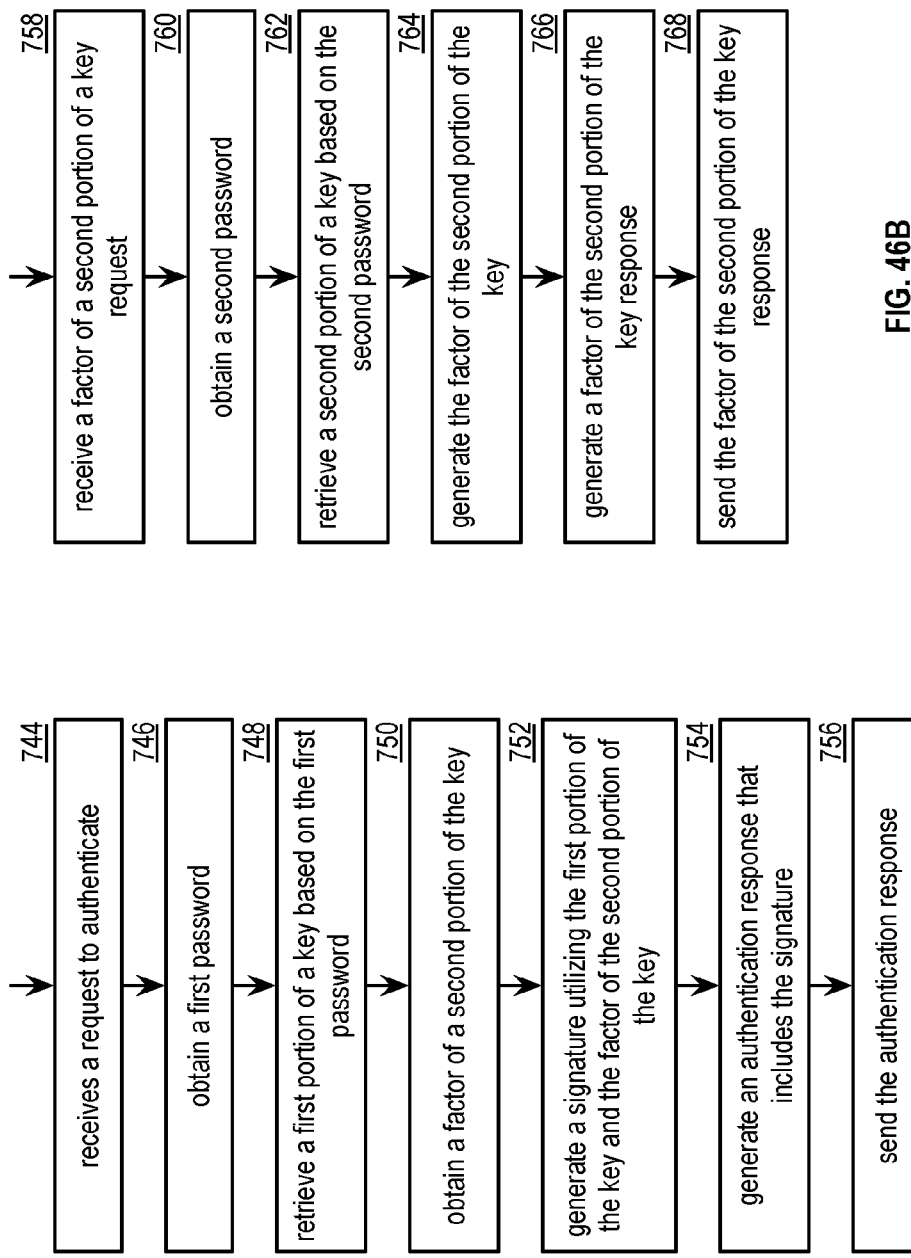

SECURE DATA MIGRATION IN A DISPERSED STORAGE NETWORK

CROSS REFERENCE TO RELATED PATENTS

The present U.S. Utility patent application claims priority pursuant to 35 U.S.C. §120 as a continuation of U.S. Utility application Ser. No. 13/718,985, entitled "SECURE DATA MIGRATION IN A DISPERSED STORAGE NETWORK", filed Dec. 18, 2012, which claims priority pursuant to 35 U.S.C. §119(e) to U.S. Provisional Application No. 61/593,116, entitled "INDEXING IN A DISTRIBUTED STORAGE AND TASK NETWORK", filed Jan. 31, 2012, both of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 41A is a diagram illustrating an example of a legacy directory structure in accordance with the present invention;

FIG. 41B illustrates an example of an index list by level in accordance with the present invention;

FIG. 41C is a flowchart illustrating an example of generating an index structure in accordance with the present invention;

FIG. 46A is a flowchart illustrating an example of generating an authentication response in accordance with the present invention; and FIG. 46B is a flowchart illustrating an example of generating key information in accordance with the present invention.

DETAILED DESCRIPTION OF THE INVENTION

Figure 1:
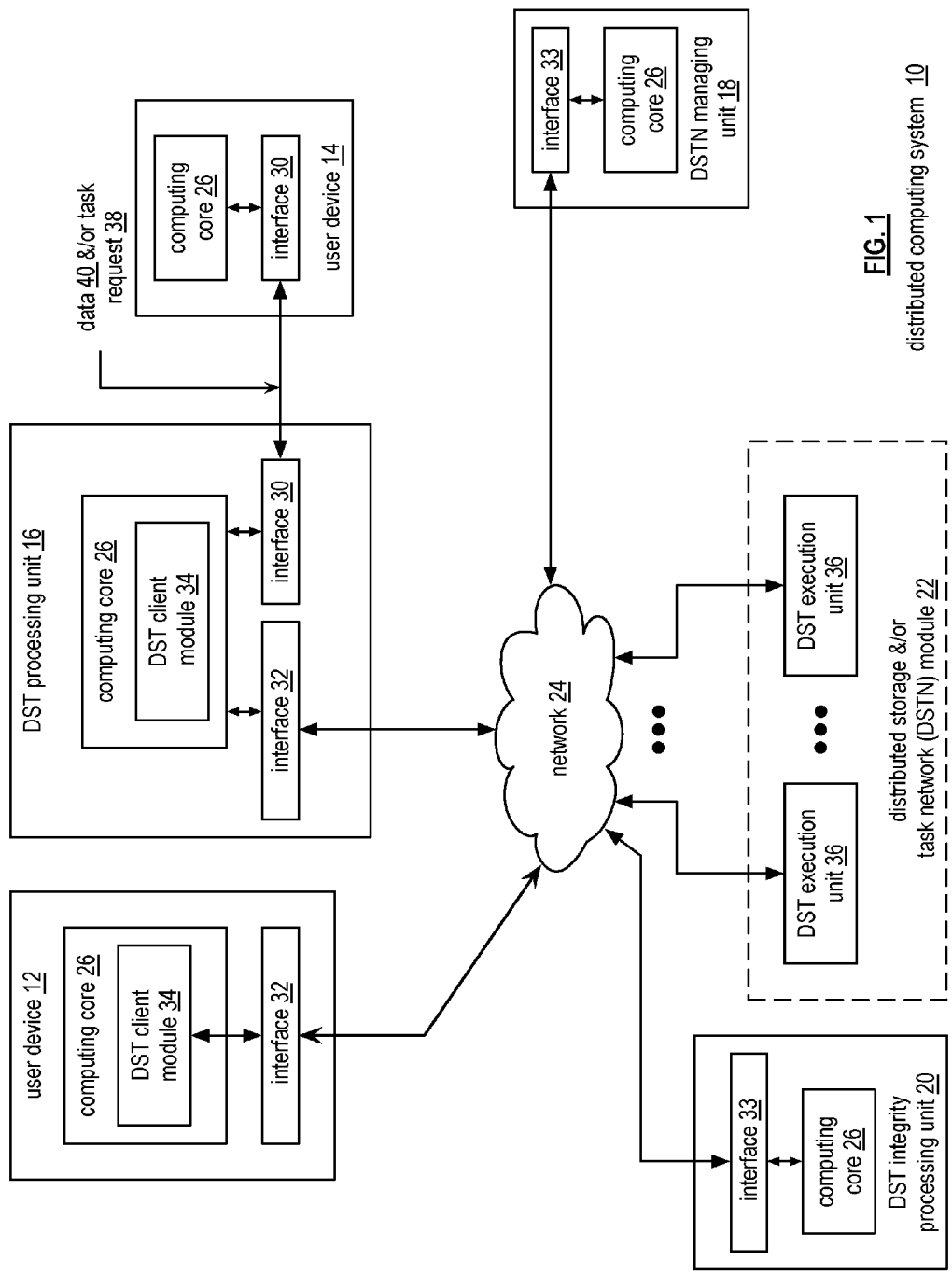
FIG. 1 is a schematic block diagram of an embodiment of a distributed computing system in accordance with the present invention.

FIG. 1 is a schematic block diagram of an embodiment of a distributed computing system 10 that includes user devices 12 and/or user devices 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
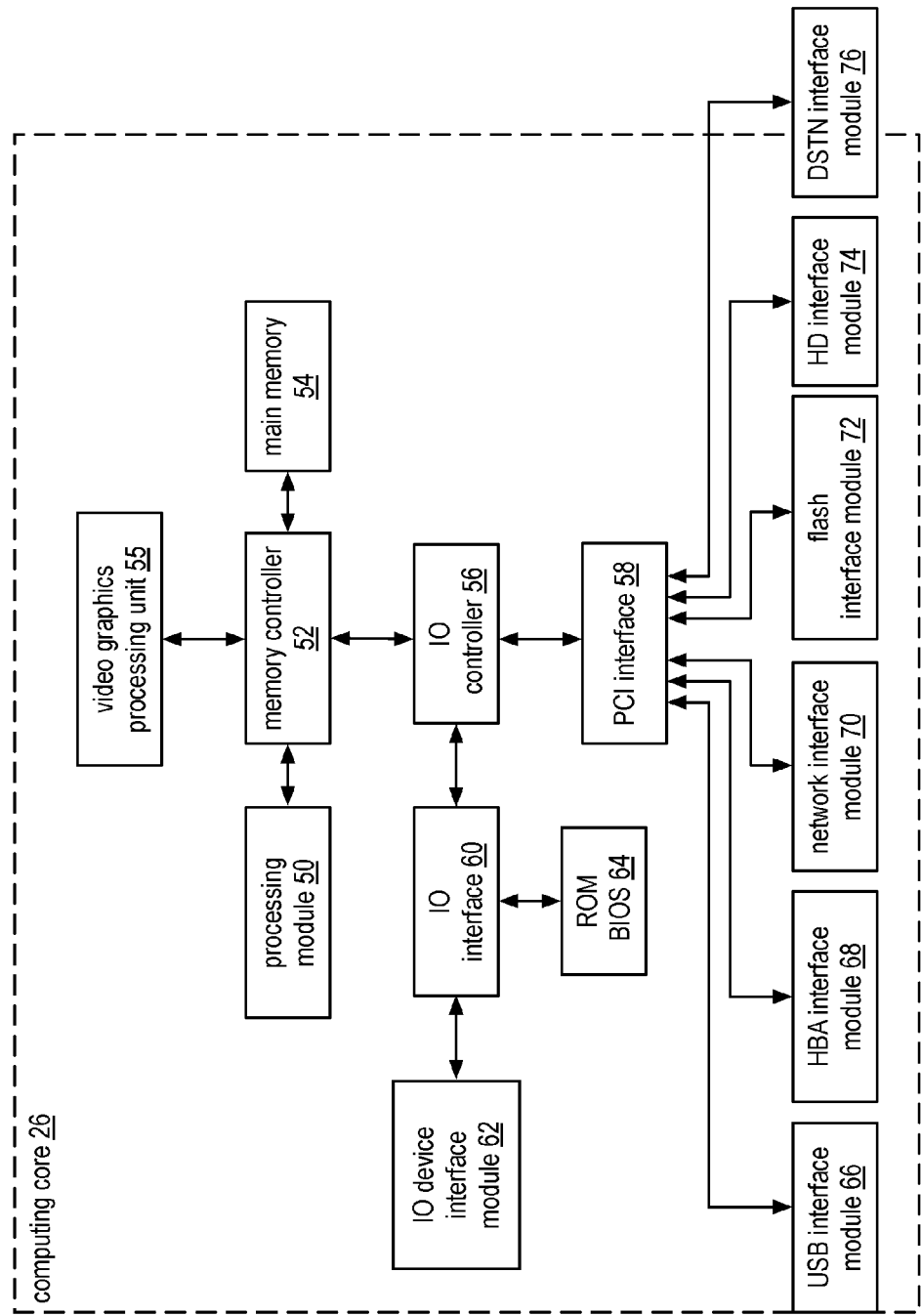
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
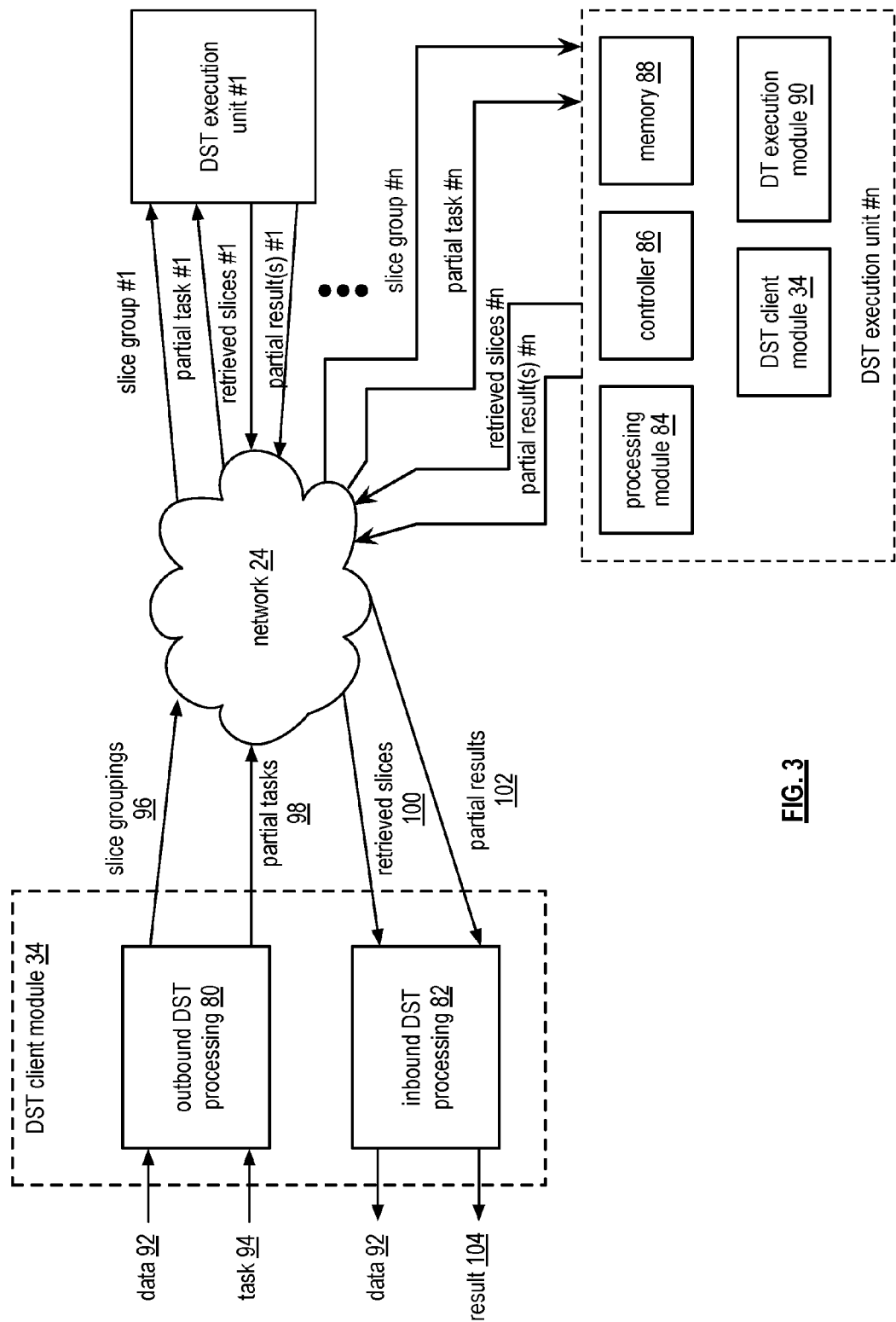
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit 36 performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count.

In this more specific example, the partial result #1 includes information as to where the phrase was found and includes the phrase count.

Upon completion of generating their respective partial results 102, the DST execution units 36 send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
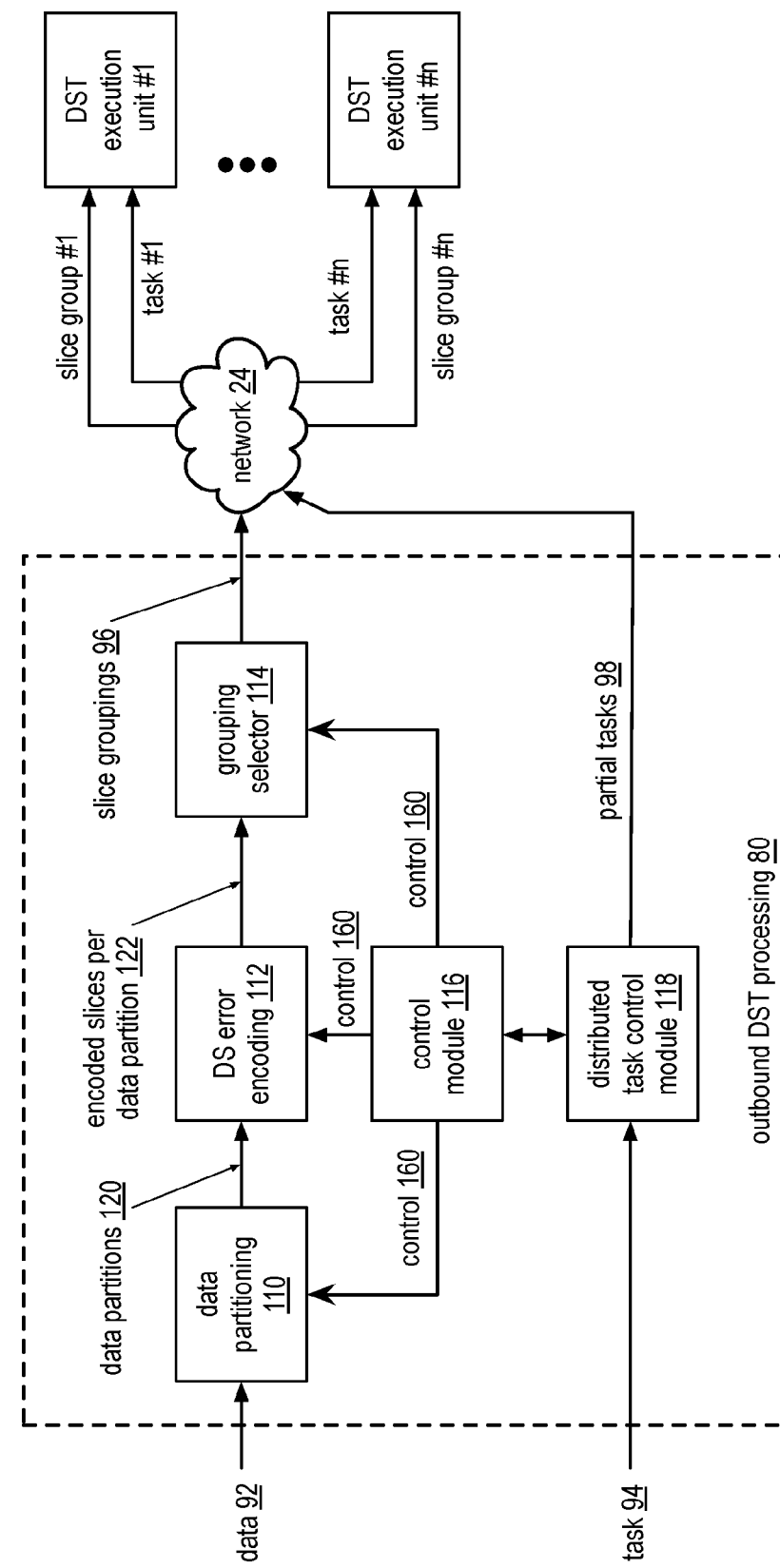
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, wherein in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
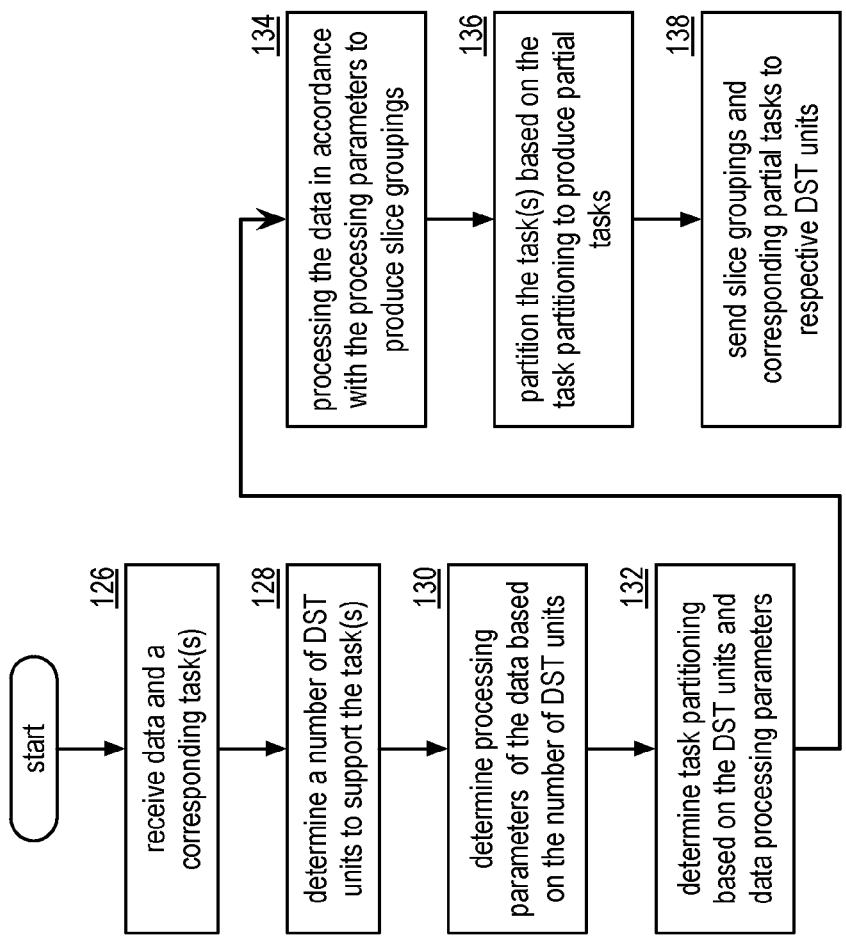
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if, the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to the selected DST units.

Figure 6:
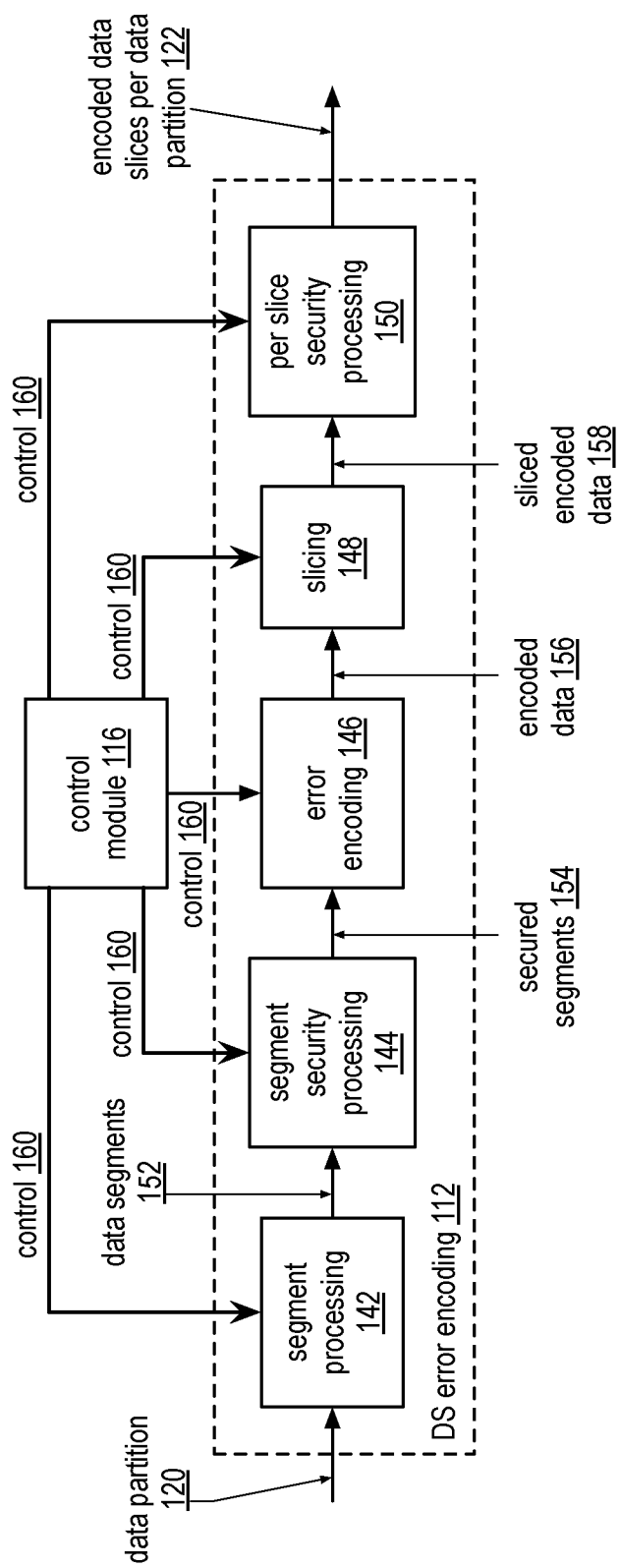
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check CRC), etc., and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC), etc., and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
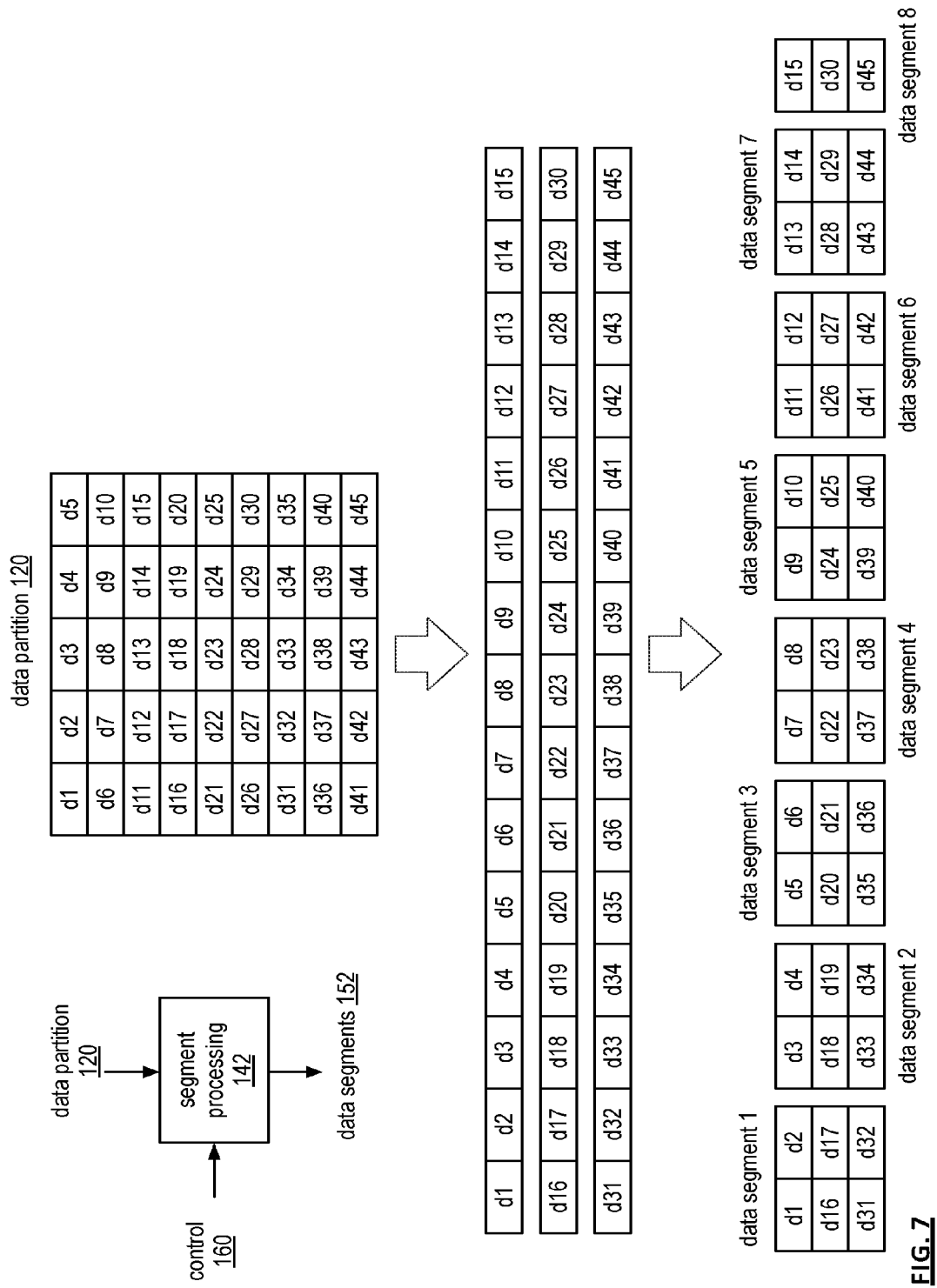
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45) and receives segmenting information (i.e., control information 160) from a control module. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
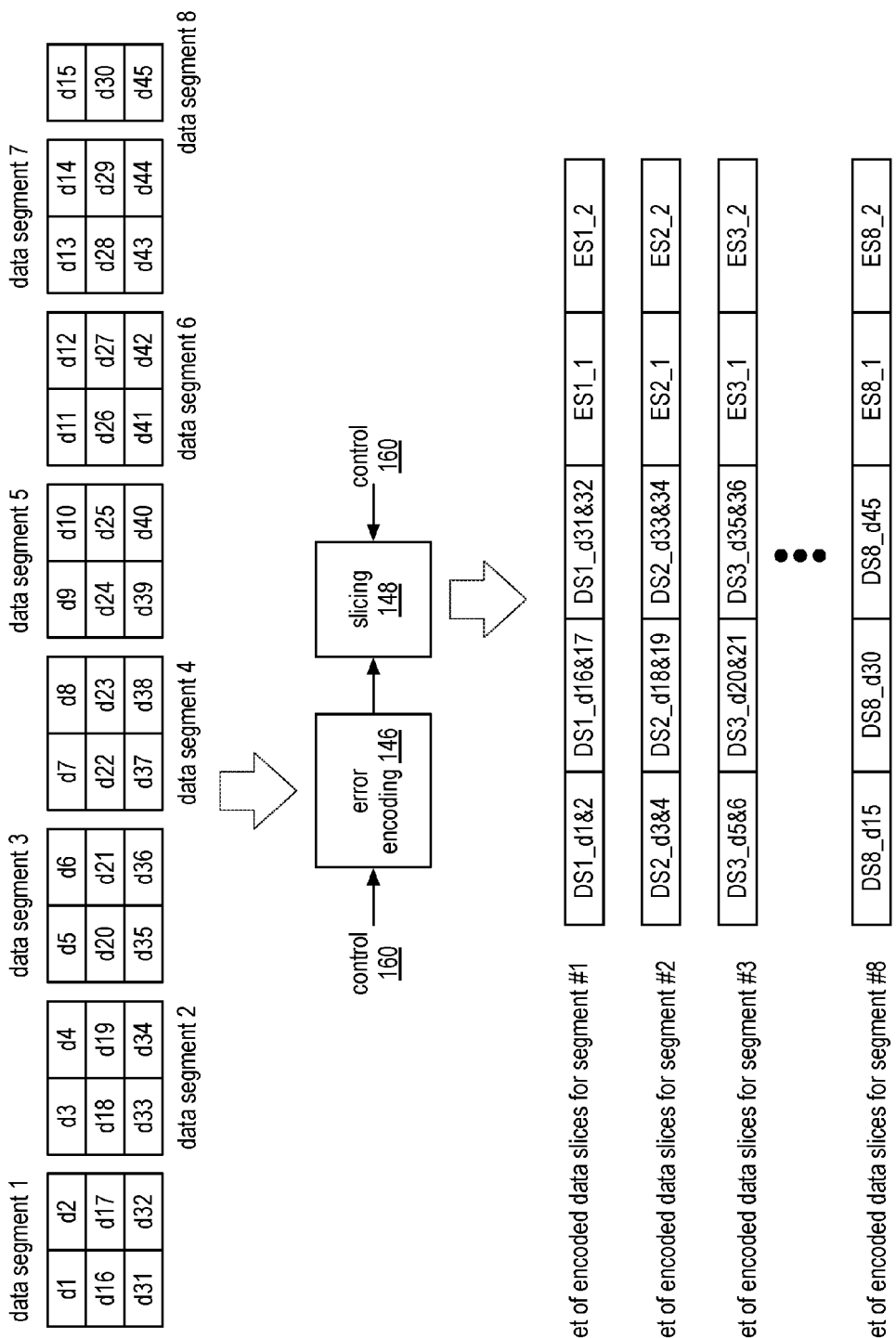
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
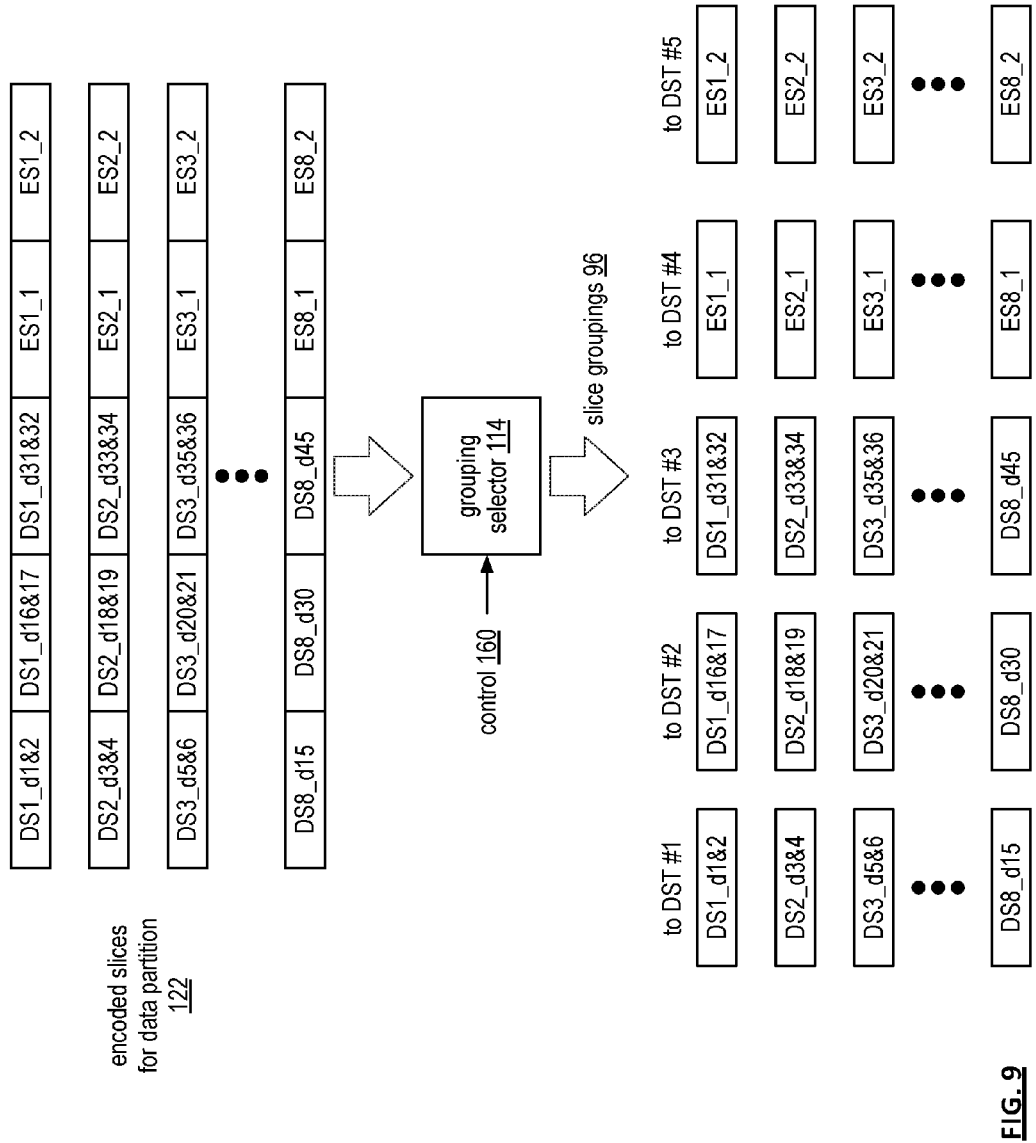
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
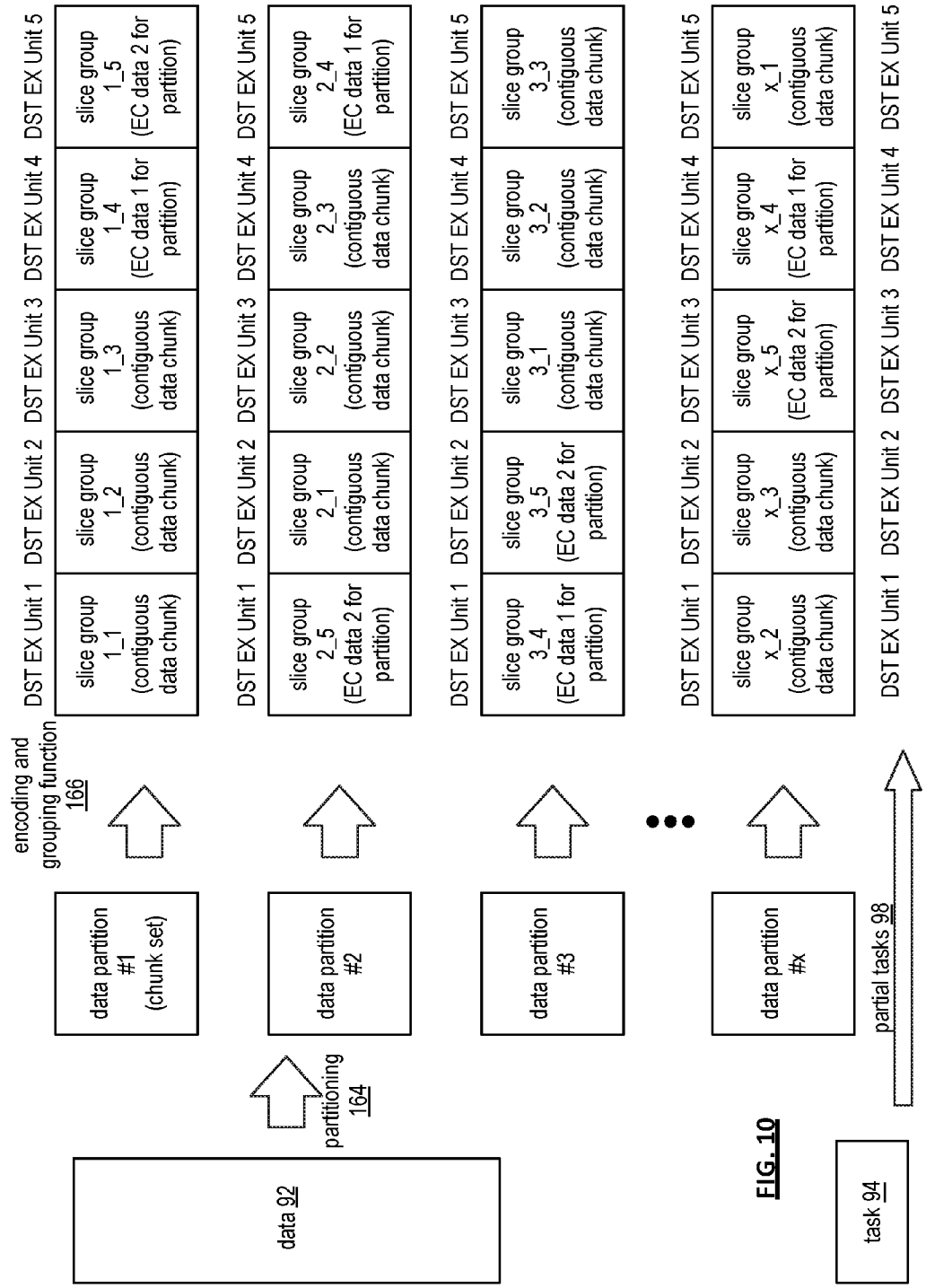
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution unit receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
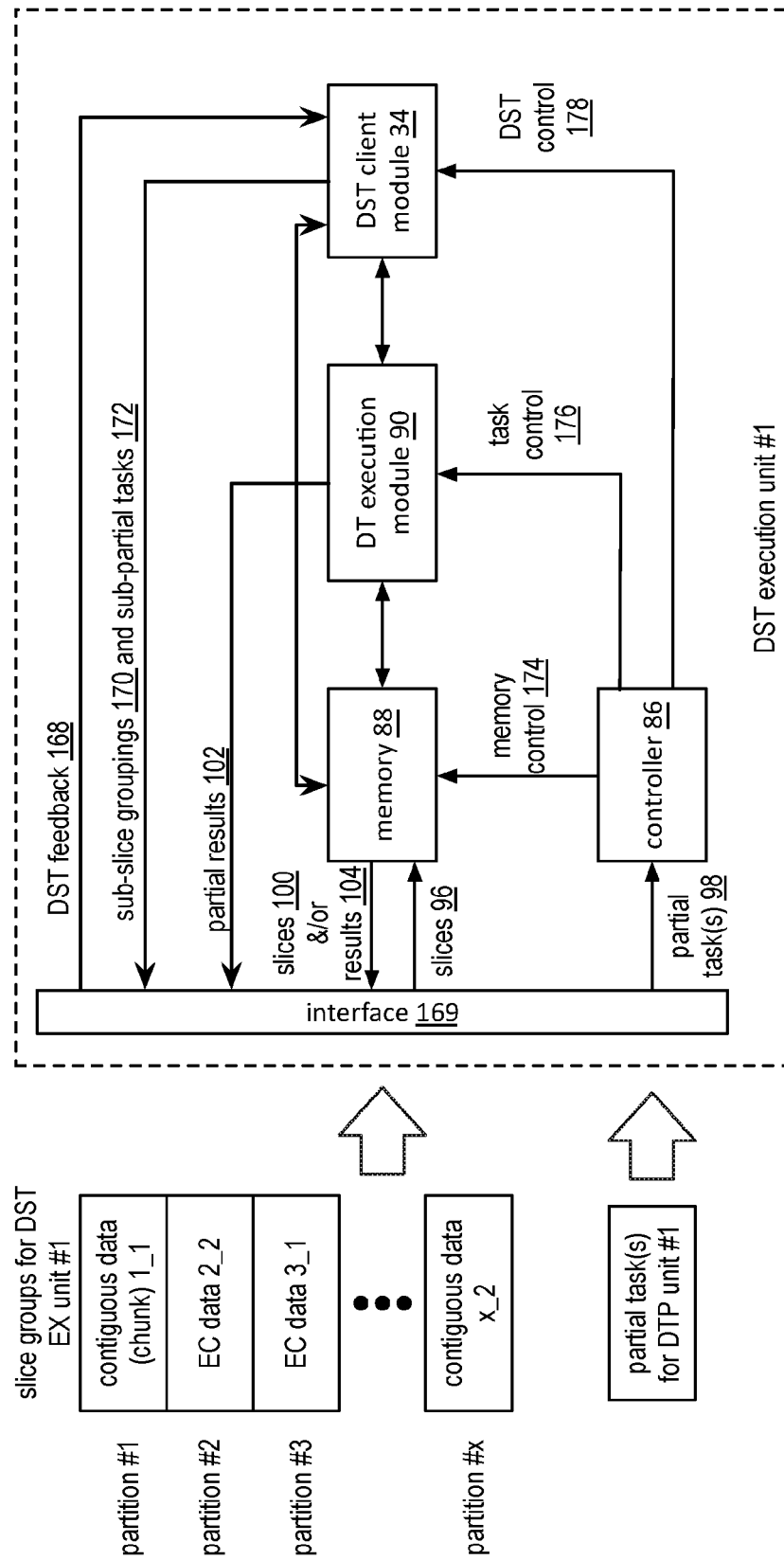
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
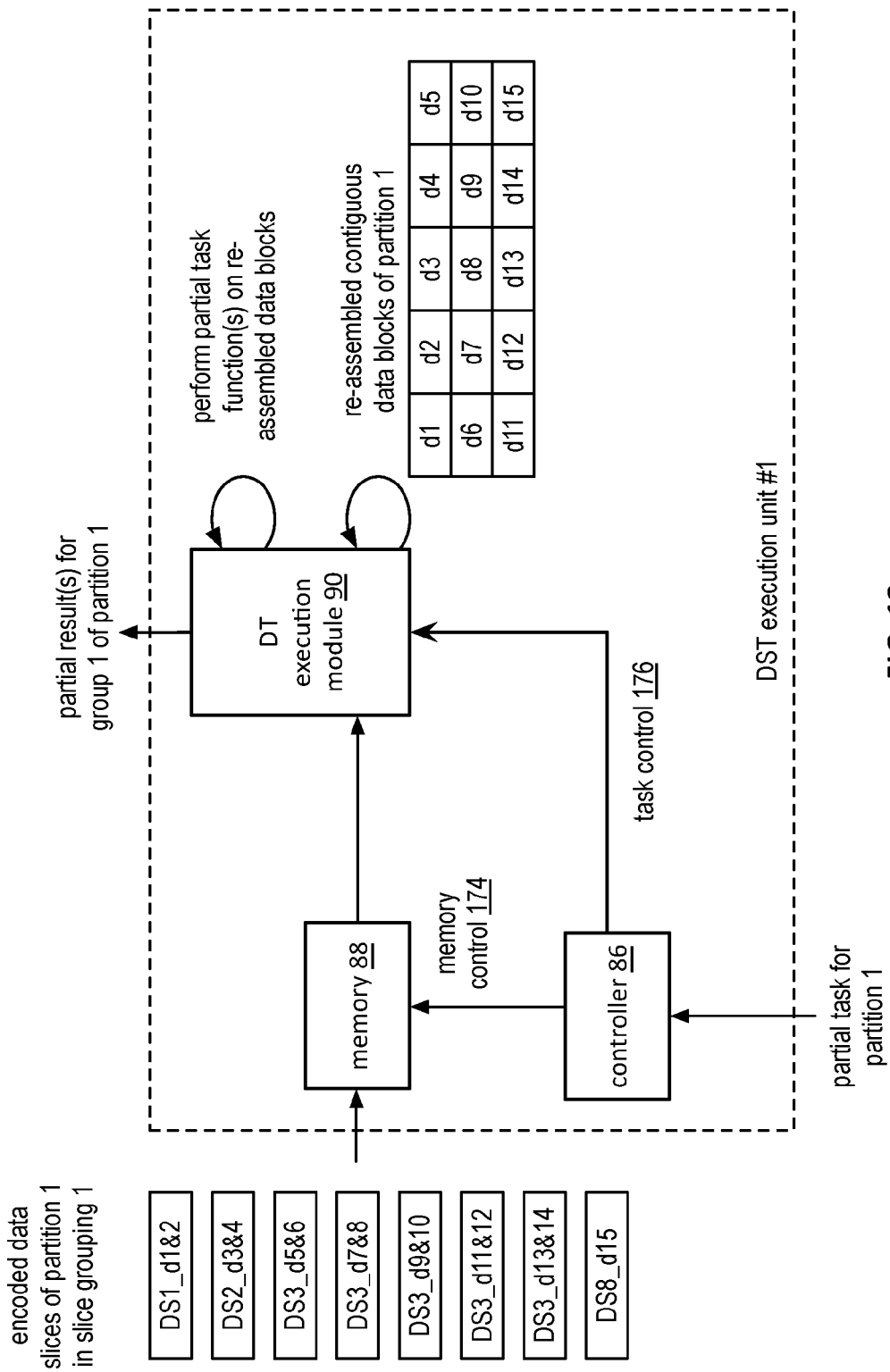
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
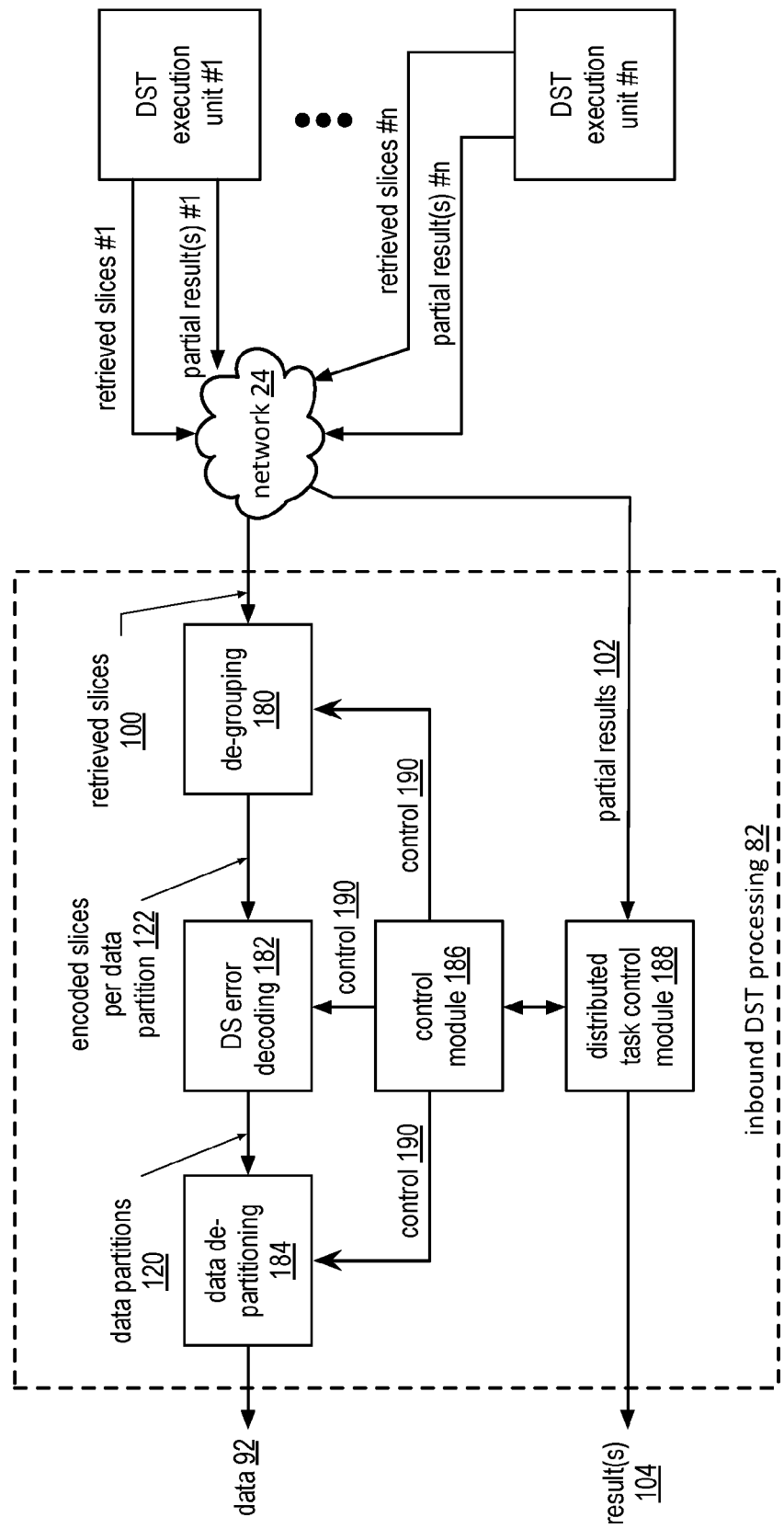
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of their corresponding partial tasks 102 on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180; provides the DS error encoding parameters to the DS error decoding module 182; and provides de-partitioning information to the data de-partitioning module 184.

Figure 14:
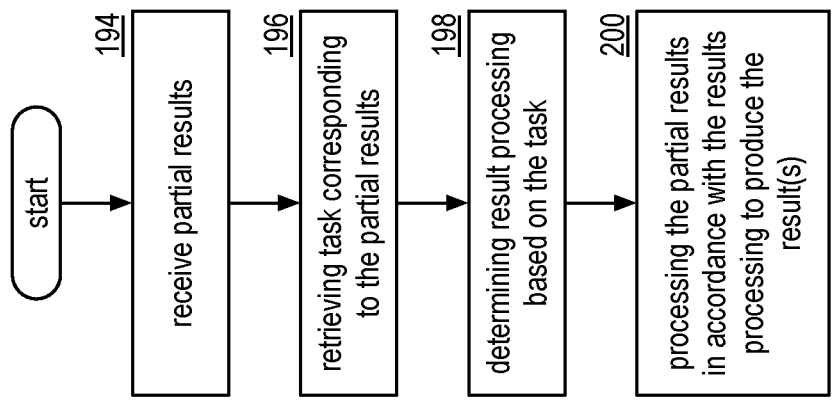
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, the results of processing information would indicate to add the partial results to produce the final results. The method continues at step 200 where the DST client module processes the partial results in accordance with the result processing information to produce the final result, or results.

Figure 15:
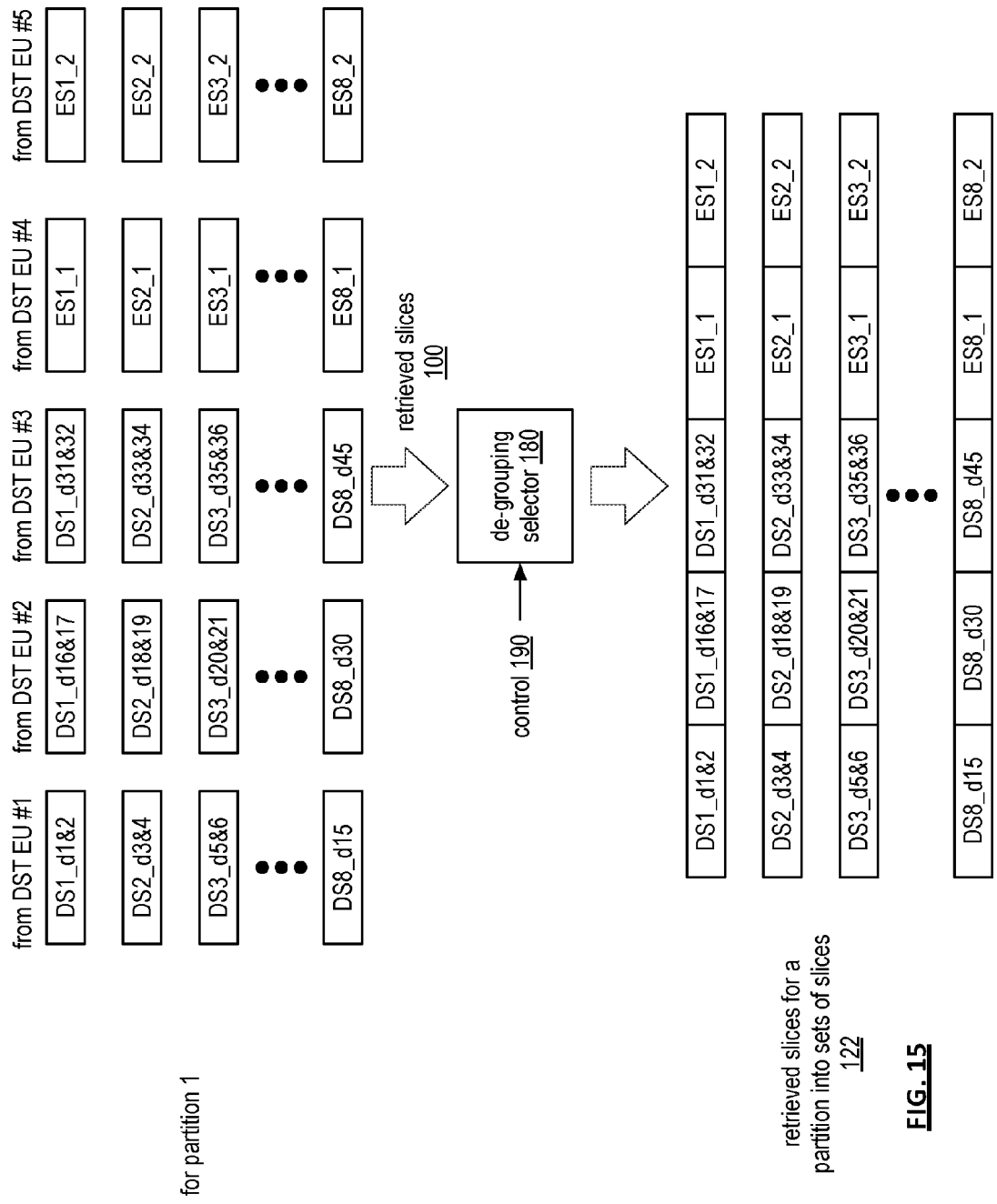
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings using a de-grouping selector 180 controlled by a control signal 190 as shown in the example to produce a plurality of sets of encoded data slices 122. Each set corresponding to a data segment of the data partition.

Figure 16:
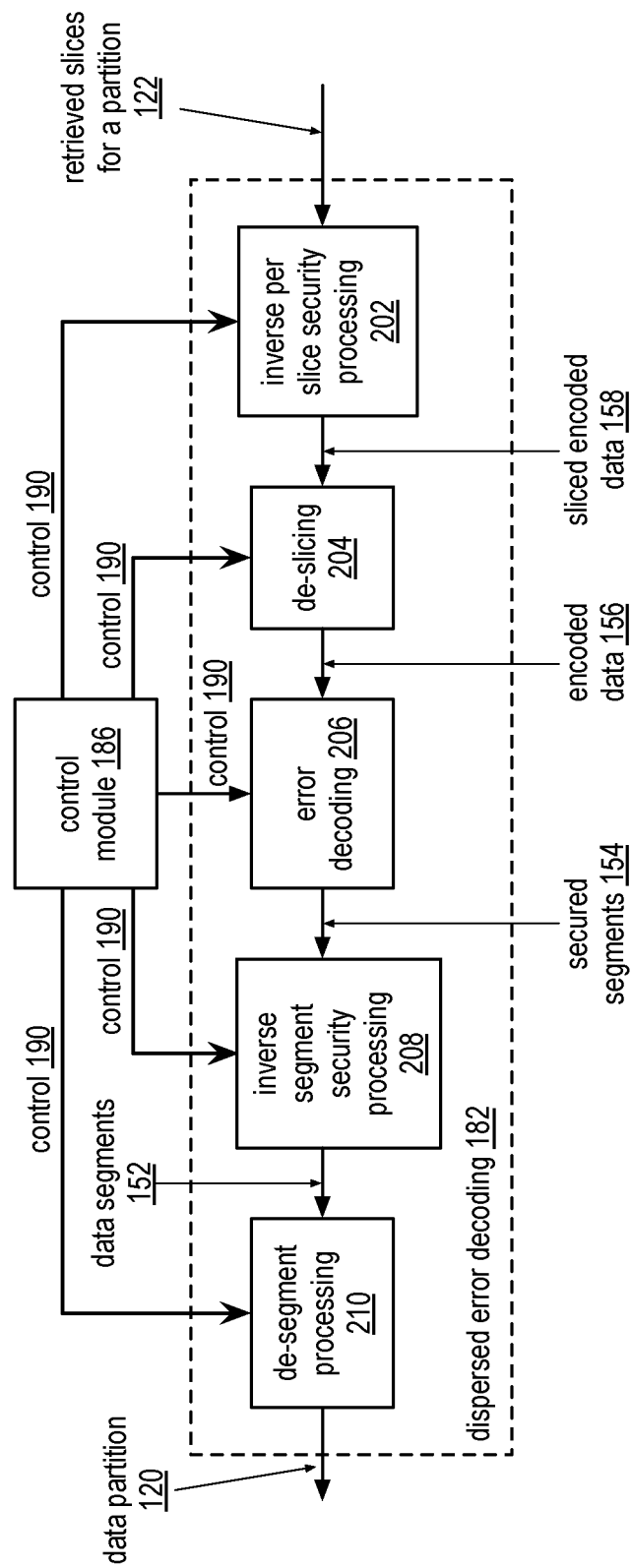
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC) verification, etc., and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC), etc. verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
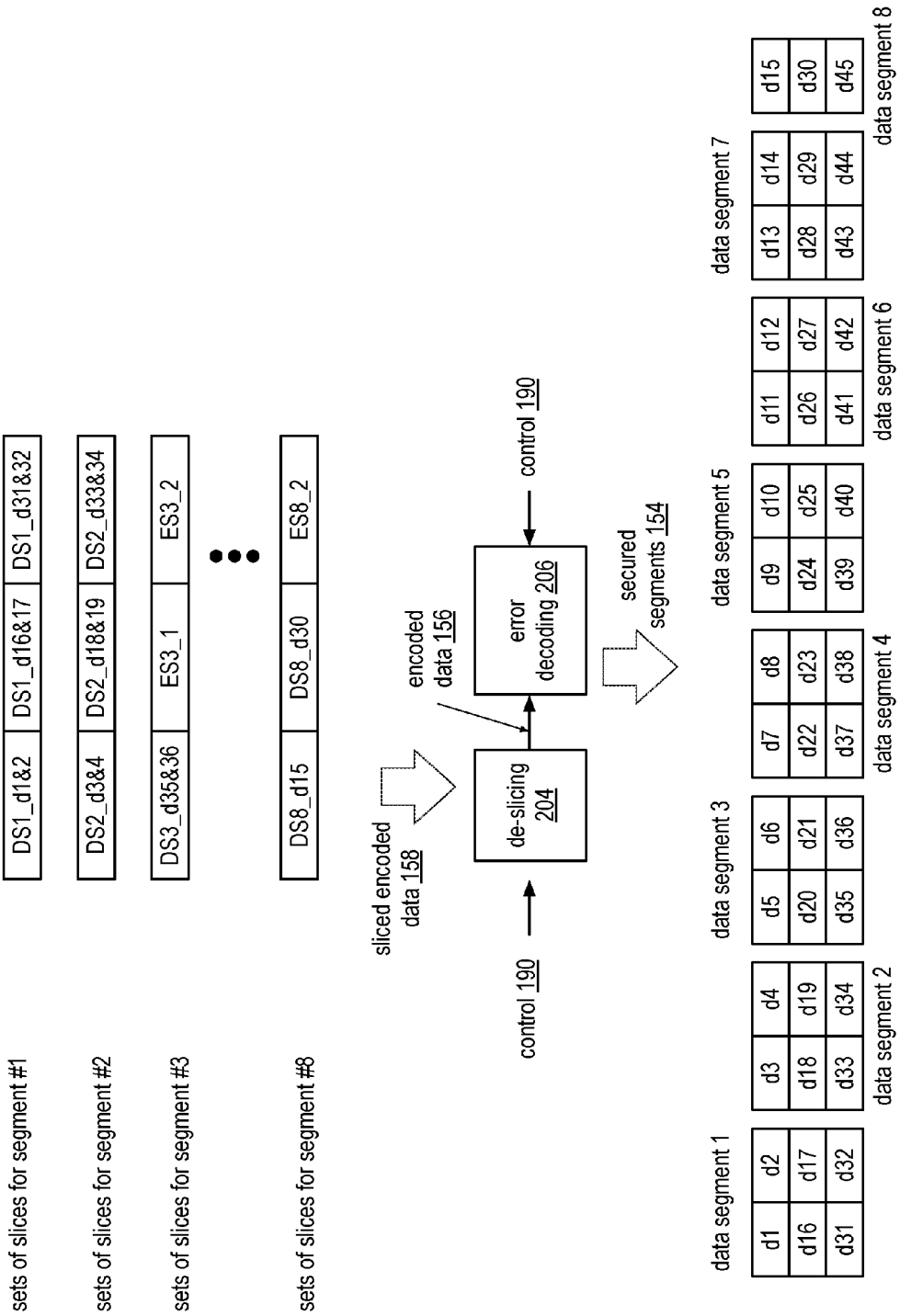
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 slice and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce data segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
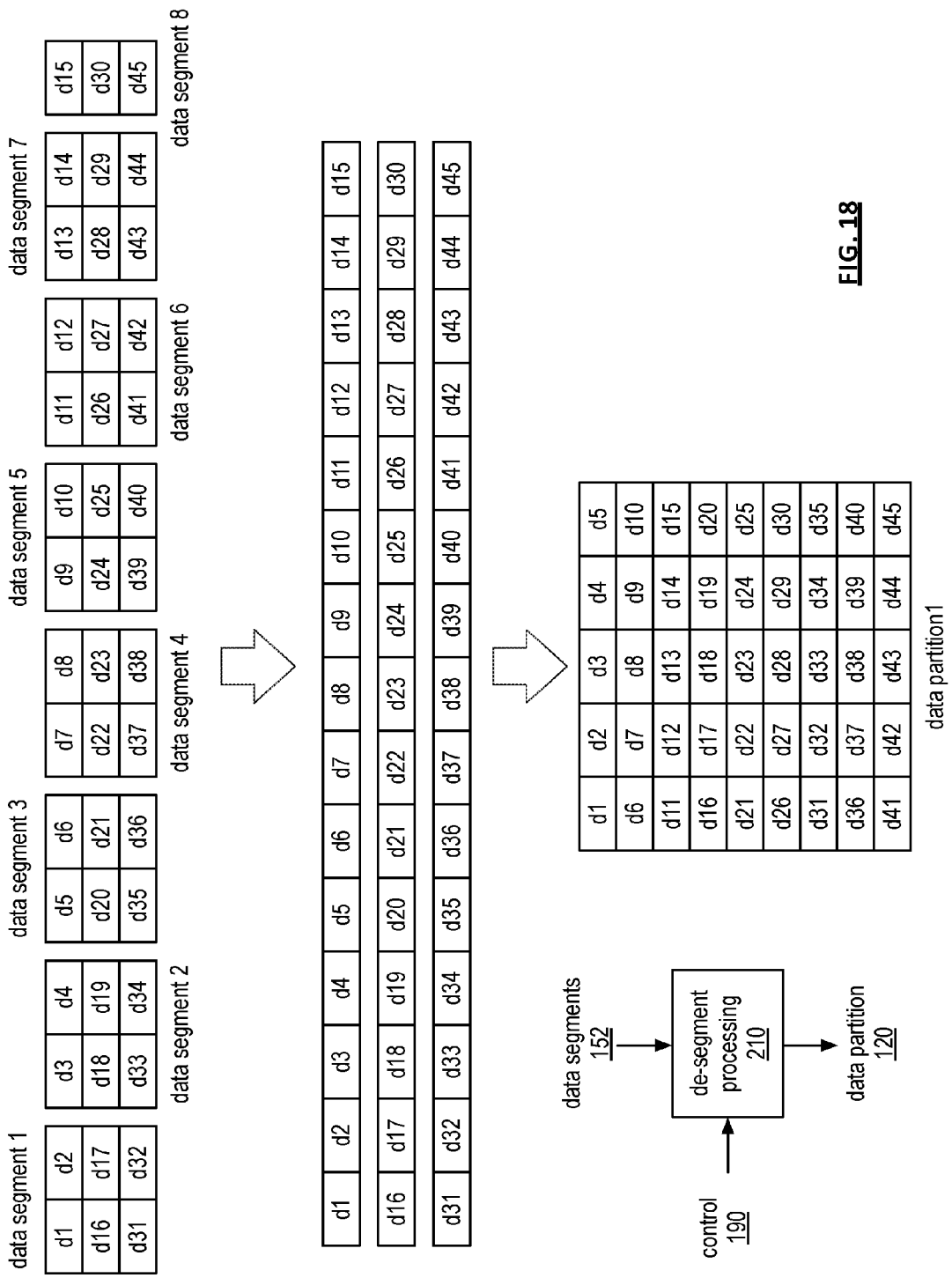
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
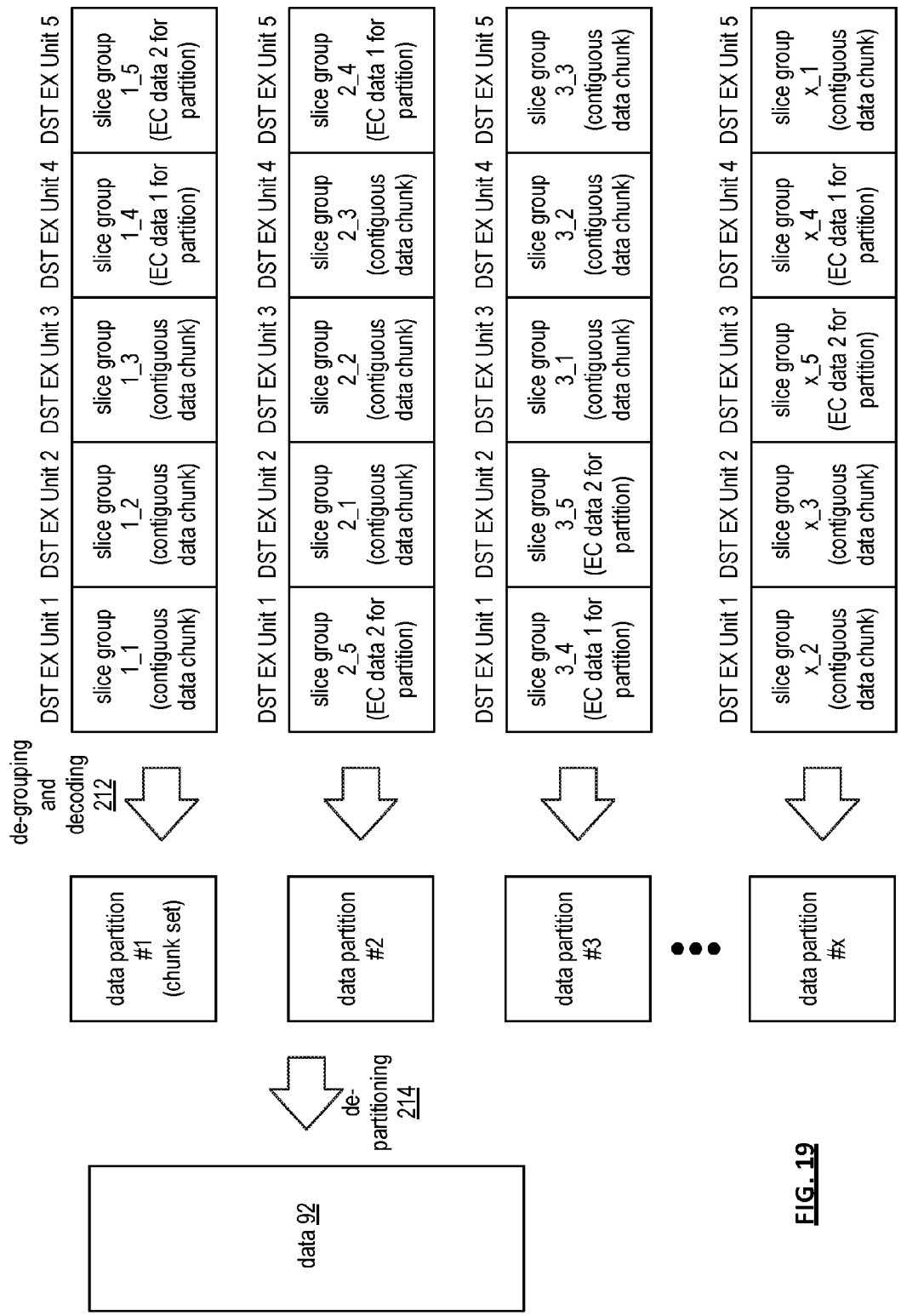
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunkset of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
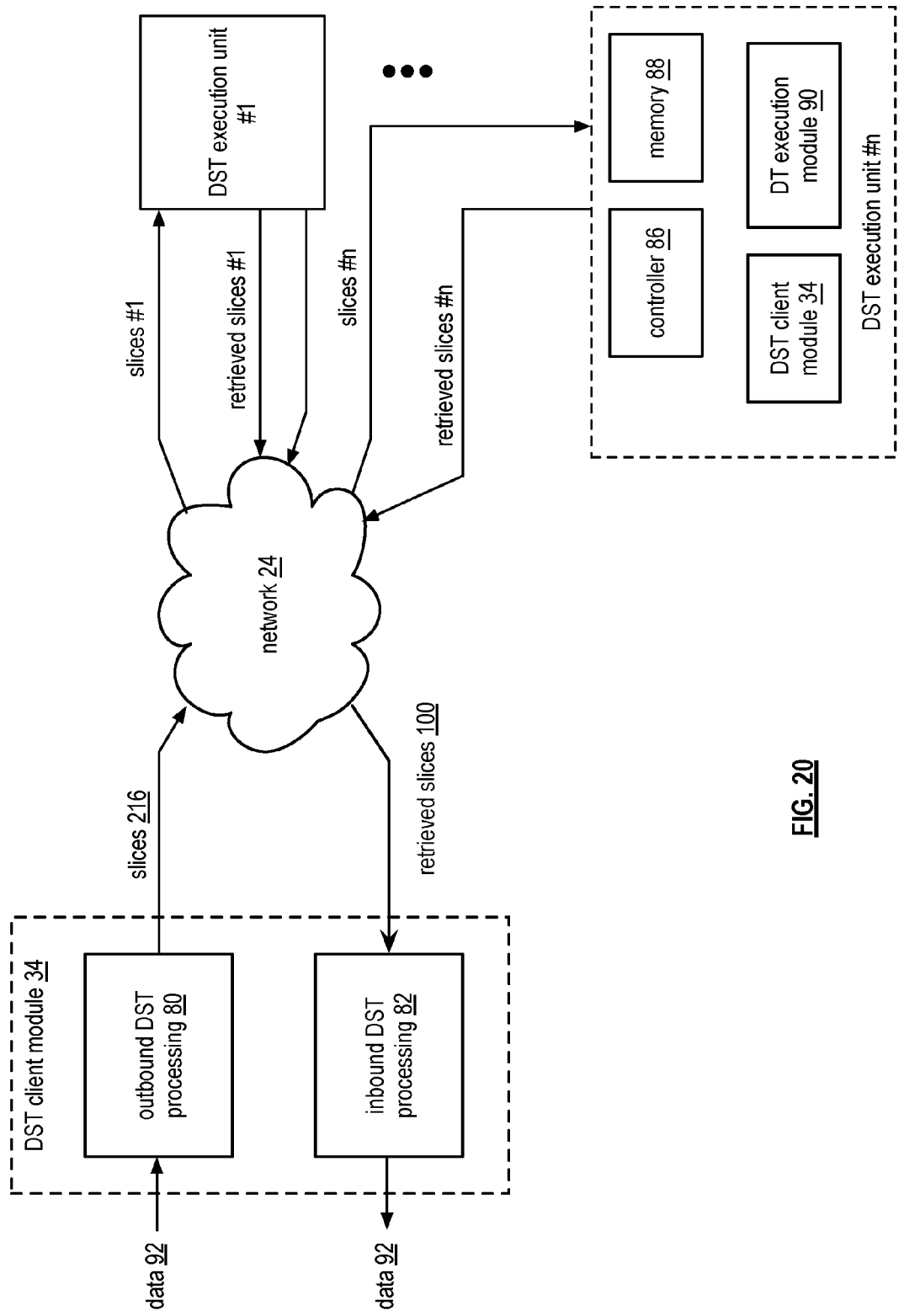
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to distributedly store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
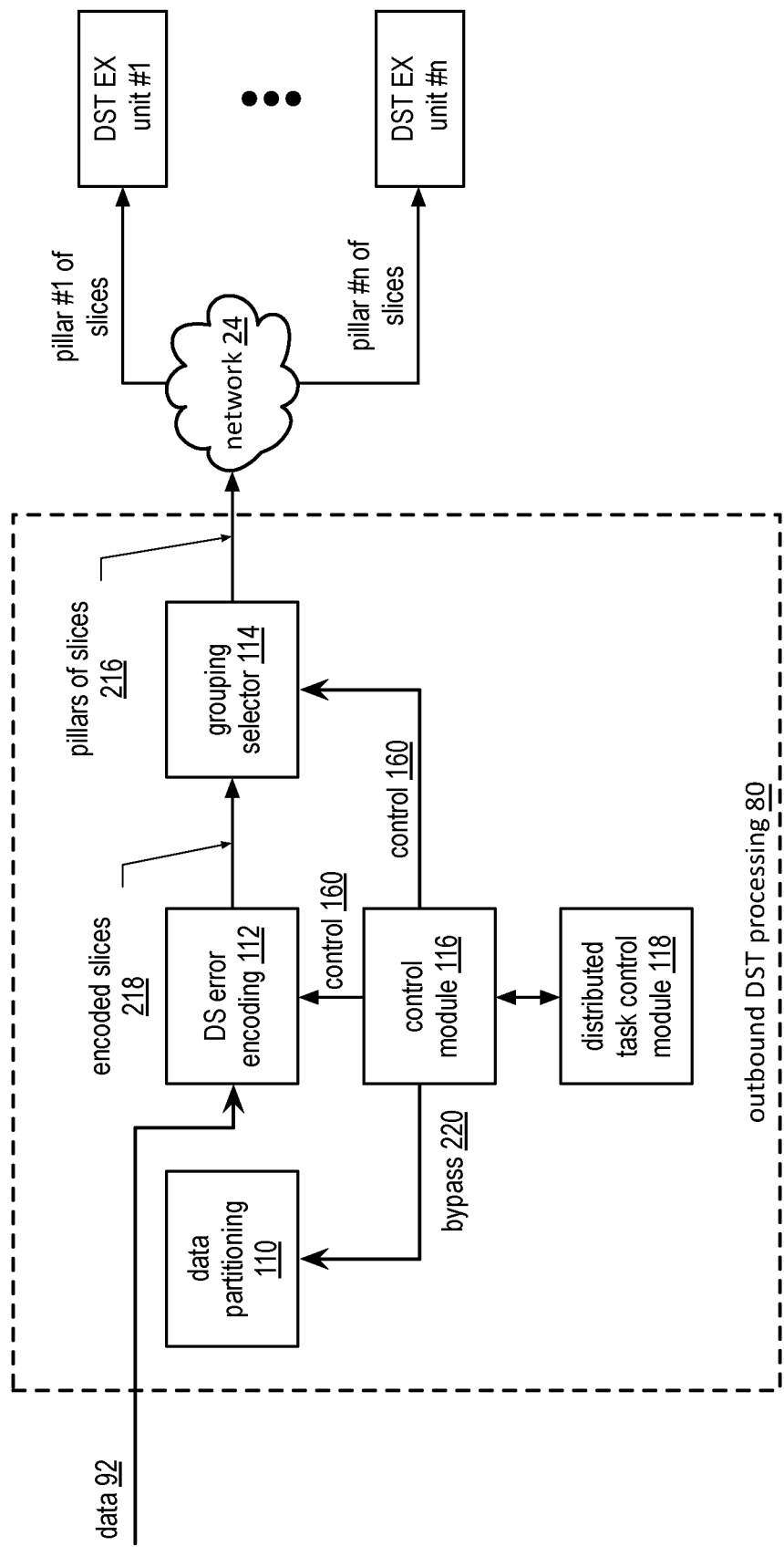
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
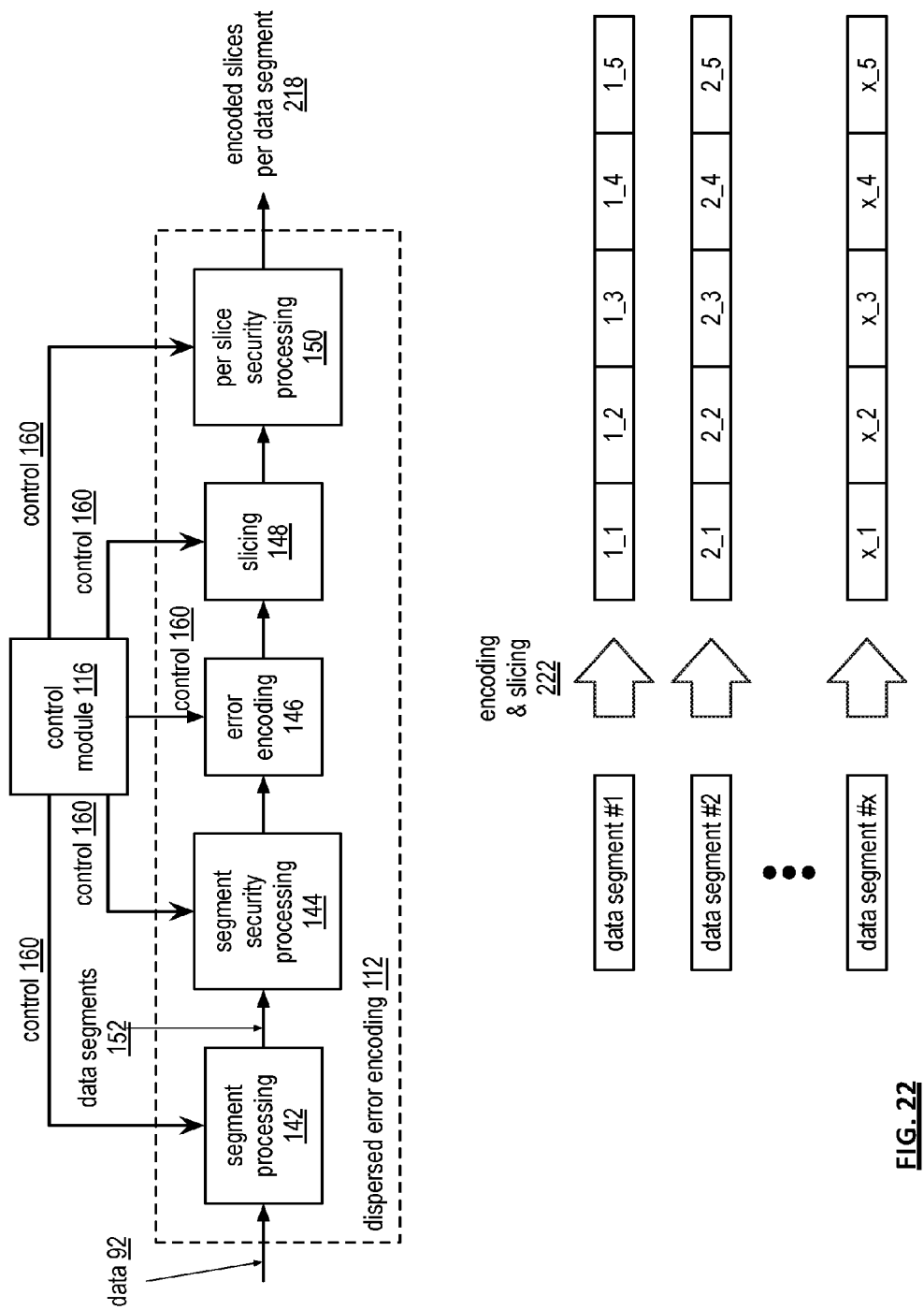
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC), etc., and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC), etc., and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
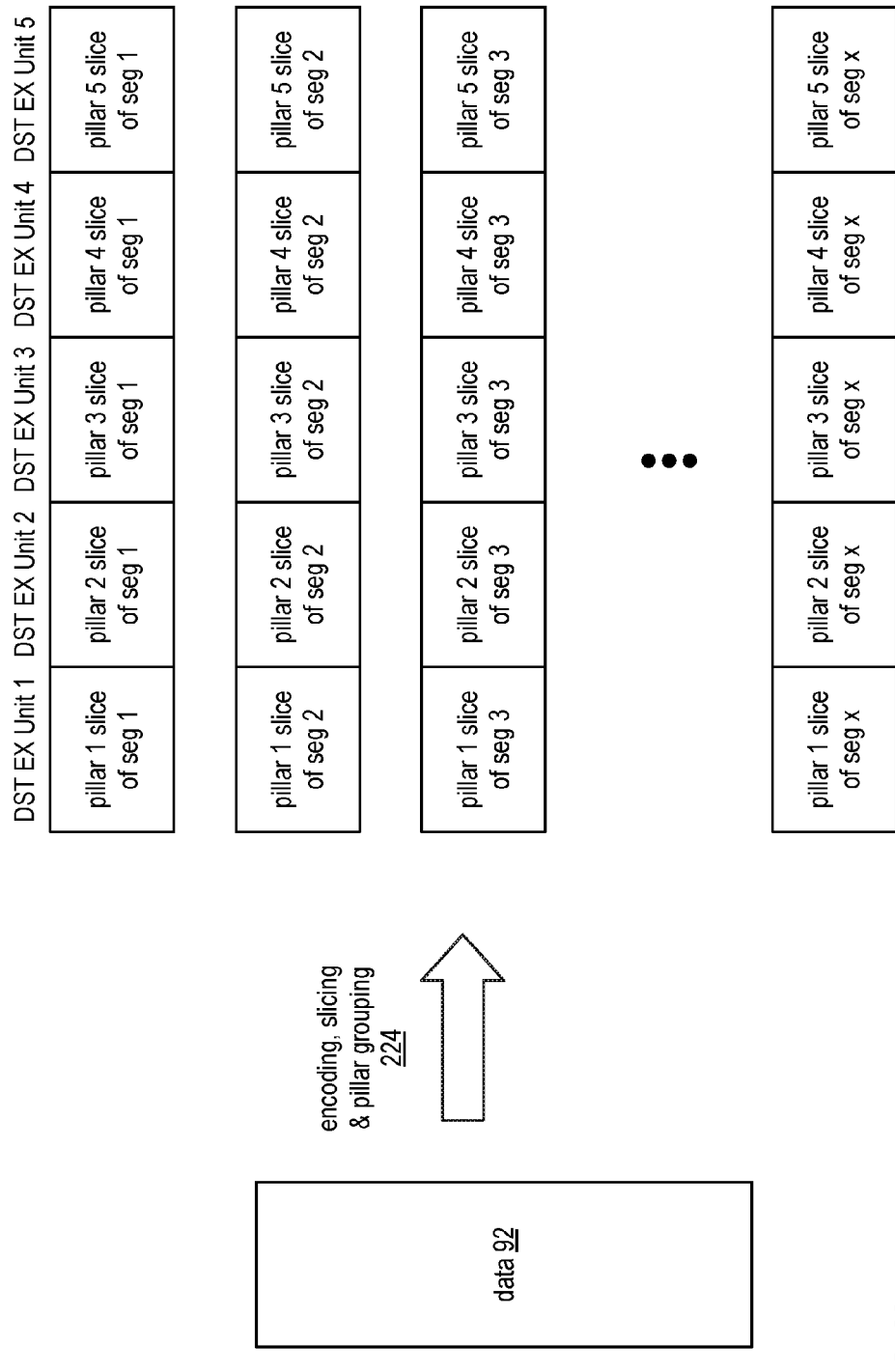
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
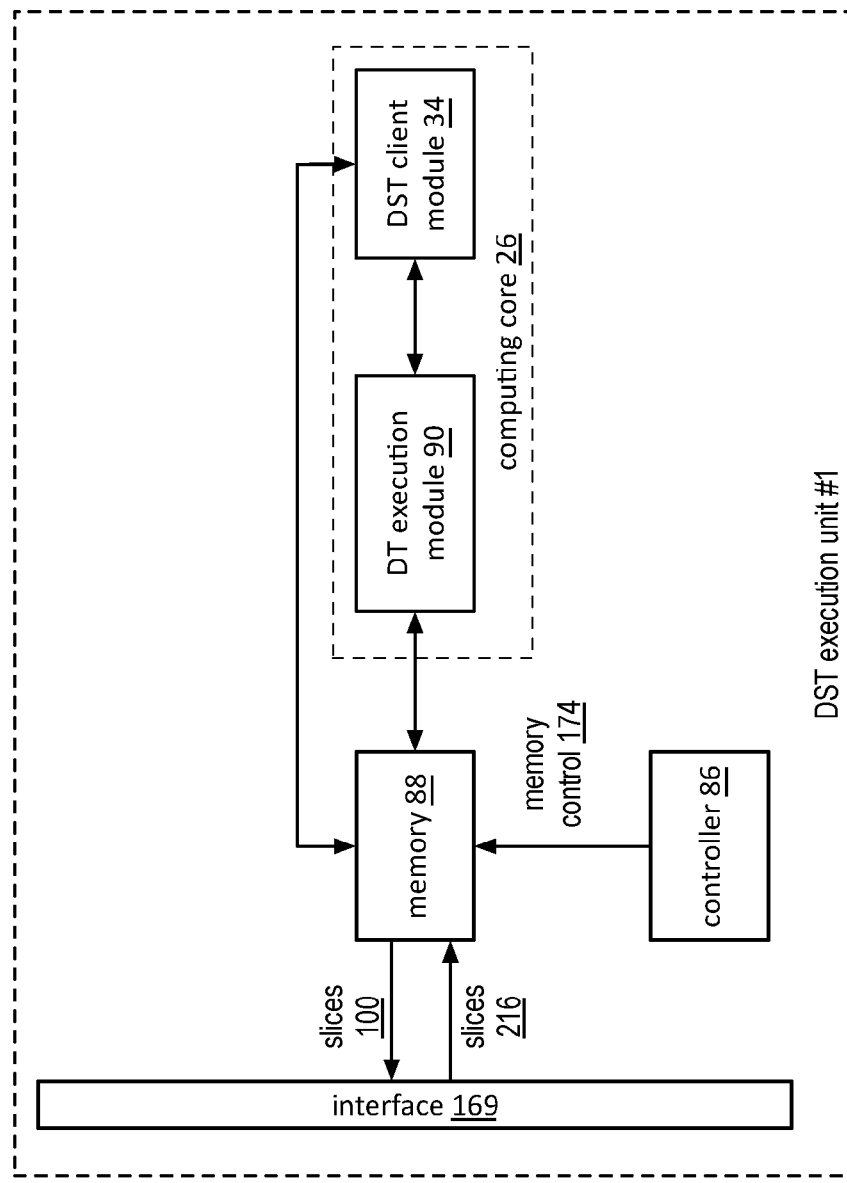
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
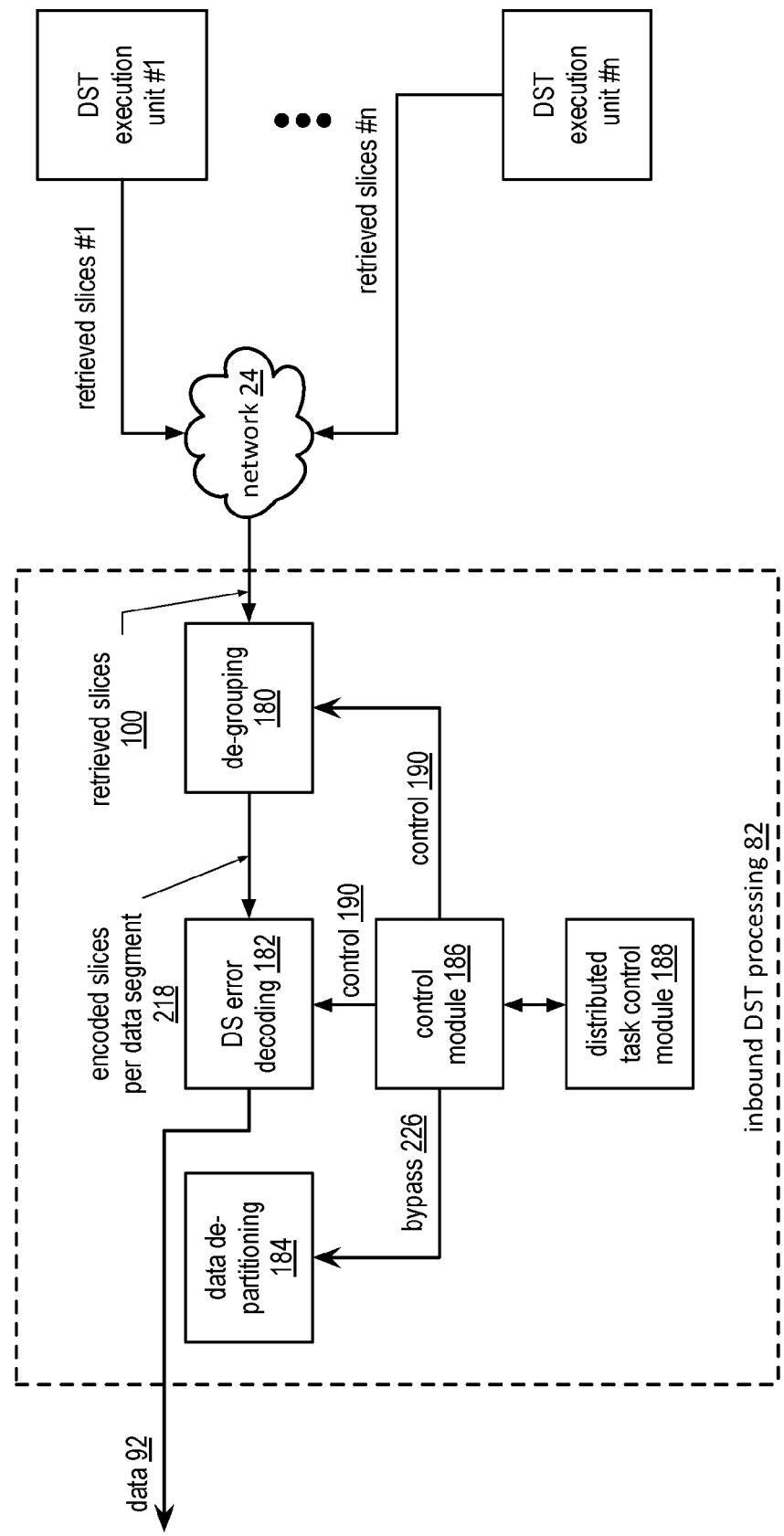
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
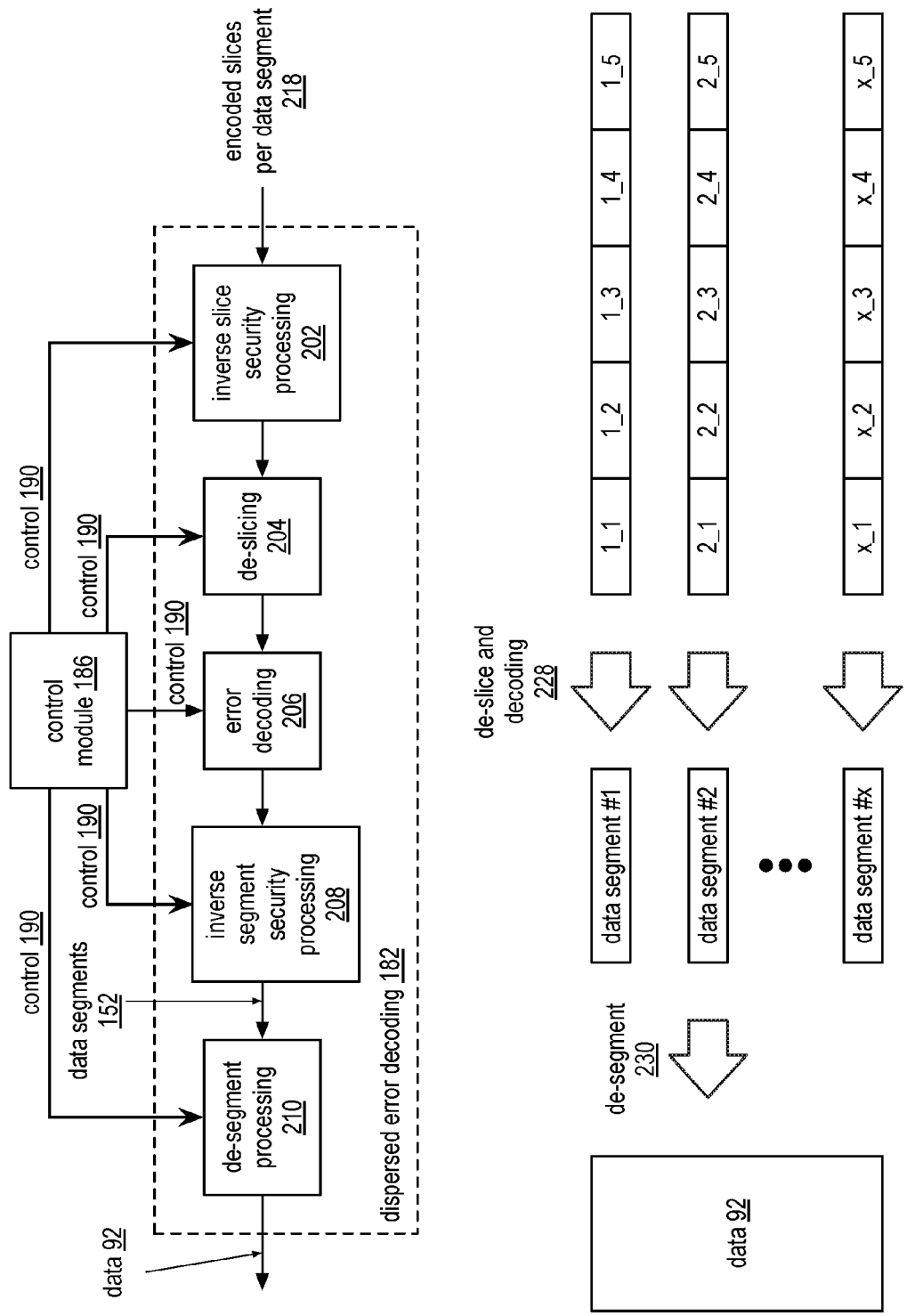
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC) verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from the control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC), etc. verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
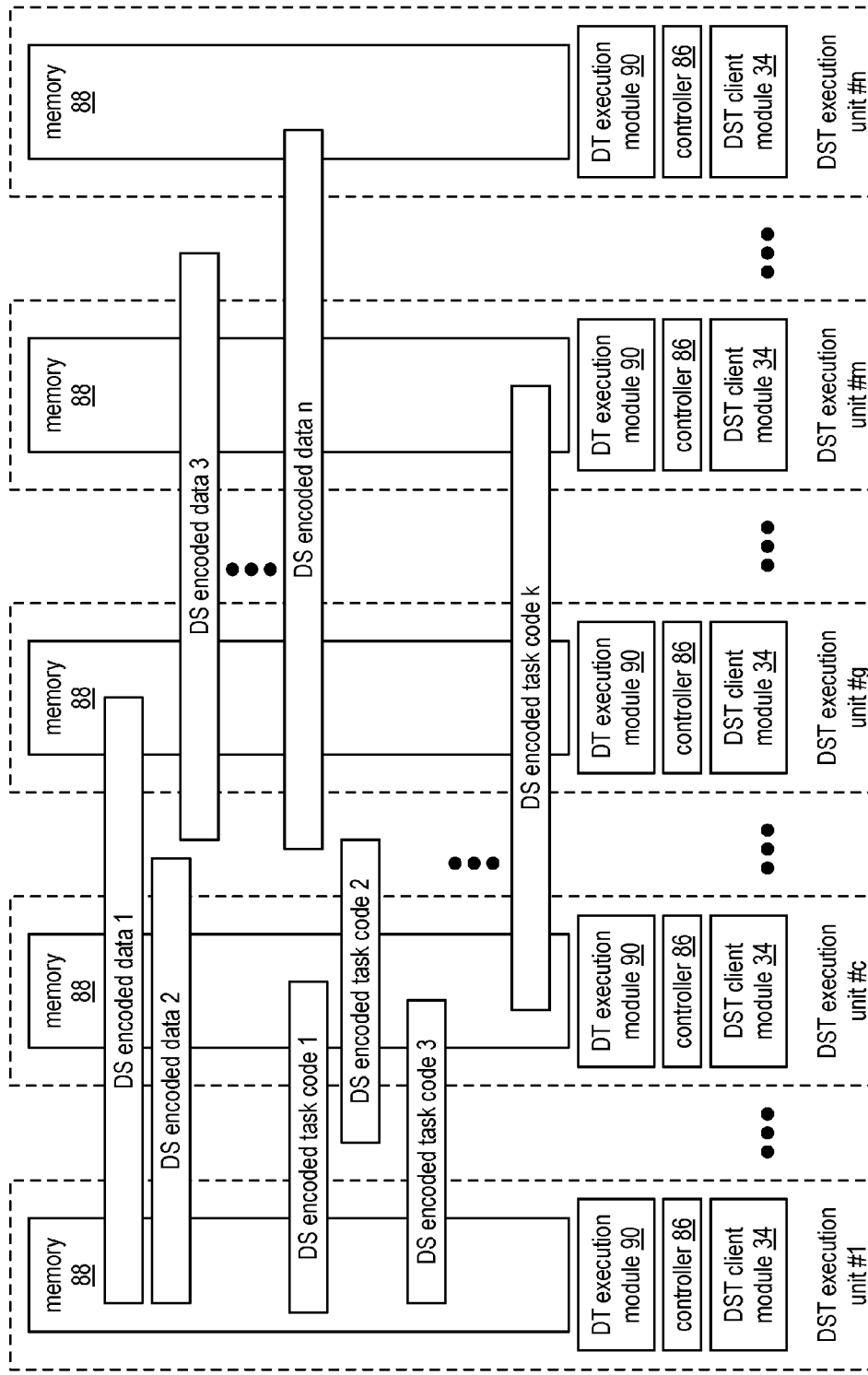
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
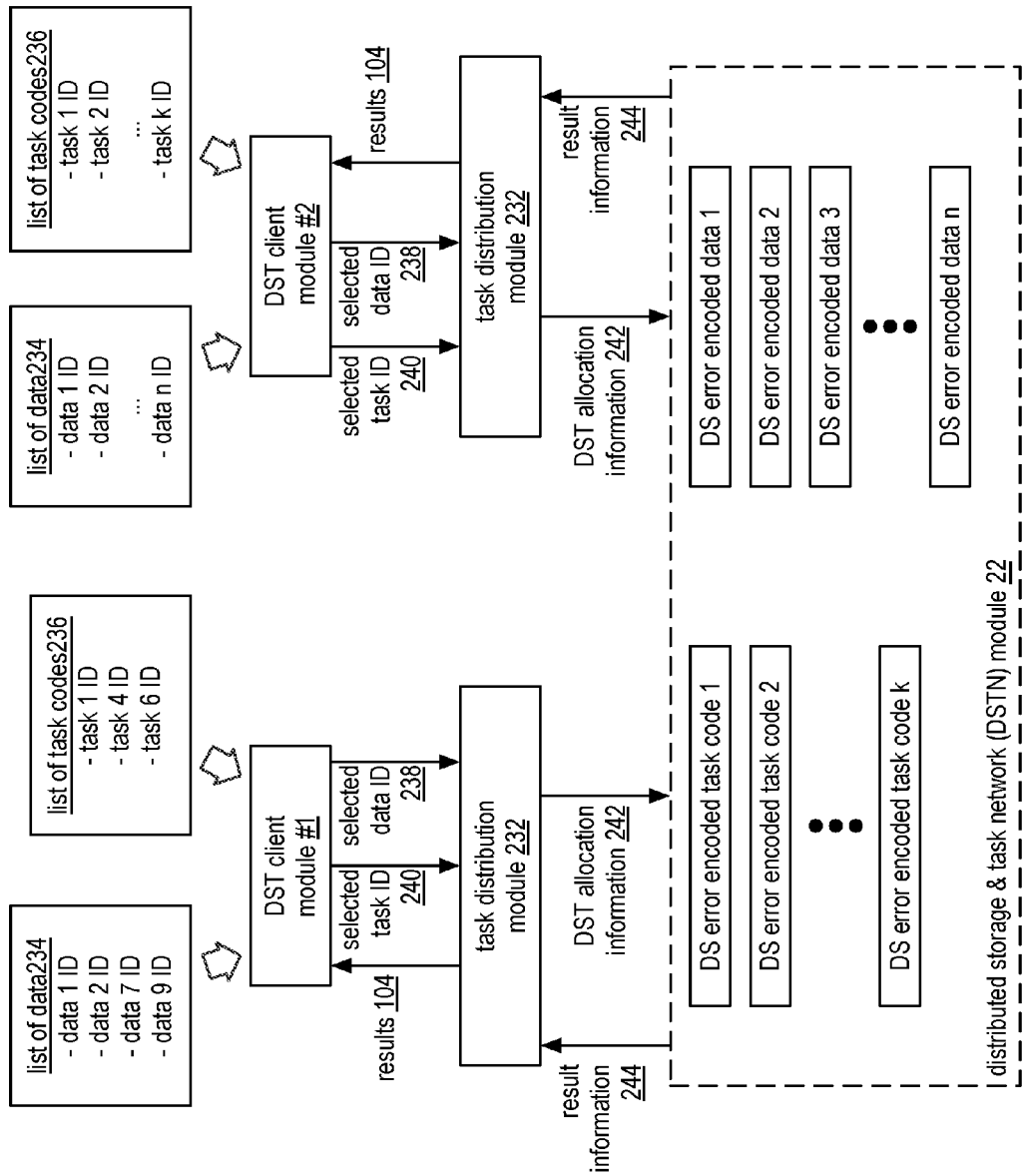
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
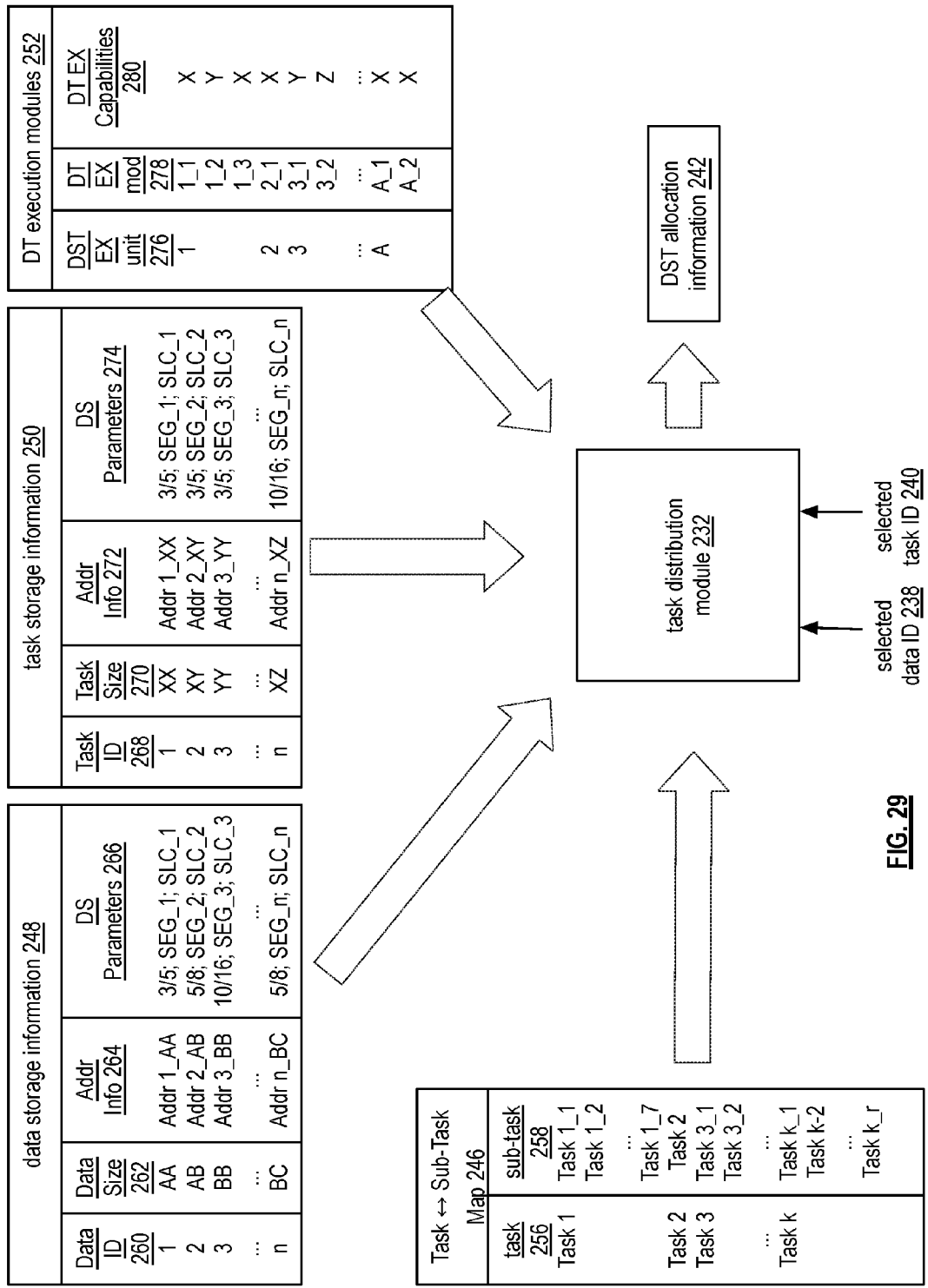
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slice names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
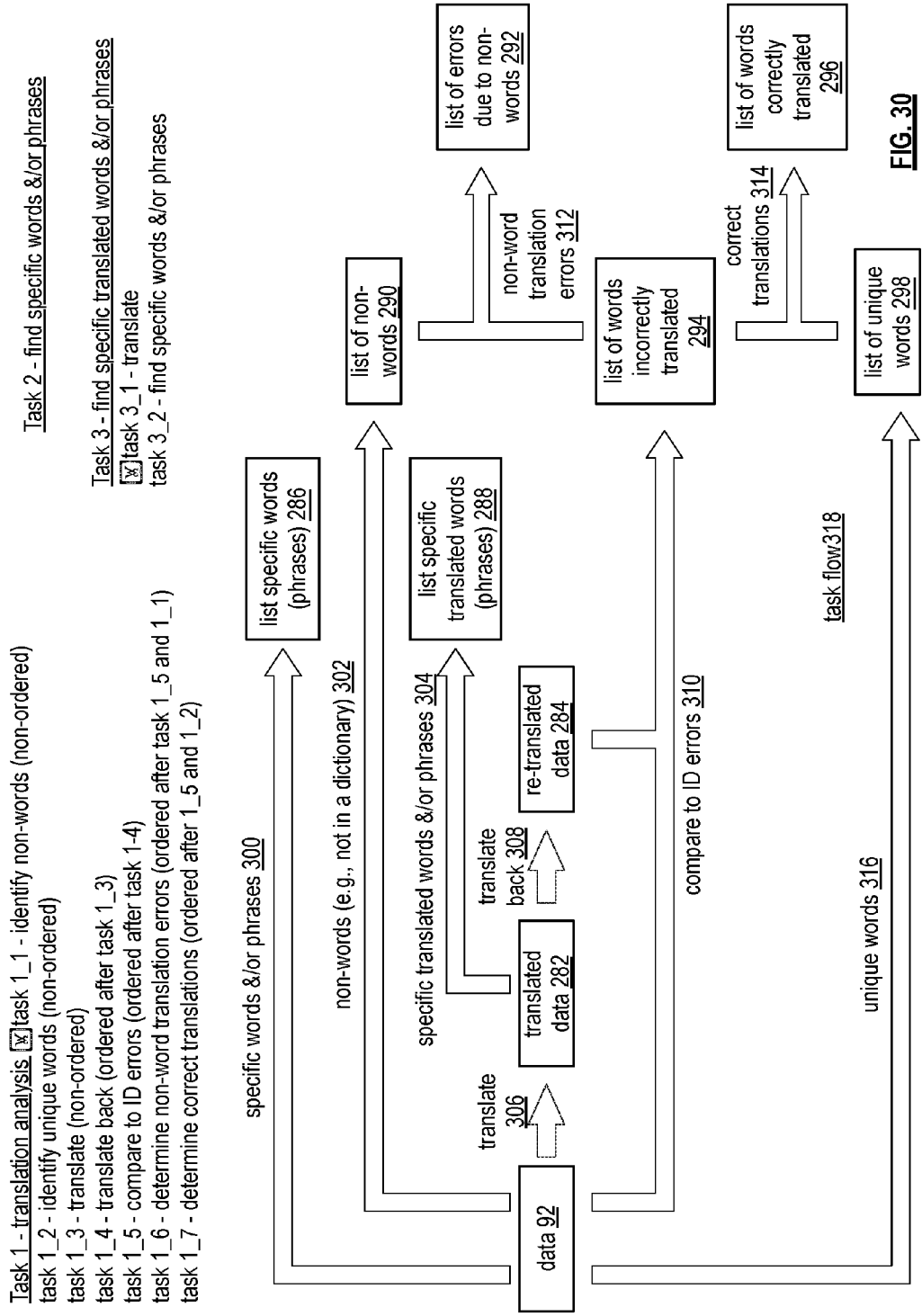
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc,) may include the word and/or phrase, how many times it is used, where in the data it is used, and/or any other information requested regarding a word and/or phrase.

Figure 31:
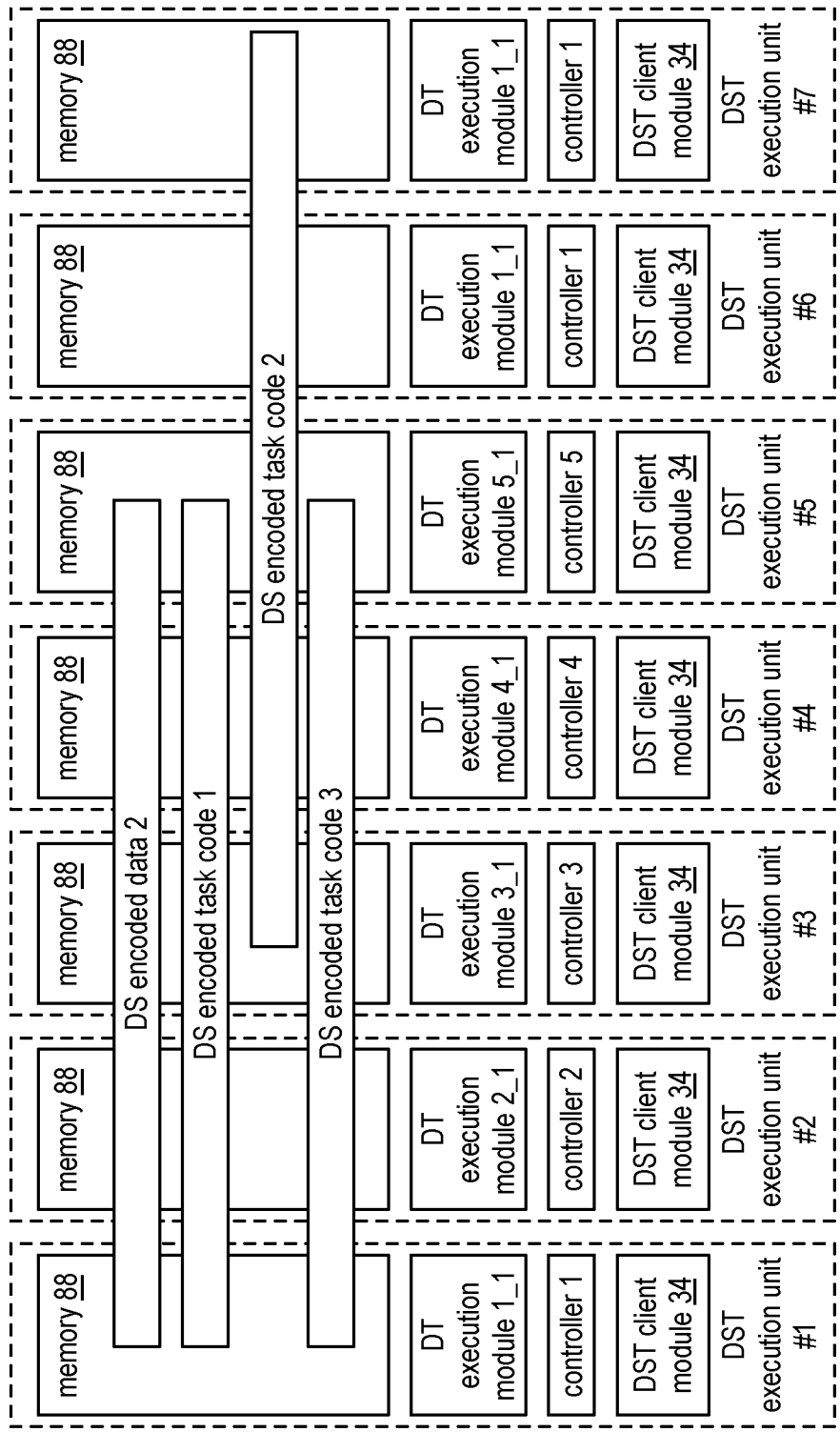
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3 z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
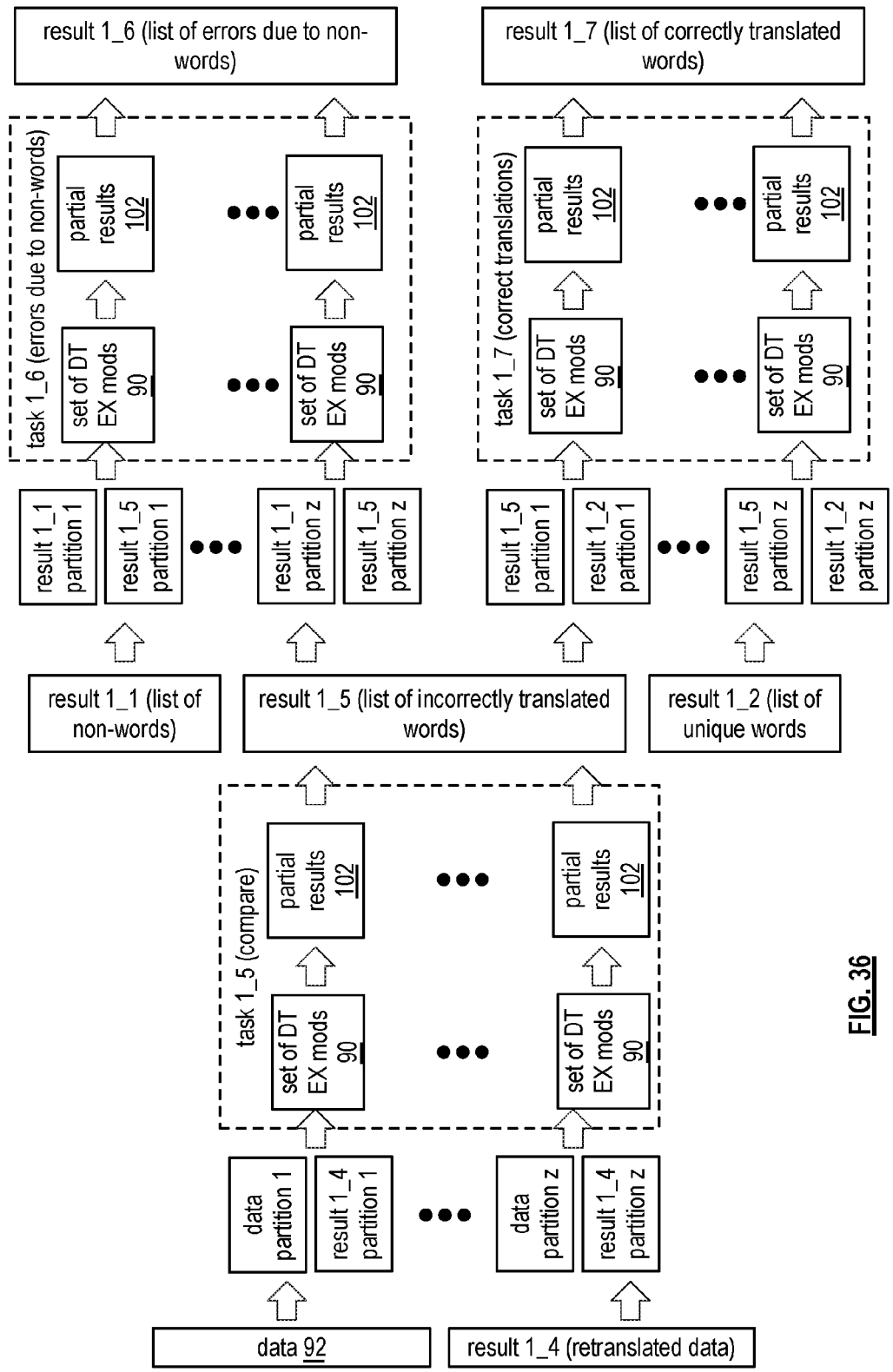

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7 z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2 m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3 m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30.

In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
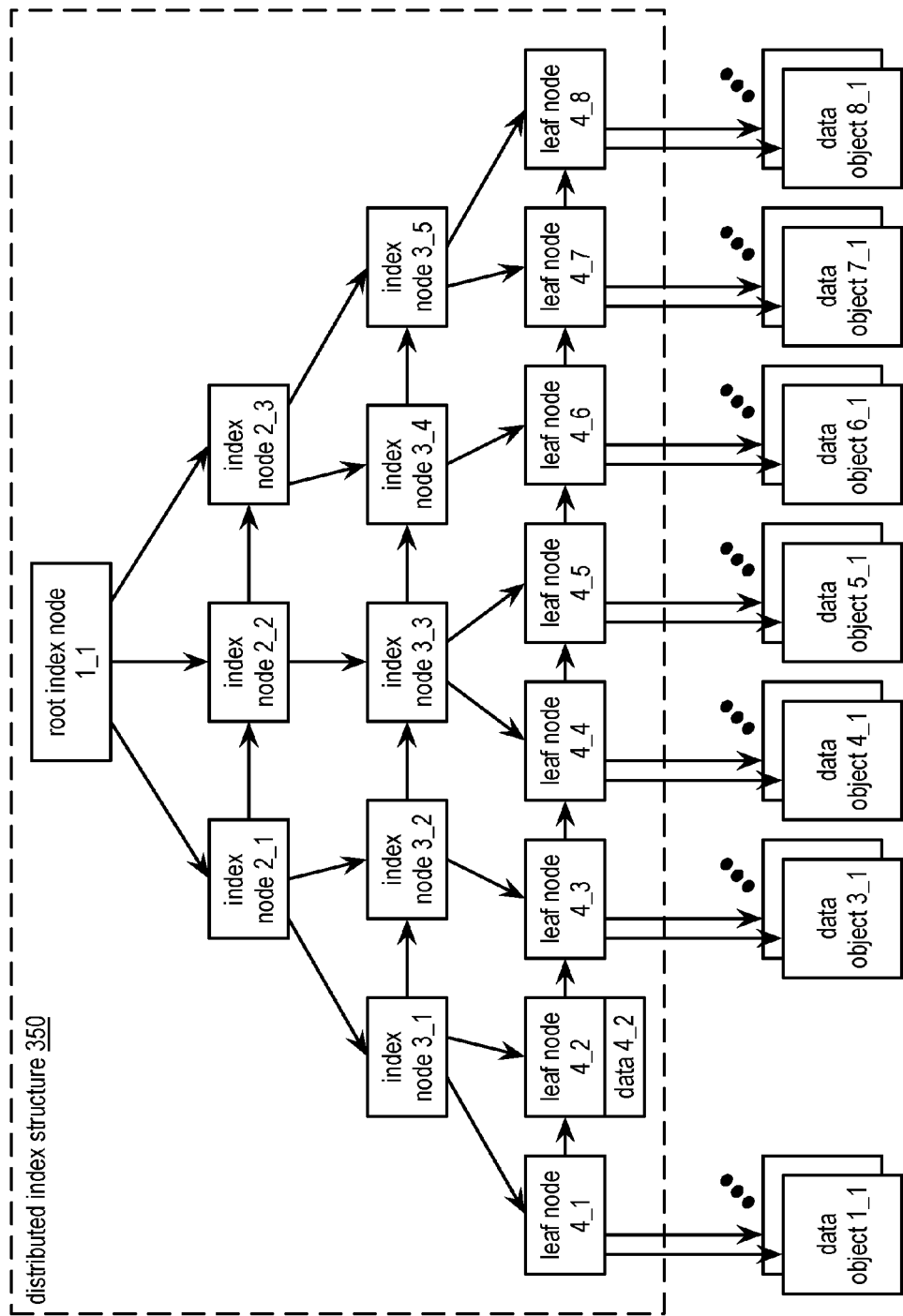
FIG. 40A is a diagram illustrating an example of an index structure in accordance with the present invention.

FIG. 40A is a diagram illustrating an example of a distributed index structure 350 of one or more indexes utilized to access a data object of one or more data objects 1_1 through 1_w, 3_1 through 3_w, 4_1 through 4_w, etc., where at least some of the one or more data objects are stored in at least one of a distributed storage and task network (DSTN) and a dispersed storage network (DSN), and where a data object of the one or more data objects is dispersed storage error encoded to produce a plurality sets of encoded data slices, and where the plurality of sets of encoded data slices are stored in the DSN (e.g., and/or DSTN) utilizing a common source name (e.g., DSN address). The source name provides a DSTN and/or DSN address including one or more of vault identifier (ID) (e.g., such a vault ID associates a portion of storage resources of the DSN with one or more DSN user devices), a vault generation indicator (e.g., identify a vault generation of one or more of generations), and an object number that corresponds to the data object (e.g., a random number assigned to the data object when the data object is stored in the DSN).

The distributed index structure 350 includes at least two nodes represented in the index structure as nodes associated with two or more node levels. One or more nodes of the at least two nodes of the distributed index structure 350 may be dispersed storage error encoded to produce one or more sets of encoded index slices. The one or more sets of encoded index slices may be stored in at least one of a local memory, a DSN memory, and a distributed storage and task network (DSTN) module. For example, each node of a 100 node distributed index structure are individually dispersed storage error encoded to produce at least 100 sets of encoded index slices for storage in the DSTN module. As another example, the 100 node index structure is aggregated into one index file and the index file is dispersed storage error encoded to produce a set of encoded index slices for storage in the DTSN module.

Each node of the at least two nodes includes at least one of an index node and a leaf node. One index node of the at least two nodes includes a root index node. Alternatively, the distributed index structure 350 includes just one node, wherein the one node is a leaf node and where the leaf node is a root node. The distributed index structure 350 may include any number of index nodes, any number of leaf nodes, and any number of node levels. Each level of the any number of node levels includes nodes of a common node type. For example, all nodes of node level 4 are leaf nodes and all nodes of node level 3 are index nodes. As another example, as illustrated, the distributed index structure 350 includes eight index nodes and eight leaf nodes, where the eight index nodes are organized in three node levels, where a first node level includes a root index node 1_1, a second node level includes index nodes 2_1, 2_2, and 2_3, and a third node level includes index nodes 3_1, 3_2, 3_3, 3_4, and 3_5, and where the eight leaf nodes are organized in a last (e.g., fourth) node level, where the last node level includes leaf nodes 4_1, 4_2, 4_3, 4_4, 4_5, 4_6, 4_7, and 4_8.

Each data object of the one more data objects is associated with at least one index key per distributed index structure of the one or more distributed indexes, where the index key includes a searchable element of the distributed index and may be utilized to locate the data object in accordance with key type traits. An index key type of an index key includes a category of the index key (e.g. string integer, etc.). An index key type exhibits traits. Each index key is associated with one or more key type traits (e.g., for an associated index structure), where a key type traits includes one or more of a type indicator, a trait indicator, a comparing function (e.g., defining how an associate index key of this type should be compared, such as sorting and/or manipulation, to other such index keys), a serialization function (e.g., encoding function for storage), a de-serialization function (e.g., decoding function for retrieval), and an absolute minimum value of the index key.

Each leaf node of the at least two nodes may be associated with one or more data objects. The association includes at least one of, for each data object of the one more data objects, storing an index key associated with the data object in the leaf node, storing a source name associated with the data object in the leaf node, and storing the data object in the leaf node. For example, leaf node 4_2 includes a data object 4_2 and an index key associated with data object 4_2. As another example, leaf node 4_3 includes source names associated with data object 3_1 through 3_w and index keys associated with data object 3_1 through 3_w. Each leaf node is associated with a minimum index key, where the minimum index key is a minimum value of one or more index keys associated with the one or more data objects in accordance with the key type traits (e.g., sorted utilizing a comparing function of the key type traits to identify the minimum value).

Each leaf node is a child in a parent-child relationship with one index node, where the one index node is a parent in the parent-child relationship. Each child node has one parent node and each parent node has one or more child nodes. The one index node (e.g., parent node) stores a minimum index key associated with the leaf node (e.g., child node). As such, a parent node stores a minimum index key for each child node of the one or more child nodes. Two index nodes may form a parent-child relationship. In such a parent-child relationship, a parent-child node pair is represented in the index structure with a parent node of the parent-child relationship associated with a parent node level that is one level above in the index structure than a child node level associated with a child node of the parent-child relationship.

A leaf node is a sibling node of another leaf node when a minimum index key associated with the leaf node is ordered greater than a last minimum index key associated with the other leaf node, where the last minimum index key associated with the leaf node is sorted above any other last minimum index keys associated with any other lower order leaf nodes and where the minimum index key associated with the leaf node is ordered less than any other minimum index keys associated with any other higher order leaf nodes. A sibling node of a node is represented in the index structure on a common level with the node and one node position to the right. A last node on the far right of a node level has a no sibling (e.g., null sibling). All other nodes, if any, other than a last far right node, of a common node level have a sibling node. For example, leaf node 4_2 is a sibling node to leaf node 4_1, leaf node 4_3 is a sibling node to leaf node 4_2, etc., leaf node 4_8 is a sibling node to leaf node 4_7 and leaf node 4_8 has no sibling node.

Each index node of the at least two nodes may be associated with one or more child nodes. Such a child node includes at least one of another index node or a leaf node. The association includes, for each child node of the one more child nodes, storing a minimum index key associated with the child node in the index node and storing a source name associated with the child node in the index node. Each child node is associated with a minimum index key, where the minimum index key is a minimum value of one or more index keys associated with the child node (e.g., the minimum index key is a minimum value of one or more index keys associated with one or more children nodes of the child node or one or more data objects of the child node in accordance with the key type traits, sorted utilizing a comparing function of the key type traits to identify the minimum value when the child node is a leaf node). For example, index node 3_2 includes a minimum index key (e.g., of data object 3_1) and source name associated with leaf node 4_3. As another example, index node 3_3 includes a minimum index key and source name associated with leaf node 4_4 and another minimum index key and another source name associated with leaf node 4_5. As yet another example, index node 2_3 includes a minimum index key and source name associated with index node 3_4 and minimum index key and another source name associated with index node 3_5.

An index node is a sibling node of another index node when a minimum index key associated with the index node is ordered greater than a last minimum index key associated with the other index node, where the last minimum index key associated with the index node is sorted above any other last minimum index keys associated with any other lower order index nodes and where the minimum index key associated with the index node is ordered less than any other minimum index keys associated with any other higher order index nodes. For example, index node 3_2 is a sibling node to index node 3_1, index node 3_3 is a sibling node to index node 3_2, etc., index node 3_6 is a sibling node to index node 3_5 and index node 3_6 has no sibling node.

Figure 40B:
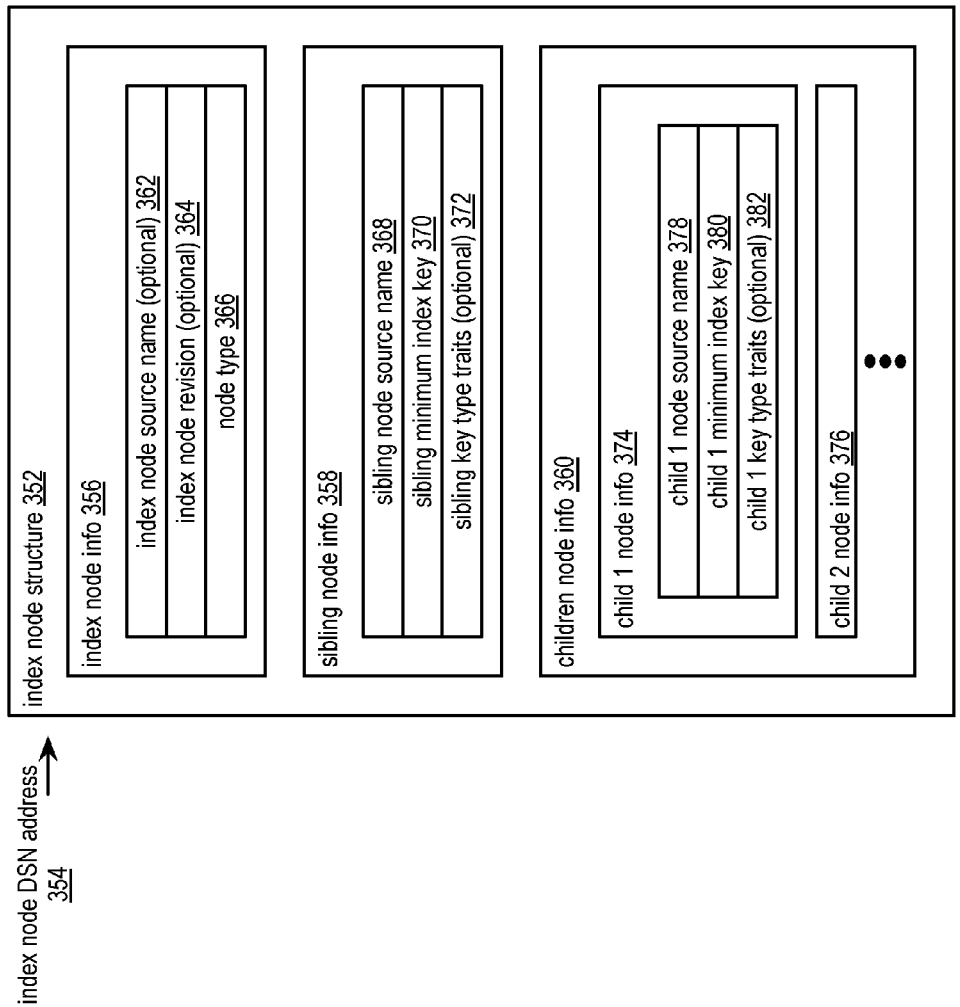
FIG. 40B is a diagram illustrating an example of an index node structure in accordance with the present invention.

FIG. 40B is a diagram illustrating an example of an index node structure 352 for an index node that includes index node information 356, sibling node information 358, and children node information 360. Alternatively, there is no sibling node information 358 when the index node has no sibling node. The index node information 356 includes one or more of an index node source name field 362, an index node revision field 364, and a node type field 366. Inclusion and/or use of the index node source name field 362 and the index node revision field 364 is optional.

The sibling node information 358 includes a sibling node source name field 368, a sibling minimum index key field 370, and a sibling key type traits field 372. Inclusion and/or use of the sibling key type traits field 372 is optional. The children node information 360 includes one or more child node information sections 374, 376, etc. corresponding to each child node of the index node. Each child node information section of the one or more child node information sections includes a corresponding child node source name field 378, a corresponding child minimum index key field 380, and a corresponding child key type traits field 382. For example, the corresponding child node source name field 378 of a child 1 node information section 374 includes a child 1 node source name entry. Inclusion and/or use of the corresponding child key type traits field 382 is optional.

The index node source name field 362 may include an index node dispersed storage network (DSN) address 354 entry (e.g., source name) corresponding to a storage location for the index node. The index node revision field 364 may include an index node revision entry corresponding to a revision number of information contained in the index node. Use of the index node revision field 364 enables generating two or more similar indexes while saving each revision of the two or more similar indexes. The node type field 366 includes a node type entry, where the node type entry indicates whether the node is a leaf node or not a leaf node. The node type indicates that the node is not a leaf node when the node is the index node.

The sibling node source name field 368 includes a sibling node source name entry (e.g., sibling node DSN address) corresponding to where a sibling node is stored in a DSN memory and/or a distributed storage and task network (DSTN) module when the index node has the sibling node as a sibling. The sibling node is another index node when the index node has the sibling. The sibling node source name field 368 may include a null entry when the index node does not have a sibling. The sibling minimum index key field 370 includes a sibling of minimum index key corresponding to the sibling node when the index node has the sibling node as the sibling. The sibling key type traits field 372 may include sibling key type traits corresponding to the sibling node when the index node has the sibling node as the sibling and when the sibling key type traits field is utilized. Alternatively, index structure metadata may include key type traits utilized globally for each node of the index structure.

The index structure metadata may include one or more of key type traits to be utilized for all nodes of a corresponding index, key type traits to be utilized for all index nodes of the corresponding index, key type traits to be utilized for all leaf nodes of the corresponding index, a source name of a root node of the index structure, a maximum number of index structure levels, a minimum number of the next level structures, a maximum number of elements per index structure level, a minimum number of elements per index structure level, and index revision number, and an index name. The index structure metadata may be utilized for one or more of accessing the index, generating the index, updating the index, saving the index, deleting portions of the index, adding a portion to the index, cloning a portion of the index, and searching through the index. The index structure metadata may be stored in one or more of a local memory, one or more nodes of the index structure, and as encoded metadata slices in at least one of the DSTN module and the DSN memory.

The child node source name field 378 includes a child node source name entry (e.g., child node DSN address) corresponding to a storage location for the child node. For example, a child 1 node source name field 378 of a child 1 node information section 374 includes a child 1 node source name. The child minimum index key field 380 includes a child minimum index key corresponding to the child node. For example, a child 1 minimum index key field 380 of the child 1 node information section 374 includes a child 1 minimum index key. The child key type traits field 382 may include child key type traits corresponding to the child node when the index node has the child node as the child and when the child key type traits field is utilized. Alternatively, the index structure metadata may include key type traits utilized globally for each node of the index structure.

Figure 40C:
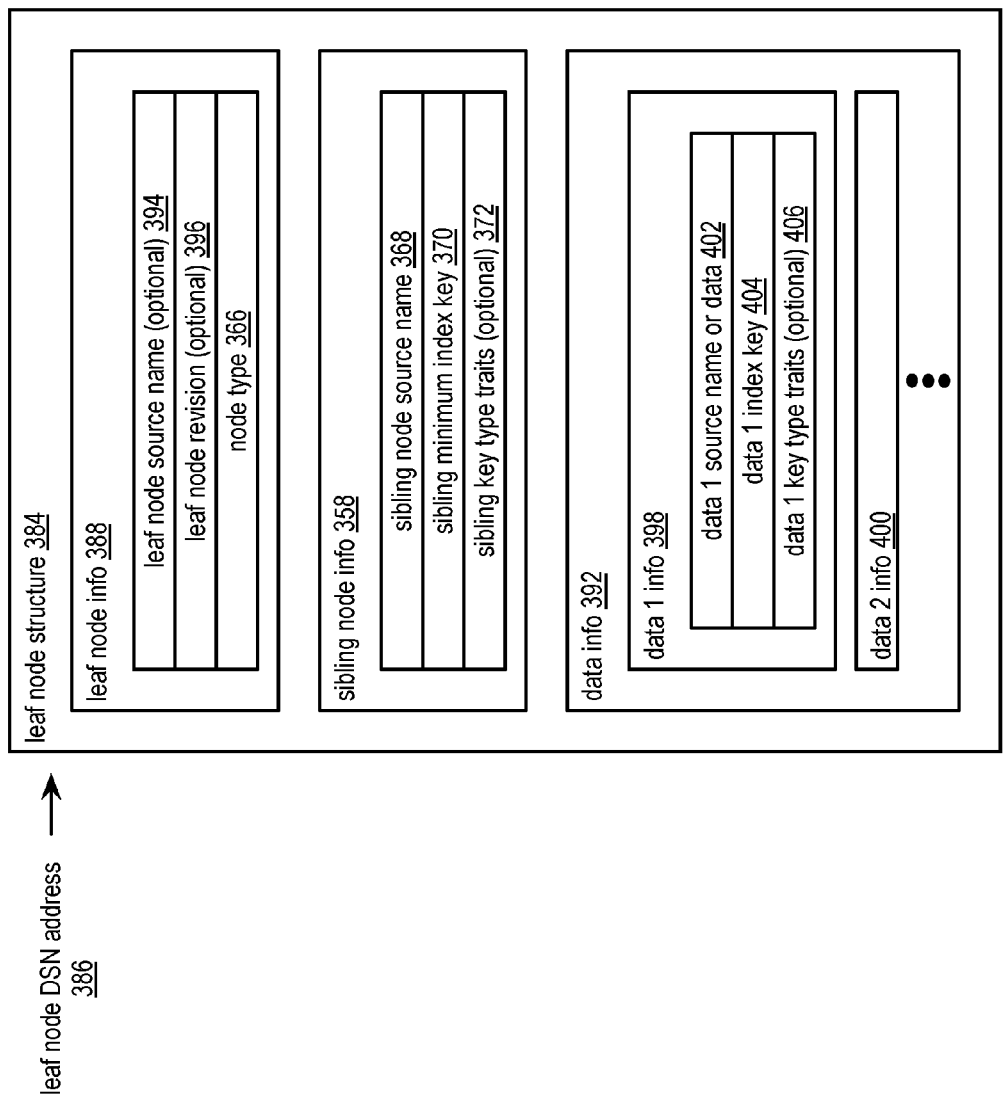
FIG. 40C is a diagram illustrating an example of a leaf node structure in accordance with the present invention.

FIG. 40C is a diagram illustrating an example of a leaf node structure 384 that includes leaf node information 388, sibling node information 358, and data information 392.

Alternatively, there is no sibling node information 358 when the leaf node has no sibling node. The leaf node information 388 includes one or more of a leaf node source name field 394, a leaf node revision field 396, and a node type field 366. Inclusion and/or use of the leaf node source name field 394 and the leaf node revision field 396 is optional. The sibling node information 358 includes a sibling node source name field 368, a sibling minimum index key field 370, and a sibling key type traits field 372. Inclusion and/or use of the sibling key type traits field 372 is optional. The data information 392 includes one or more data information sections 398, 400, etc. corresponding to each data object associated with the leaf node. Alternatively, the data information 392 includes null information when no data object is presently associated with the leaf node. Each data information section of the one or more data information sections includes a corresponding data (e.g., data object) source name or data field 402, a corresponding data index key field 404, and a corresponding data key type traits field 406. For example, the corresponding data source name field 402 of a data 1 node information section 398 includes a data 1 source name entry. Inclusion and/or use of the corresponding data key type traits field 406 is optional.

The leaf node source name field 394 may include a leaf node source name entry (e.g., leaf node distributed storage and task network (DSTN) address and/or a dispersed storage network (DSN) address) corresponding to a storage location of the leaf node. The leaf node revision field 396 may include a leaf node revision entry corresponding to a revision number of information contained in the leaf node. Use of the leaf node revision enables generating two or more similar indexes while saving each revision of the two or more similar indexes. The node type field 366 includes a node type, where the node type indicates whether the node is a leaf node or not a leaf node. The node type indicates that the node is a leaf node when the node is the leaf node.

The sibling node source name field 368 includes a sibling node source name entry (e.g., sibling node DSN address) corresponding to a storage location for a sibling when the leaf node has the sibling node as a sibling. The sibling node is another leaf node when the leaf node has the sibling. The sibling node source name field 368 may include a null entry when the leaf node does not have a sibling. The sibling minimum index key field 370 includes a minimum index key associated with the sibling node when the leaf node has the sibling node as the sibling. The sibling key type traits field 372 may include sibling key type traits corresponding to the sibling node when the leaf node has the sibling node as the sibling and when the sibling key type traits field 372 is utilized. Alternatively, index structure metadata may include key type traits utilized globally for each leaf node of the index structure.

The data source name or data field 402 includes at least one of a data source name entry (e.g., a DSN address) corresponding to a storage location of data and the data (e.g., a data object, one or more encoded data slices of data). For example, a data 1 source name or data field 402 of a data 1 information section 398 includes a DSN address source name of a first data object. As another example, the data 1 source name or data field 402 of the data 1 information section includes the data 1 data object. The data index key field 404 includes a data index key corresponding to the data. For example, a data 1 index key field order for of the data 1 information section 398 includes a data 1 index key. The data key type traits field 406 may include data key type traits corresponding to the data when the data key type traits field 406 is utilized. Alternatively, the index structure metadata may include key type traits utilized globally for each data object associated with the index structure.

Figure 40D:
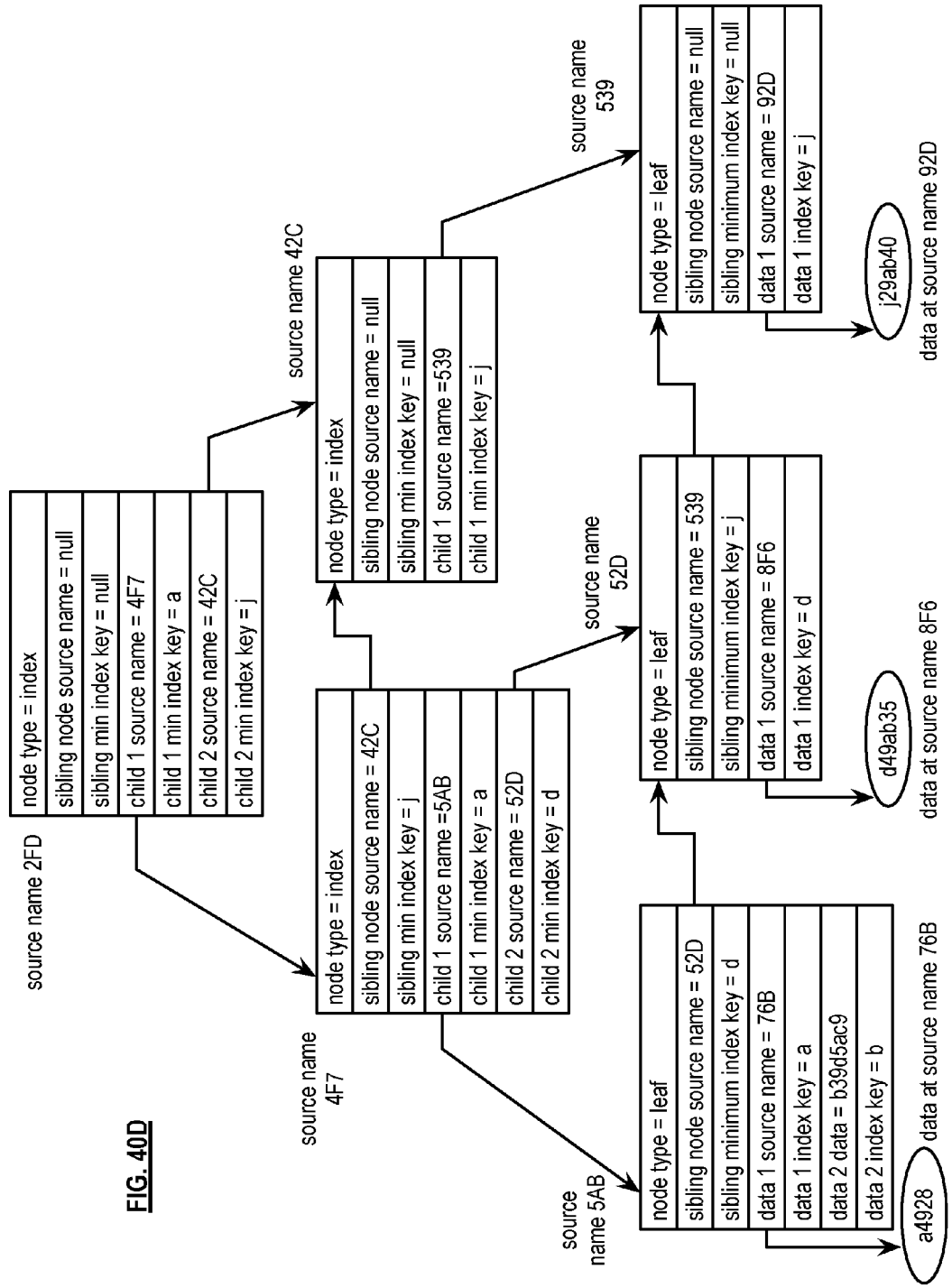
FIG. 40D is a diagram illustrating another example of an index structure in accordance with the present invention.

FIG. 40D is a diagram illustrating another example of an index structure of an example index utilized to access data stored in at least one of a dispersed storage network (DSN) memory and a distributed storage and task network (DSTN) module. In the example, the index structure includes three leaf nodes and three index nodes. Each of the three leaf nodes and the three index nodes are individually encoded using a dispersed storage error coding function to produce a set of corresponding node slices that are stored in the DSTN module. The index structure provides an index for three data objects stored in the DSTN module, where the data objects stored in the DSTN module utilizing source names 76B, 8F6, and 92D, and global key type traits includes a comparing function to sort string type index keys alphabetically. The data stored at source name 76B is associated with an index key of "a" as that data begins with a character "a". The data stored at source name 8F6 is associated with an index key of "d" as that data begins with a character "d". The data stored at source name 92D is associated with an index key of "j" as that data begins with a character "j".

A leaf node stored at source name 5AB includes a node type indicating a leaf node, a sibling node source name pointing to a leaf node stored at source name 52D, a sibling minimum index key of "d", a data 1 source name of 76B, a data 1 index key of "a", a data 2 direct data entry (e.g., b39d5ac9), and a data 2 index key of "b". The leaf node stored at source name 52D includes a node type indicating a leaf node, a sibling node source name pointing to a leaf node stored at source name 539, a sibling minimum index key of "j", a data 1 source name of 8F6, and a data 1 index key of "d". The leaf node stored at source name 539 includes a node type indicating a leaf node, a null sibling node source name (e.g., since last leaf node of leaf node level), a null sibling minimum index key, a data 1 source name of 92D, and a data 1 index key of "j".

An index node stored at source name 4F7 includes a node type indicating not a leaf node (e.g., index node), a sibling node source name pointing to an index node stored at source name 42C, a sibling minimum index key of "j", a child 1 source name of 5AB, a child 1 minimum index key of "a", a child 2 source name of 52D, and a child 2 minimum index key of "d". The index node stored at source name 42C includes a node type indicating not a leaf node (e.g., index node), a null sibling node source name (e.g., since last index node of an index node level), a null sibling minimum index key, a child 1 source name of 539, and a child 1 minimum index key of "j". An index node (e.g., a root node) stored at source name 2FD includes a node type indicating not a leaf node (e.g., index node), a null sibling node source name (e.g., since root node), a null sibling minimum index key, a child 1 source name of 4F7, a child 1 minimum index key of "a", a child 2 source name of 42C, and a child 2 minimum index key of "j". An example of utilizing the index in accordance with the index structure to access data is discussed with reference to FIG. 40E.

Figure 40E:
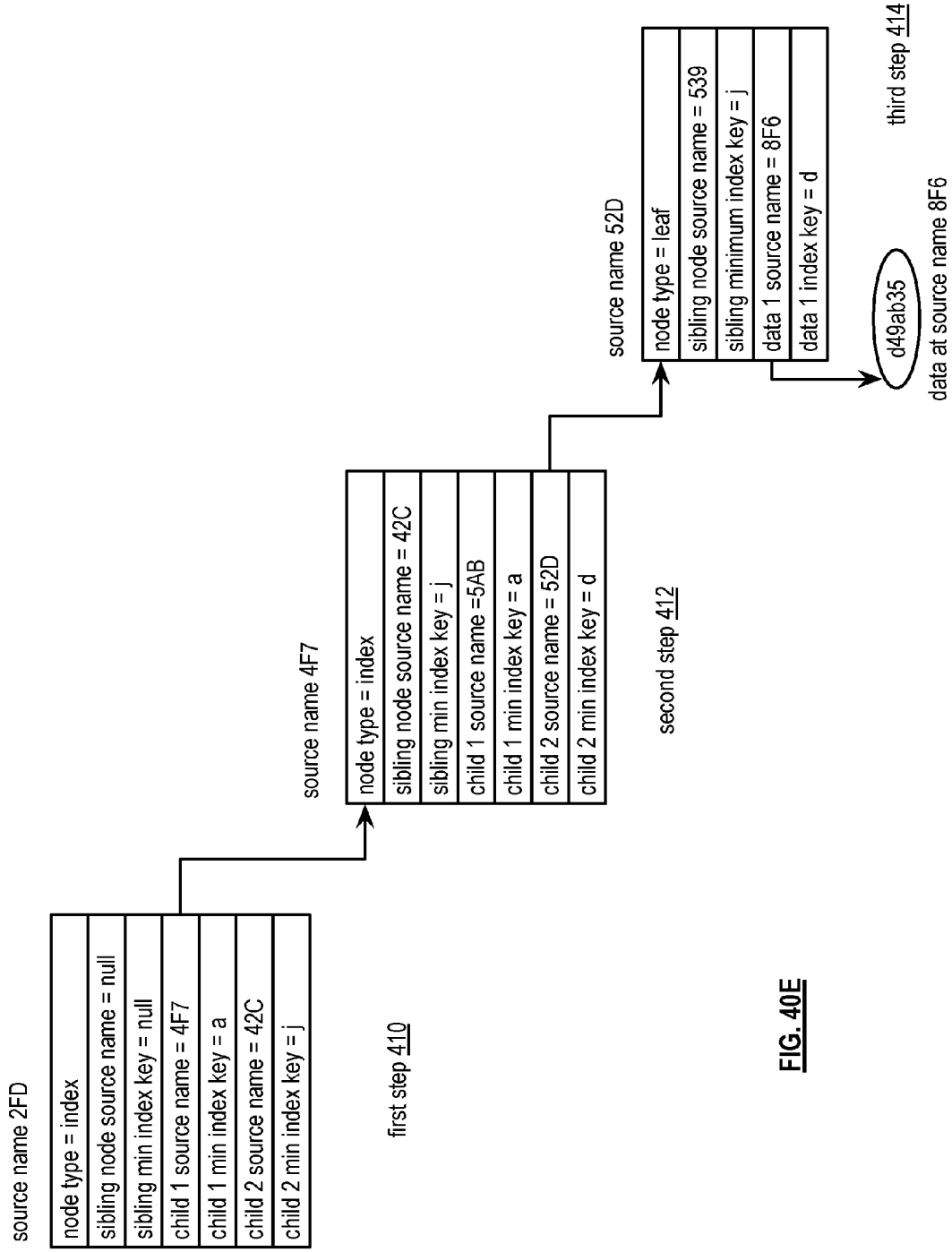
FIG. 40E is a diagram illustrating an example of searching an index in accordance with the present invention.

FIG. 40E is a diagram illustrating an example of searching the index represented by the index structure of FIG. 40D. The index structure of FIG. 40D indicated that six index files are individually stored in a distributed storage and task network (DSTN) module where the six index files correspond to the three index nodes and the three leaf nodes. The searching example includes retrieving a data object based on a search attribute. The retrieving includes a series of steps 410-414. Such steps includes a first step 410 to access a root node of the index, a second step 412 to access and search one or more index nodes to identify a leaf node corresponding to the data object, a third step 414 to obtain a DSTN address of the data object from the identified leaf node, and a final step to retrieve the data object from the DSTN module utilizing the DSTN address. Each of the retrieving steps includes retrieving one index file of the six index files at a time based on one or more of the search attribute and a result of a preceding retrieving step. As such, a system synchronization and performance improvement is provided since only one index file of the six index files is retrieved at a given step and never is retrieval of the entire index required.

In the data object retrieval example, data object (e.g., d49ab35) is to be retrieved from the DSTN module using DSTN address 8F6. The search attribute includes a letter "d" as the data object starts with a letter "d". In a first step, a root node source name of 2FD is extracted from index metadata associated with alphabetical searches and the root node is retrieved from the DSTN module using the source name 2FD (e.g., a set of root slice names are generated using the source name 2FD, a set of read slice requests are generated that includes the set of root slice names, the set of read slice requests are output to the DSTN module, root slices are received, and the root slices are decoded using a dispersed storage error coding function to produce the root node). Next, the search attribute letter "d" is compared to minimum index key entries of the root node utilizing a comparing function to select a child 1 source name of 4F7 since "d" is greater than "a" but less than "j".

Next, an index node stored at source name address 4F7 is retrieved and the letter "d" is compared to minimum index entries of the index node utilizing the comparing function to select a child 2 source name of 52D since "d" is greater than "a", greater than or equal to "d", and less than the sibling minimum index key of "j". A leaf node stored at source name 52D is accessed and the node type is determined to be a leaf node. When the node is the leaf node, the letter "d" is compared to index key entries of the leaf node to identify the data stored at source name 8F6. The data stored at source name 8F6 is retrieved. The method to retrieve a data object using an index in accordance with a distributed index structure is discussed in greater detail with reference to FIGS. 40F, 40G, 40H, and 40I.

Figure 40F:
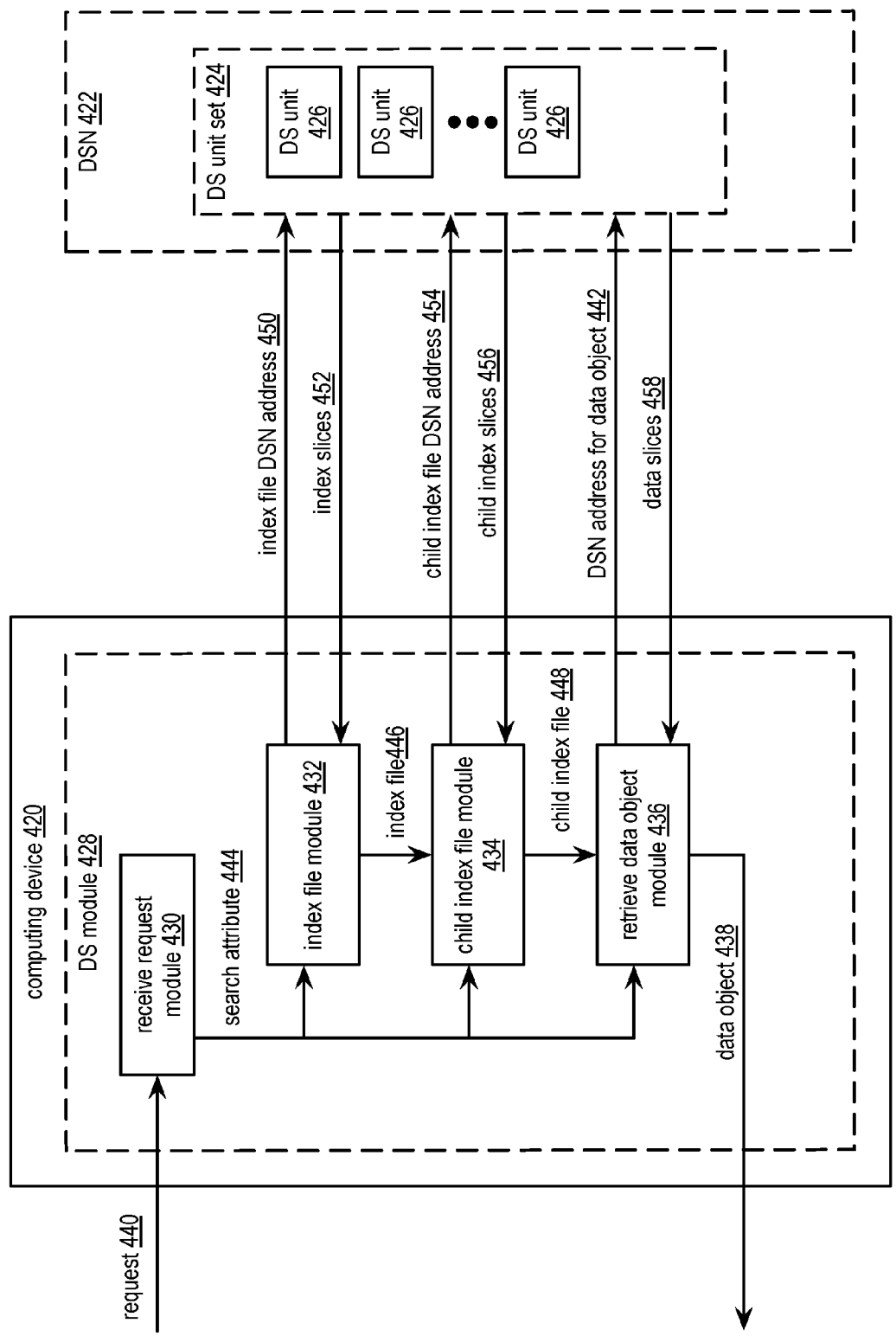
FIG. 40F is a diagram illustrating an example of a dispersed storage system in accordance with the present invention.

FIG. 40F is a diagram illustrating an example of a dispersed storage system that includes a computing device 420 and a dispersed storage network (DSN) 422. The DSN 422 may be implemented utilizing one or more of a dispersed storage network memory, a distributed storage and task network (DSTN), and a DSTN module. The DSN 422 includes at least one dispersed storage (DS) unit set 424. A DS unit set 424 of the at least one DS unit set 424 includes a set of DS units 426. Each DS unit 426 of the set of DS units 426 may be implemented utilizing at least one of a storage server, a storage unit, a storage module, a memory device, a memory, a distributed storage and task (DST) execution unit, a user device, a DST processing unit, and a DST processing module. The computing device 420 may be implemented utilizing at least one of a server, a storage unit, a storage server, a storage module, a DS processing unit, a DS unit, a DST execution unit, a user device, a DST processing unit, and a DST processing module. The computing device 420 includes a dispersed storage (DS) module 428. The DS module 428 includes a receive request module 430, an index file module 432, a child index file module 434, and a retrieve data object module 436.

The system functions to retrieve a data object 438 from the DSN 422. The retrieving includes receiving a request 440 to retrieve the data object 438, obtaining a DSN address 442 for the data object 438, and retrieving the data object 438 using the DSN address 442 for the data object 438. The obtaining the DSN address 442 for the data object 438 includes accessing at least two index files retrieved from the DSN 422. The at least two index files includes an index file 446 and a child index file 448. The index file 446 includes an index node of a distributed index structure retrieved from the DSN 422 and the child index file 448 includes at least one of another index node and a leaf node of the distributed index structure.

The receive request module 430 receives the request 440 to retrieve the data object 438. The request 440 includes a search attribute 444 regarding the data object 438. The request 440 may further include one or more of a data object identifier (ID), a comparing function, comparing criteria, search criteria, a pathname, an object ID, a DSN address of the index file, a distributed index structure name, a distributed index structure type, a distributed index structure ID, a root node DSN address, a leaf node DSN address, a DSN address of metadata of the distributed index structure, a requesting entity ID, and a user ID. The receive request module 430 may modify the search attribute 444 based on one or more of a query, a lookup based on the request 440, and accessing index metadata. For example, the receive request module 430 updates the search attribute 444 to include what to look for (e.g., search for "d") from the received search attribute 444 and how to look for the data object 438 (e.g., alphabetical comparing) from index metadata associated with an distributed index structure type based on the request 440 (e.g., specified by a distributed index structure type of the request).

The index file module 432 performs a series of steps with regards to accessing the index file 446 that includes the index node. In a first step, the index file module 432 determines the DSN address 450 for the index file 446 based on the search attribute 444. For example, the index file module 432 extracts a root node DSN address from metadata of an identified distributed index structure based on a distributed index structure type associated with the search attribute 444. In a second step, the index file module 432 retrieves a set of encoded index data slices 452 from the DSN 422 based on the DSN address 450 for the index file 446. For example, the index file module 432 generates a set of index slice names using the DSN address 450 for the index file 446, generates a set of read slice requests that includes the set of index slice names, outputs the set of read slice requests to the DSN 422, and receives the set of encoded index data slices 452. In a third step, the index file module 432 decodes the set of encoded index data slices 452 to reconstruct the index file 446. The index file 446 includes a plurality of DSN child index addresses regarding a plurality of child index files.

The child index file module 434 performs a series of steps with regards to accessing the child index file 448 of the plurality of child index files. In a first step, the child index file module 434 identifies one child index file 448 of the plurality of child index files based on the search attribute 444. The index file module 432 identifies the one child index file 448 of the plurality of child index files by comparing the search attribute 444 to an index key associated with the one child index file 448 of the plurality of child index files and identifying the one child index file 448 of the plurality of child index files when the comparing is favorable. For example, the child index file module 434 identifies a minimum index key that sorts less than or equal to the search attribute 444 in accordance with a trait ordering and sorts greater than any other minimum index key which each sort less than the search attribute 444. In a second step, the child index file module 434 retrieves a set of encoded child index data slices from the DSN 422 based on one DSN child index address 454 of the plurality of DSN child index addresses corresponding to the one child index file 448 of the plurality of child index files. For example, the child index file module 434 identifies the one DSN child index address 454 that is associated with the identified minimum index key, generates a set of child index slice names using the one DSN child index address 454, generates a set of read slice requests that includes the set of child index slice names, outputs the set of read slice requests to the DSN 422, and receives the set of encoded child index data slices 456. In a third step, the child index file module 434 decodes the set of encoded child index data slices 456 to reconstruct the one child index file 448 of the plurality of child index files.

The retrieve data object module 436 performs a series of steps with regards to retrieving the data object 438 using the DSN address 442 for the data object 438. In a first step, the retrieve data object module 436 determines whether the one child index file 448 of the plurality of child index files includes the DSN address 442 for the data object 438. The retrieve data object module 436 determines whether the one child index file 448 of the plurality of child index files includes the DSN address 442 by interpreting an index file type indicator of the one child index file 448 of the plurality child index files and when the index file indicator of the one child index file 448 of the plurality child index files is a leaf node, determining that the one child index file 448 of the plurality child index files includes the DSN address 442. In a second step, the retrieve data object module 436, when the one child index file 448 of the plurality of child index files includes the DSN address 442 for the data object 438, retrieves a plurality of sets of encoded data slices 458 based on the DSN address 442 for the data object 438. For example, the retrieve data object module 436 compares the search attribute 444 to one or more index keys extracted from the one child index file 448 to select one index key where the index key is associated with the data object 438, retrieves the DSN address 442 that is associated with the selected one index key, and retrieves the plurality of sets of encoded data slices 458 using the DSN address 442 (e.g., generate data slice names, generate read slice requests that includes the data slice names, output the read slice requests to the DSN 422, receive the plurality of sets of encoded data slices 458). In a third step, the retrieve data object module 436 decodes the plurality of sets of encoded data slices 458 to recapture the data object 438.

Alternatively, the data object 438 may be stored in the one child index file 448 of the plurality of child index files. The retrieve data object module 436 further functions to determine whether the one child index file 448 of the plurality of child index files includes the data object 438. When the one child index file 448 of the plurality of child index files includes the data object 438, the retrieve data object module 436 responds to the request 440 with the data object 438 from the one child index file 448 of the plurality of child index files. For example, the retrieve data object module 436 extracts the data object 438 from the one child index file 448 of the plurality of child index files and outputs the data object 438 to the requesting entity.

Alternatively, the one child index file 448 of the plurality of child index files may not include the DSN address 442 for the data object 438 and may not include the data object 438. When the one child index file 448 of the plurality of child index files does not include the DSN address 442 for the data object 438, the retrieve data object module 436 enters a loop where the retrieve data object module 436 performs a series of steps with regards to the determining whether the one child index file 448 of the plurality of child index files includes the DSN address 442. In a first step of the loop, the retrieve data object module 436 identifies, from the one child index file 448 of the plurality of child index files, one of another plurality of child index files based on the search attribute. In a second step of the loop, the retrieve data object module 436 retrieves another set of encoded child data slices from the DSN 422 based on one of another plurality of DSN child index addresses corresponding to the one of the other plurality of child index files. In a third step of the loop, the retrieve data object module 436 decodes the other set of encoded child data slices to reproduce the one of the other plurality of child index files. In a fourth step of the loop, the retrieve data object module 436 determines whether the one of the other plurality child index files includes the DSN address 442 for the data object 438. When the one of the other plurality child index files does not include the DSN address 442 for the data object 438, the retrieve data object module 436 repeats the loop in accordance with the one of the other plurality child index files. When the one of the other plurality of child index files includes the DSN address 442 for the data object 438, the retrieve data object module 436 exits the loop (e.g., and subsequently retrieves the data object 438 utilizing the DSN address 442 for the data object 438).

Figure 40G:
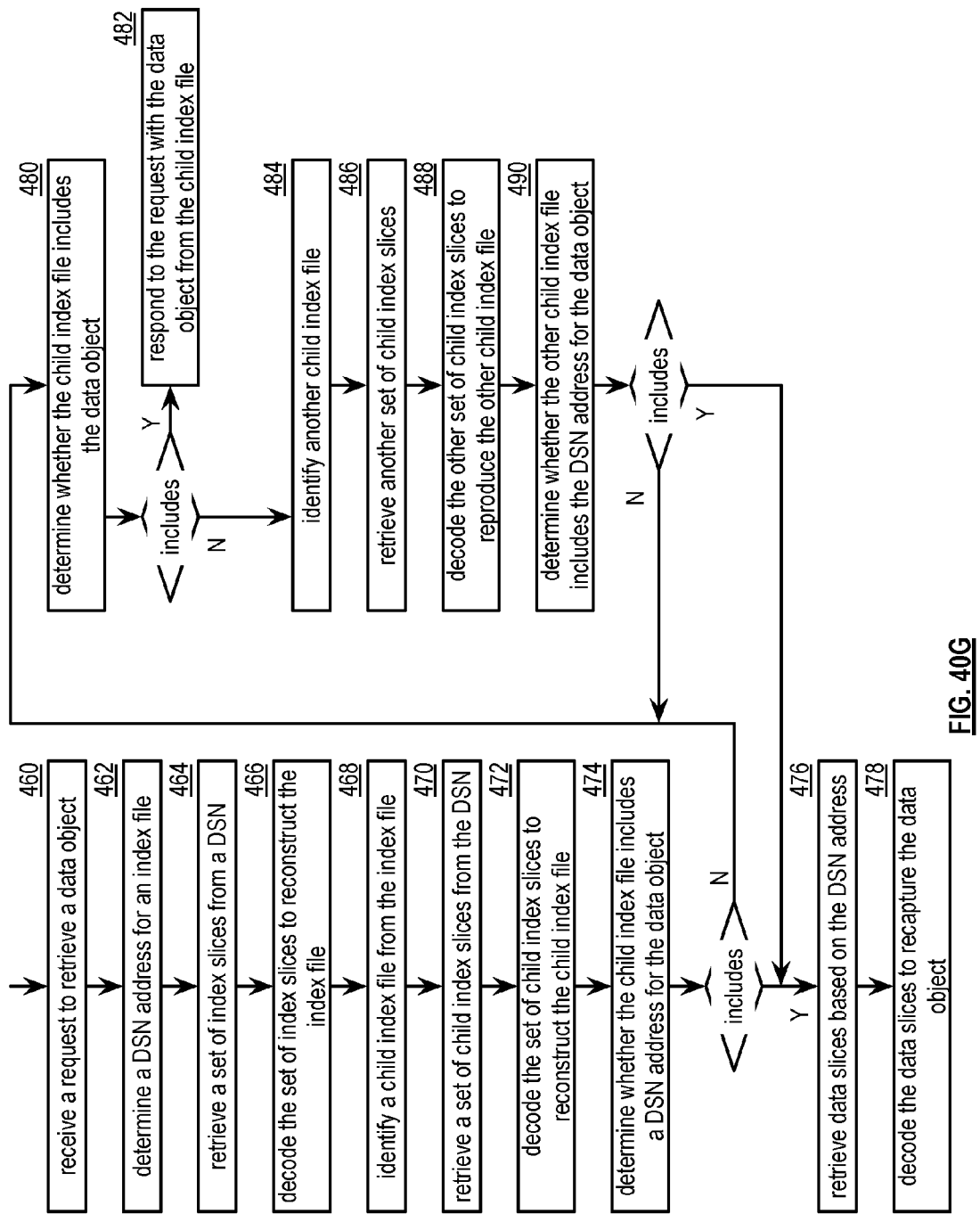
FIG. 40G is a flowchart illustrating an example of accessing data in accordance with the present invention.

FIG. 40G is a flowchart illustrating an example of accessing data. The method begins at step 460 where a processing module (e.g., of a dispersed storage (DS) processing unit) receives a request to retrieve a data object, where the request includes a search attribute regarding the data object. The method continues at step 462 where the processing module determines a dispersed storage network (DSN) address for an index file based on the search attribute. The method continues at step 464 where the processing module retrieves a set of encoded index data slices from a DSN based on the DSN address. The method continues at step 466 where the processing module decodes the set of encoded index data slices to reconstruct the index file. The index file includes a plurality of DSN child index addresses regarding a plurality of child index files.

The method continues at step 468 where the processing module identifies one of the plurality of child index files based on the search attribute. The identifying the one of the plurality of child index files includes comparing the search attribute to an index key associated with the one of the plurality of child index files and identifying the one of the plurality of child index files when the comparing is favorable. The method continues at step 470 where the processing module retrieves a set of encoded child index data slices from the DSN based on one of the plurality of DSN child index addresses corresponding to the one of the plurality of child index files. The method continues at step 472 where the processing module decodes the set of encoded child index data slices to reconstruct the one of the plurality of child index files.

The method continues at step 474 where the processing module determines whether the one of the plurality of child index files includes a DSN address for the data object. The determining whether the one of the plurality of child index files includes the DSN address includes interpreting an index file type indicator of the one of the plurality child index files and when the index file indicator of the one of the plurality child index files is a leaf node, determining that the one of the plurality child index files includes the DSN address. The method branches to step 480 when the one child index file does not include the DSN address. The method continues to step 476 when the one child index file includes the DSN address.

When the one of the plurality of child index files includes the DSN address for the data object, the method continues at step 476 where the processing module retrieves a plurality of sets of encoded data slices based on the DSN address for the data object. The method continues at step 478 where the processing module decodes the plurality of sets of encoded data slices to recapture the data object.

When the one of the plurality of child index files does not include the DSN address for the data object, the method continues at step 480 where the processing module determines whether the one of the plurality of child index files includes the data object. The method branches to step 484 when the one child index file does not include the data object. The method continues to step 482 when the one child index file includes the data object. When the one of the plurality of child index files includes the data object, the method continues at step 482 where the processing module responds to the request with the data object from the one of the plurality child index files.

When the one of the plurality of child index files does not include the DSN address for the data object and the one of the plurality of child index files does not include the data object, the method continues at step 484 where the processing module identifies, from the one of the plurality of child index files, one of another plurality of child index files based on the search attribute. The method continues at step 486 where the processing module retrieves another set of encoded child data slices from the DSN based on one of another plurality of DSN child index addresses corresponding to the one of the other plurality of child index files. The method continues at step 488 to the processing module decodes the other set of encoded child data slices to reproduce the one of the other plurality of child index files.

The method continues at step 490 where the processing module determines whether the one of the other plurality child index files includes the DSN address for the data object. When the one of the other plurality child index files does not include the DSN address for the data object, the method loops back to step 480 in accordance with the one of the other plurality child index files. When the one of the other plurality of child index files includes the DSN address for the data object, the method branches to step 476.

Figure 40H:
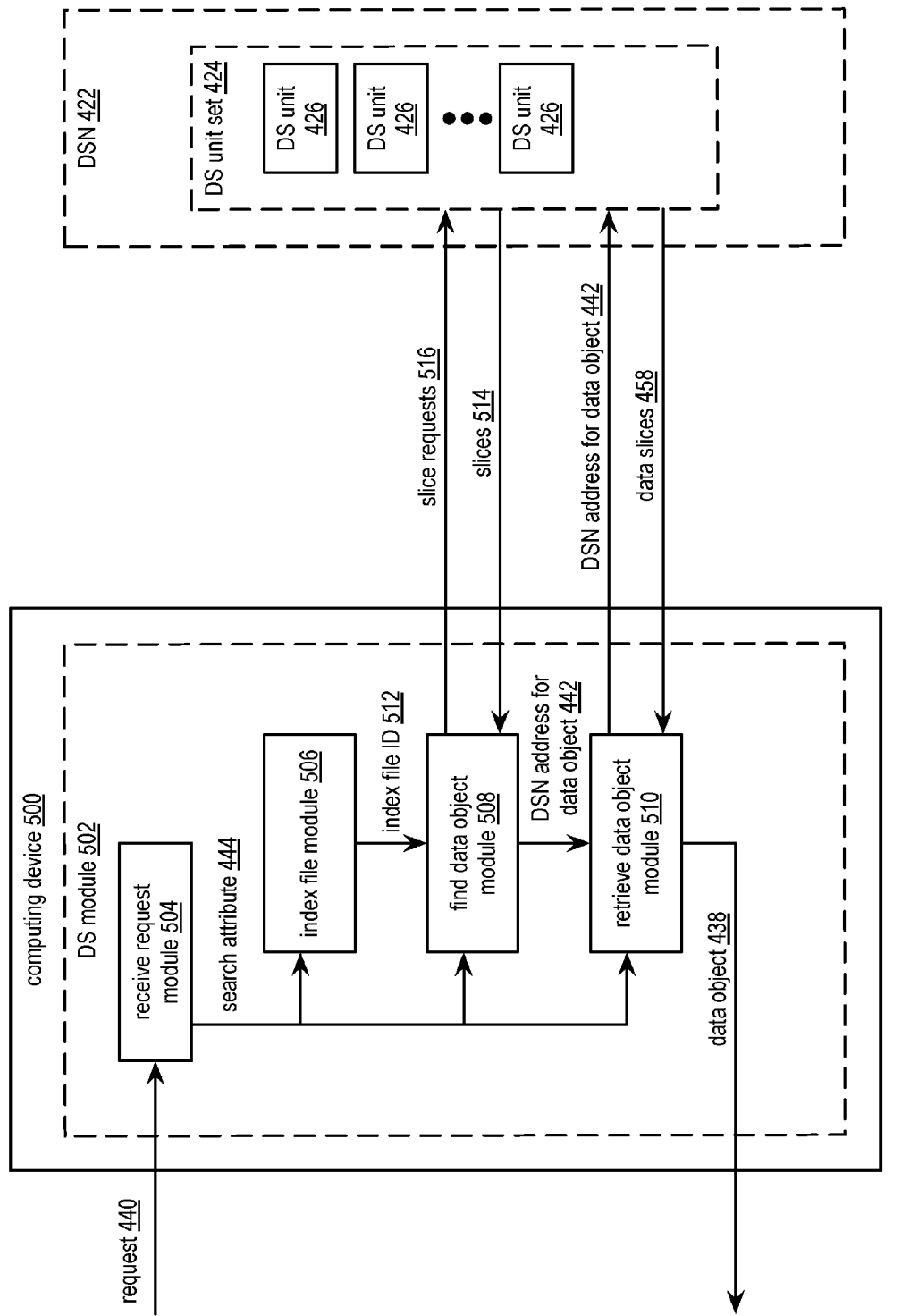
FIG. 40H is a diagram illustrating another example of a dispersed storage system in accordance with the present invention.

FIG. 40H is a diagram illustrating another example of a dispersed storage system that includes a computing device 500 and a dispersed storage network (DSN) 422. The DSN 422 may be implemented utilizing one or more of a dispersed storage network memory, a distributed storage and task network (DSTN), and a DSTN module. The DSN 422 includes at least one dispersed storage (DS) unit set 424. A DS unit set 424 of the at least one DS unit set 424 includes a set of DS units 426. Each DS unit 426 of the set of DS units 426 may be implemented utilizing at least one of a storage server, a storage unit, a storage module, a memory device, a memory, a distributed storage and task (DST) execution unit, a user device, a DST processing unit, and a DST processing module. The computing device 500 includes a dispersed storage (DS) module 502. The DS module 502 includes a receive request module 504, an index file module 506, a find data object module 508, and a retrieve data object module 510.

The system functions to retrieve a data object 438 from the DSN 422. The retrieving includes receiving a request 440 to retrieve the data object 438, obtaining a DSN address 442 for the data object 438, and retrieving the data object 438 using the DSN address 442 for the data object 438. The obtaining the DSN address 442 for the data object 438 includes identifying an index file identifier (ID) 512 of an index file (e.g., a starting point) and searching a distributed index structure for an index file that includes the DSN address. The distributed index structure includes a plurality of index files stored in the DSN 422. The plurality of index files includes the index file (e.g., starting point). The index file that includes the DSN address includes a leaf node of the distributed index structure. Other index files of the plurality of index files includes one or more index nodes of the distributed index structure.

The receive request module 504 receives the request 440 to retrieve the data object 438. The request 440 includes a search attribute 444 regarding the data object 438. The request 440 may further include one or more of a data object identifier (ID), a comparing function, comparing criteria, search criteria, a pathname, an object ID, the index file ID 512, a DSN address of the index file, a distributed index structure name, a distributed index structure type, a distributed index structure ID, a root node DSN address, a leaf node DSN address, a DSN address of metadata of the distributed index structure, a requesting entity ID, and a user ID. The receive request module 504 may modify the search attribute 444 based on one or more of a query, a lookup based on the request 440, and accessing index metadata.

The index file module 506 identifies the index file ID 512 of the index file based on the search attribute 444. The index file module 506 may identify the starting point index file from one of a plurality of root index files based on the search attribute 444. For example, the index file module 506 compares a distributed index structure type associated with the search attribute 444 to each distributed index structure type associated with each of the plurality of root index files and when a comparison is favorable, identifies a root index file ID associated with the favorable comparison as the index file ID 512.

The find data object module 508 performs a series of steps with regards to searching the distributed index structure for the index file that includes the DSN address 442 of the data object 438. In a first step of a loop, the find data object module 508 determines a DSN address for a current index file, where the current index file is the index file or another index file. For example, the find data object module 508 performs a lookup using the index file ID 512 to retrieve the DSN address for the current index file from a metadata file associated with the distributed index structure. In a second step, the find data object module 508 retrieves a set of encoded data slices 514 from the DSN 422 based on the DSN address (e.g., generate slice names using the DSN address, generate read slice requests 516 that includes the slice names, output the read slice requests 516 to the DSN 422, receive the set of encoded data slices 514). In a third step, the find data object module 508 decodes the set of encoded data slices 514 to reproduce the current index file.

In a fourth step with regards to searching the distributed index structure for the index file that includes the DSN address 442, the find data object module 508 determines whether the current index file includes the DSN address 442 for the data object 438. The find data object module 508 determines whether the current index file includes the DSN address 442 by interpreting an index file type indicator of the current index file and when the index file indicator of the current index file is a leaf node, determining that the current index file includes the DSN address 442. The find data object module 508 further functions to determine whether the current index file includes the data object 438 and when the current index files includes the data object 438, exits the loop and responds to the request 440 with the data object 438 from the current index file.

When the current index file does not include the DSN address 442 for the data object 438, a fifth step with regards to searching the distributed index structure for the index file that includes the DSN address 442 includes the find data object module 508 identifying the other index file from a plurality of index files indexed by the current index file based on the search attribute 444 and repeating the loop for the other index file. The find data object module 508 identifies the other index file by comparing the search attribute 444 to an index key associated with the other index file and identifies the other index file when the comparing is favorable. For example, the find data object module 508 identifies, within the current index file, a minimum index key associated with the other index file that sorts less than or equal to the search attribute 444 in accordance with a trait ordering and sorts greater than any other minimum index key within the current index file which each sort less than the search attribute 444. When the current index file includes the DSN address 442 for the data object 438, the loop ends and the find data object module 508 provides the DSN address 442 to the retrieve data object module 510. The retrieve data object module 510 retrieves a plurality of sets of encoded data slices 458 based on the DSN address 442 (e.g., outputting a plurality of sets of read slice requests to the DSN 422 using the DSN address 442) for the data object 438 and decodes the plurality of sets of encoded data slices 458 to recapture the data object 438.

Figure 40I:
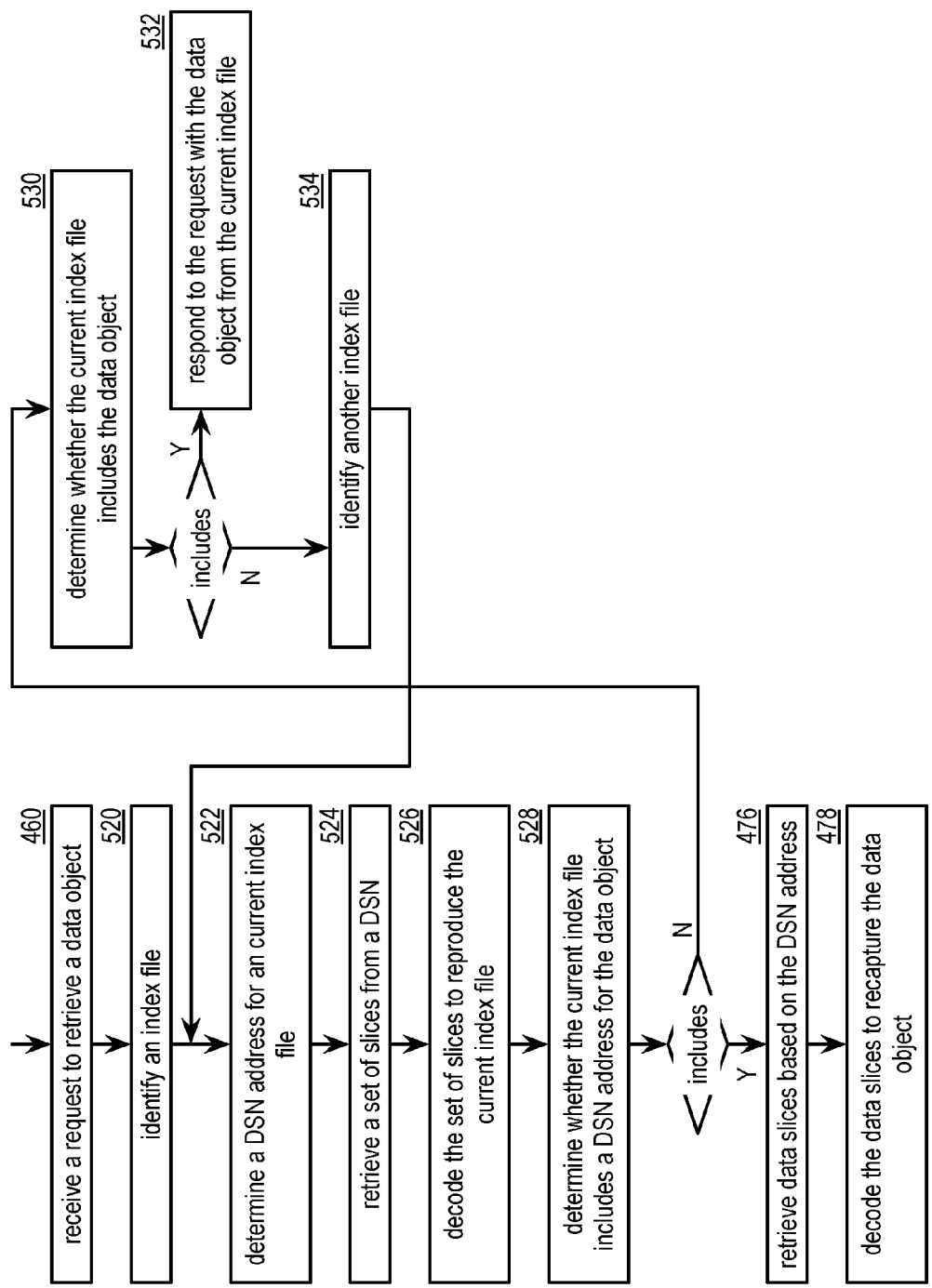
FIG. 40I is a flowchart illustrating another example of accessing data in accordance with the present invention.

FIG. 40I is a flowchart illustrating another example of accessing data, which includes similar steps to FIG. 40G. The method begins with step 460 of FIG. 40G where a processing module (e.g., of a dispersed storage (DS) processing unit) receives a request to retrieve a data object, where the request includes a search attribute regarding the data object. The method continues at step 520 where the processing module identifies an index file based on the search attribute. The identifying the index file includes identifying the index file from one of a plurality of root index files based on the search attribute (e.g., matching a distributed index structure type associated with the request to a distributed index structure type of one root index file of the plurality of root index files).

The method continues at step 522 where the processing module determines a dispersed storage network (DSN) address for a current index file where the current index file is the index file or another index file. The method continues at step 524 where the processing module retrieves a set of encoded data slices from a DSN based on the DSN address. The method continues at step 526 where the processing module decodes the set of encoded data slices to reproduce the current index file.

The method continues at step 528 where the processing module determines whether the current index file includes the DSN address for the data object. The determining whether the current index file includes the DSN address includes interpreting an index file type indicator of the current index file and when the index file indicator of the current index file is a leaf node, determining that the current index file includes the DSN address. The method branches to step 530 when the current index file does not include the DSN address. The method continues to step 476 of FIG. 40G when the current index file includes the DSN address. When the current index file includes the DSN address for the data object, the method continues with steps 476 and 478 of FIG. 40G where the processing module retrieves a plurality of sets of encoded data slices based on the DSN address for the data object and decodes the plurality of sets of encoded data slices to recapture the data object.

When the current index file does not include the DSN address for the data object, the method continues at step 530 where the processing module determines whether the current index file includes the data object. The method branches to step 534 when the current index file does not include the data object. The method continues to step 532 when the current index file includes the data object. When the current index file includes the data object, the method continues at step 532 where the processing module responds to the request with the data object from the current index file.

When the current index file does not include the DSN address for the data object and the current index file does not include the data object, the method continues at step 534 where the processing module identifies the other index file from a plurality of index files indexed by the current index file based on the search attribute. The identifying the other index file includes comparing the search attribute to an index key associated with the other index file and identifying the other index file when the comparing is favorable. The method loops back to step 522 for the other index file.

Figure 41D:
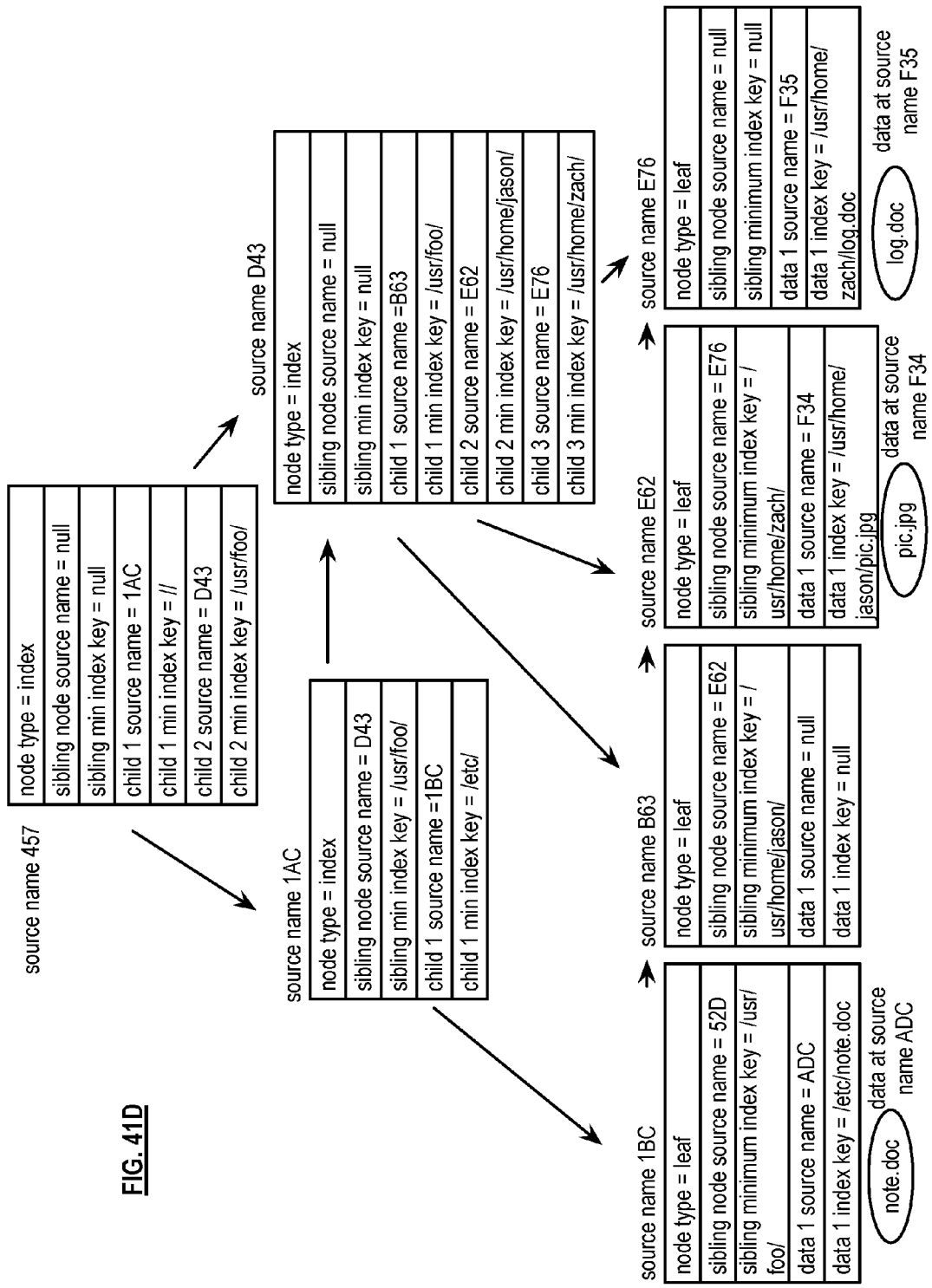
FIG. 41D is a diagram illustrating another example of an index structure in accordance with the present invention.

FIG. 41A is a diagram illustrating an example of a legacy directory structure 540 that may be utilized to access three data objects including pic.jpg, log.doc, and note.doc. The legacy directory structure 540 includes four pathname levels from a directory root to a data object of the three data objects. For example, the data object pic.jpg is associated with a four level pathname of /usr/home/jason/pic.jpg. As another example, the data object log.doc is associated with a four level pathname of /usr/home/zach/log.doc. as yet another example, the data object note.doc is associated with a two level pathname of /etc/note.doc. Another pathname of/usr/foo/ is not associated yet with a data object. The legacy directory structure 540 may be converted to one or more index structures to provide an index to the three data objects in accordance with an index structure generation approach. The index generation approach includes one or more of index structure metadata, a number of node levels generation method, and a number of nodes per node levels generation method. Such an index structure generation approach is discussed in greater detail with reference to FIGS. 41B-41D.

FIG. 41B illustrates an example of an index list by level 542, where the example index list by level 542 is generated from the example legacy directory structure of FIG. 41A in accordance with an index structure generation approach. Such an index list by level may be utilized to generate an index structure. The index list by level 542 includes a plurality of entries, where the entries are associated with one or more fields and where the fields include a level field 544, an original value field 546, a leaf source name field 548, and one or more index source name fields 550-552.

The level field 544 includes a level entry corresponding to a pathname level of the entry. The original value field 546 includes an original value entry corresponding to the pathname of the entry. The leaf source name field 548 includes a source name of a leaf node of the index structure corresponding to one or more original values. The one or more index source name fields 550-552 corresponds to at least one level of index nodes of the index structure and further indicates a source name of an index node corresponding to one or more leaf nodes of the index structure. An entry of the index source name field indicates a source name of an index node that is a parent to one or more child nodes, where one or more source names associated with the one or more child nodes are entries of a leaf or index source name field immediately to the left of the index source name field. A last index source name field 552 includes an entry of a source name of an index node that is a root node of the index structure.

In an example, a first step of the index structure generation approach includes a comparing method to sort each pathname of a plurality of path names associated with the legacy directory structure to generate a list. For instance, the comparing method includes starting with a pathname level of one and sorting by increasing pathname levels and further includes alphabetically sorting each entry of a common pathname level. As such, a first pathname level includes an original value of the legacy directory of "/"; a second pathname level includes an original value of the legacy directory of "/etc/", an original value of the legacy directory of "/etc/note.doc, and an original value of the legacy directory of "/user/"; a third pathname level includes original values of the legacy directory including "user/foo/" and "/usr/home/"; and a fourth pathname level includes original values of the legacy directory including "user/home/jason/", "/user/home/jason/pic.jpg", "/user/home/zach/", and "/user/home/zach/log.doc".

A second step of the index structure generation approach includes partitioning the list of original values into a set of leaf node partitions, where each leaf node partition of the set of leaf node partitions is associated with a leaf node of a set of leaf nodes and wherein each leaf node partition may be associated with original values of contiguous pathname levels. For example, original value entries associated with pathname levels one and two are partitioned from the list to form a first leaf node partition associated with a leaf node with a leaf source name of 1BC, original value entries associated with a pathname level of three are partitioned from the list to form a second leaf node partition associated with a leaf node with a leaf source name of B63, original value entries of /usr/home/jason and /usr/home/jason/pic.jpg associated with a pathname level of four are partitioned from the list to form a third leaf node partition associated with a leaf node with a leaf source name of E62, and original value entries of /usr/home/zach and /usr/home/zach/log.doc associated with the pathname level of four are partitioned from the list to form a fourth leaf node partition associated with a leaf node with a leaf source name of E76.

A third step of the index structure generation approach includes associating the set of leaf nodes with a set of one or more index nodes of one or more index node levels. For example, the leaf node with the leaf source name of 1BC is associated with an index node with an index source name of 1AC, the leaf nodes with leaf source names of B63, E62, and E76 are associated with an index node with an index source name of D43, the index nodes with the index source names of 1AC and D43 are associated with an index node with an index source name of 457 (e.g., a root node).

FIG. 41C is a flowchart illustrating an example of generating an index structure. The method begins at step 554 where a processing module (e.g., of a distributed storage and task (DST) client module) establishes a first level of an index list by level as a current level. The method continues at step 556 where the processing module sorts the index list by level of legacy directory values in accordance with the comparing function to produce a sorted list of candidate node minimum index key values. For example, an index list by level represented in FIG. 41B is created by sorting pathname levels of a legacy directory illustrated in FIG. 41A by pathname level and alphabetically in accordance with the comparing function.

The method continues at step 558 where the processing module partitions the sorted list to produce index key minimum values for a set of leaf nodes. For example, the index list by level represented in FIG. 41B is partitioned to produce index key minimum values of "/". "/usr/foo/", "usr/home/jason/", and "/usr/home/zach/" for the set of leaf nodes, where the set includes four leaf nodes (e.g., at source names 1BC, B63, E62, and E76). The method continues at step 560 where the processing module generates one or more index node levels based on aggregating leaf nodes of each child level in accordance with the comparing function. For example, an index node with a source name of 1AC is generated as a parent of a leaf node with the source name of 1BC, an index node with a source name of D43 is generated as a parent of leaf nodes with the source names of B63, E62, and E76, and an index node with a source name of 457 is generated as a parent of index nodes with the source names of 1AC and D43.

The method continues at step 562 where the processing module generates node content for the one or more index node levels and the set of leaf nodes to form an index structure. Such an example index structure is discussed in greater detail the preference to FIG. 41D. The method continues at step 564 where the processing module stores the nodes in a distributed storage and task network (DSTN) module. For example, the processing module encodes each of the nodes utilizing a dispersed storage error encoding function to produce slices and sends the slices to the DSTN module for storage therein.

FIG. 41D is a diagram illustrating another example of an index structure of an example index utilized to access data stored in a distributed storage and task network (DSTN) module. In the example, the index structure includes four leaf nodes and three index nodes, three data objects are stored in the DSTN module, wherein the data objects stored in the DSTN module utilizing source names ADC, F34, and F35, and global key type traits includes a comparing function to sort string type index keys by pathname level and alphabetically. The data stored at source name ADC is associated with an index key of "/etc/note.doc/" as that data is associated with a pathname of "/etc/note.doc/". The data stored at source name F34 is associated with an index key of "/usr/home/jason/pic.jpg" as that data is associated with a pathname of "/usr/home/jason/pic.jpg". The data stored at source name F35 is associated with an index key of "/usr/home/zach/log.doc" as that data is associated with a pathname of "/usr/home/zach/log.doc".

A leaf node stored at source name 1BC includes a node type indicating a leaf node, a sibling node source name pointing to a leaf node stored at source name B63, a sibling minimum index key of "/usr/foo/", and a data 1 source name of ADC, a data 1 index key of "/etc/note.doc". The leaf node stored at source name B63 includes a node type indicating a leaf node, a sibling node source name pointing to a leaf node stored at source name E62, a sibling minimum index key of "/usr/home/jason/", and a null data 1 source name of and a null data 1 index key since no data is stored yet that is associated with this leaf node. The leaf node stored at source name E62 includes a node type indicating a leaf node, a sibling node source name pointing to a leaf node stored at source name E76, a sibling minimum index key of "/usr/home/zach/", a data 1 source name of F34, and a data 1 index key of "/usr/home/jason/pic.jpg". The leaf node stored at source name E76 includes a node type indicating a leaf node, a null sibling node source name (e.g., since last leaf node of leaf node level), a null sibling minimum index key, a data 1 source name of F35, and a data 1 index key of "/usr/home/zach/log.doc".

An index node stored at source name 1AC includes a node type indicating not a leaf node (e.g., index node), a sibling node source name pointing to an index node stored at source name D43, a sibling minimum index key of "/usr/foo/", a child 1 source name of 1BC, and a child 1 minimum index key of "/etc/". The index node stored at source name D43 includes a node type indicating not a leaf node (e.g., index node), a null sibling node source name (e.g., since last index node of an index node level), a null sibling minimum index key, a child 1 source name of B63, a child 1 minimum index key of "/usr/foo/", a child 2 source name of E62, a child 2 minimum index key of "/usr/home/jason/", a child 3 source name of E76, and a child 3 minimum index key of "/usr/home/zach". An index node (e.g., a root node) stored at source name 457 includes a node type indicating not a leaf node (e.g., index node), a null sibling node source name (e.g., since root node), a null sibling minimum index key, a child 1 source name of 1AC, a child 1 minimum index key of "ll", a child 2 source name of D43, and a child 2 minimum index key of "/usr/foo/".

Figure 42:
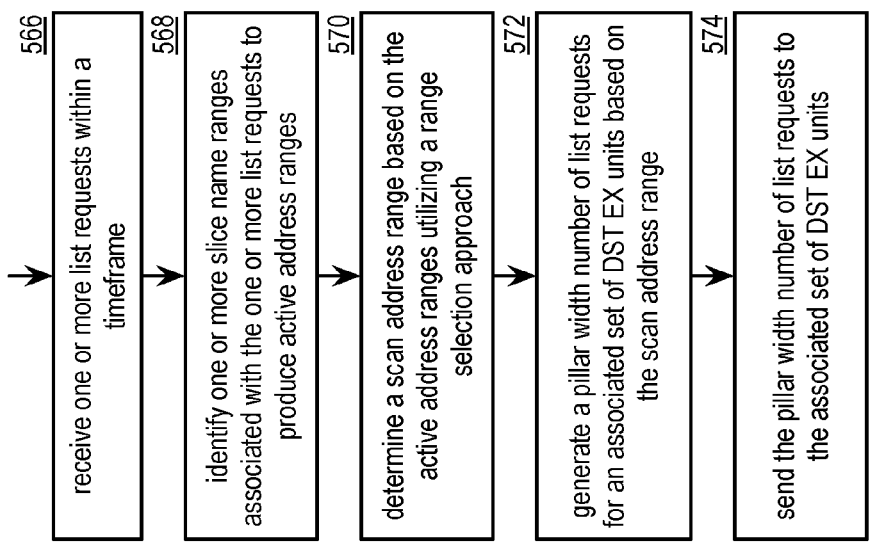
FIG. 42 is a flowchart illustrating an example of selecting slices to scan for errors in accordance with the present invention.

FIG. 42 is a flowchart illustrating an example of selecting slices to scan for errors. The method begins at step 566 where a processing module (e.g., of a distributed storage and task (DST) execution unit) receives or more list requests within a timeframe. For example, the processing module receives a list request from another DST execution unit, where a storage set of DST execution units includes the other DST execution unit and the DST execution unit. A list request includes one or more of a list range request and a list digest request. A list range request and a list digest request includes one or more of a start slice name range, a maximum count indicator, and an end slice name range.

The method continues at step 568 where the processing module identifies one or more slice name ranges associated with the one or more list requests to produce active address ranges. The identifying includes extracting start and stop slice name ranges from the one or more list requests to produce sub-ranges (e.g., a sub-range includes a corresponding start and stop slice name range), aggregating the sub-ranges to produce aggregated sub-ranges, and sorting the aggregated sub-ranges to produce active address ranges. As such, the active address ranges indicate address ranges associated with active slice error scanning performed by the storage set of DST execution units.

The method continues at step 570 where the processing module determines a scan address range based on the active address ranges utilizing a range selection approach. The determining includes one or more of obtaining a range selection approach (e.g., receiving, retrieving) and utilizing the range selection approach to select a scan address range such that the scan address range does not overlap with the active address ranges (e.g., so as not to duplicate active slice error scanning). The range selection approach includes one or more requirements, where each requirement may include one of not duplicating a scan address range is part of the active address ranges, incrementing the scan address range up with regards to a previous scan address range, decrementing the range address range down with regards to the previous scan address range, dividing a total address range into a plurality of range portions (e.g., 100 k portions), and randomly selecting a range portion when the range portion is not included in the active address ranges. For example, the processing module determines the scan address range to include a start slice name range of D4B0 and an end slice name range of D5FF when a previous scan address range included a range of D300 to D4AF, the range selection approach includes a requirement to increment the range from the previous scan, and the scan address range does not overlap with the active address ranges.

The method continues at step 572 where the processing module generates a pillar width number of list requests for an associated set of DST execution units based on the scan address range. The generating includes generating each request for each DST execution unit to include the start slice name range of the scan address range and the end slice name range of the scan address range in accordance with a pillar association of the DST execution unit. For example, the start slice name range and the end slice name range of a list request is associated with a unique slice index that corresponds to the pillar association of the DST execution unit. The method continues at step 574 where the processing module sends the pillar width number of list requests to the associated set of DST execution units.

In addition, the processing module may process a list range request and/or a list digest request of the one or more list requests. The processing of the list range request includes one or more of identifying locally stored slices corresponding to one or more slice names within a range between the start slice name range and the end slice name range of the list request; generating a list response that includes a slice name of the one or more slice names, a slice revision count, and a slice revision and a slice length corresponding to each revision; and sending the list range response to the requesting entity. The processing of the list digest request includes one or more of identifying locally stored slices corresponding to one or more slice names within a range between the start slice name range and the end slice name range of the list request; generating a list response that includes a digest across each slice name of the one or more slice names, the slice revision count, and the slice revision and the slice length corresponding to each revision; and sending the list digest response to the requesting entity.

In addition, the processing module may receive list responses from the associated set of DST execution units in response to sending the pillar width number of list requests to the associated set of DST execution units. The receiving includes one or more of receiving the list responses, identifying differences between the list responses as potential slice errors, and indicating the potential slice errors (e.g., sending a message).

Figure 43A:
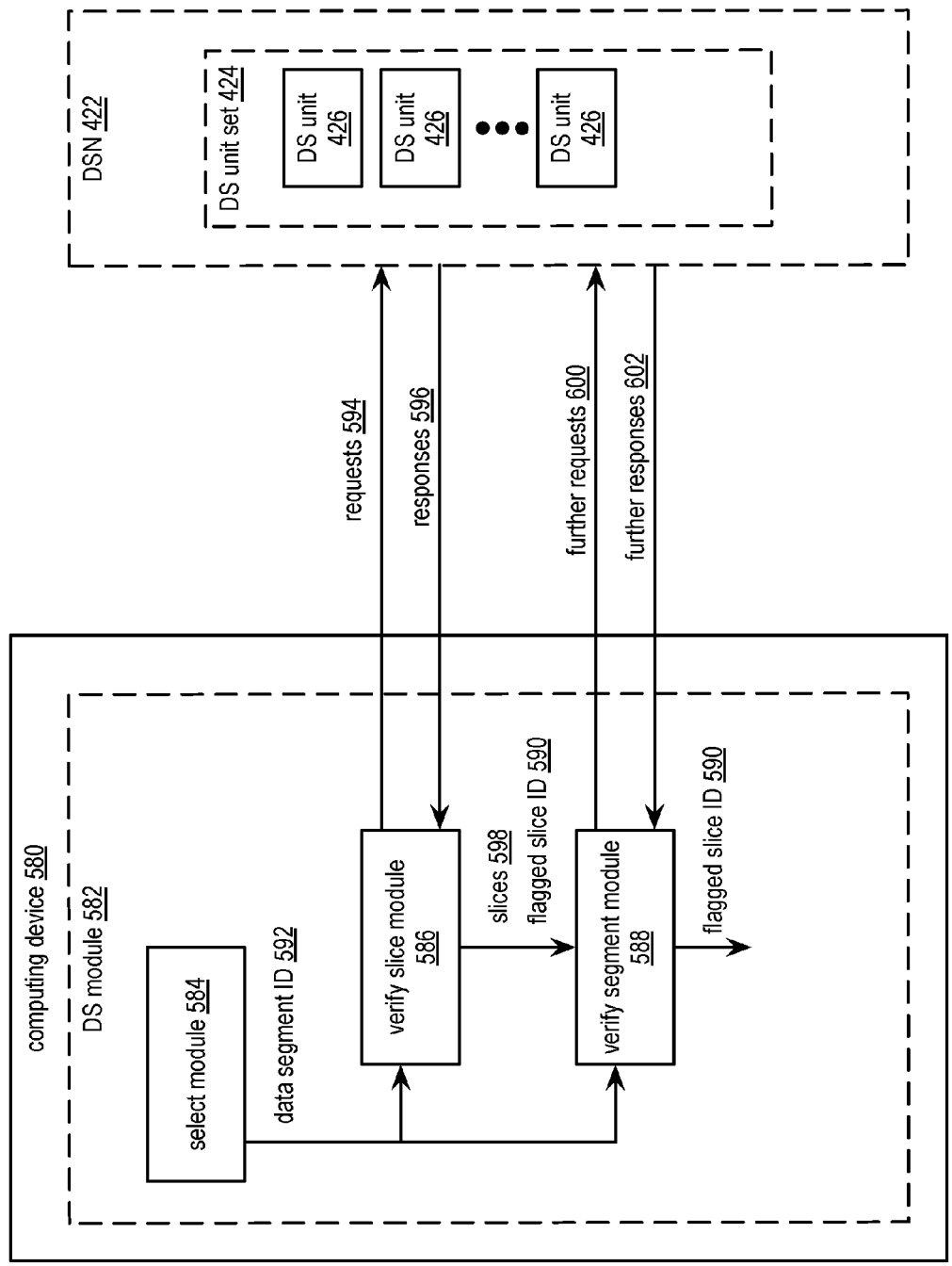
FIG. 43A is a diagram illustrating another example of a dispersed storage system in accordance with the present invention.

FIG. 43A is a diagram illustrating another example of a dispersed storage system that includes a computing device 580 and a dispersed storage network (DSN) 422. The DSN 422 may be implemented utilizing one or more of a DSN memory, a distributed storage and task network (DSTN), and a DSTN module. The DSN 422 includes at least one dispersed storage (DS) unit set 424. A DS unit set 424 of the at least one DS unit set 424 includes a set of DS units 426. Each DS unit 426 of the set of DS units 426 may be implemented utilizing at least one of a storage server, a storage unit, a storage module, a memory device, a memory, a distributed storage and task (DST) execution unit, a user device, a DST processing unit, and a DST processing module. The computing device 580 may be implemented utilizing at least one of a server, a storage unit, a storage server, a storage module, a DS processing unit, a DS unit, a DST execution unit, a user device, a DST processing unit, and a DST processing module. The computing device 580 includes a dispersed storage (DS) module 582. The DS module 582 includes a select module 584, a verify slice module 586, and a verify segment module 588.

The system functions to flag encoded data slices of a set of encoded data slices as being potentially compromised. For example, the system outputs a flagged slice identifier (ID) 590 corresponding to an encoded data slice as being potentially compromised where the flagged slice ID 590 includes a slice name (e.g., DSN address) of the encoded data slice. A data segment is encoded in accordance with a dispersed storage error encoding function to produce the set of encoded data slices, which is stored in DS units 426 of the DSN 422. The flagging includes selecting the data segment, verifying integrity values associated with at least some encoded data slices of the selected data segment, verifying an integrity value associated with the selected data segment, and indicating the encoded data slices as being potentially compromised based on the verifying of the integrity values associated with at least some encoded data slices and the verifying of the integrity value associated with the selected data segment.

The select module 584 selects the data segment to produce a data segment ID 592 for determining whether at least a portion of the data segment has been compromised. The select module 584 selects the data segment to produce the data segment ID 592 based on one or more of a last data segment verified, an error message, a request, a query, a lookup, and a predetermination. For example, the select module 584 receives an error message indicating that a recent retrieval of the data segment was associated with an anomaly.

The verify slice module 586 verifies integrity values of at least some encoded data slices of the set of encoded data slices. The verify slice module 586 verifies integrity values of at least some encoded data slices by a series of steps. A first step includes the verify slice module 586 selecting a first combination of encoded data slices of the set of encoded data slices totaling a decode threshold number of encoded data slices. The selecting includes identifying a set of slice names based on the data segment ID 592 and selecting a first combination of slice names of the set of slice names corresponding to the first combination of encoded data slices (e.g., random selection, based on an error message, based on the request).

A second step to verify integrity values includes the verify slice module 586 verifying integrity values of each encoded data slice of the first combination of encoded data slices and when the integrity value of each encoded data slice of the first combination of encoded data slices are affirmatively verified, establishing the that integrity values of at least some encoded data slices are affirmatively verified. The verifying integrity values includes, for each encoded data slice, comparing a stored integrity value associated with the encoded data slice to a calculated integrity value of the encoded data slice and indicating that the integrity value of the encoded data slice is affirmatively verified when the stored integrity value is substantially the same as the calculated integrity value. For example, for the encoded data slice, the verify slice module 586 generates a read slice request 594 that includes a slice name corresponding to the encoded data slice, receives a read slice response 596 that includes a retrieved encoded data slice and the stored integrity value, performs an integrity function on the retrieved encoded data slice to produce the calculated integrity value, compares the stored integrity value to the calculated integrity value, and indicates that the integrity value of the encoded data slice is affirmatively verified when the comparison is favorable (e.g., substantially the same) and indicates that the integrity value of the encoded data slice is negatively verified when the comparison is unfavorable (e.g., not substantially the same). The verify slice module 586 provides encoded data slices 598 received via the responses 596 to the verify segment module 588 to facilitate further segment level verification as discussed below.

When the integrity value of an encoded data slice of the first combination of encoded data slices is negatively verified to produce a potentially compromised encoded data slice (e.g., indicating a flagged slice ID 590 corresponding to the encoded data slice), the second step to verify integrity values further includes the verify slice module 586 entering a loop that includes several loop steps to attempt to identify a combination of a decode threshold number of encoded data slices of the at least some of the set of encoded data slices that are affirmatively verified. A first loop step includes the verify slice module 586 selecting another combination of encoded data slices of the set of encoded data slices totaling the decode threshold number of encoded data slices as a current combination of encoded data slices, where the another combination of encoded data slices excludes the potentially compromised encoded data slice. In a second loop step, the verify slice module 586 verifies the integrity value of each encoded data slice of the current combination of encoded data slices (e.g., generate a request 594, receive a response 596, compare a stored integrity value to a calculated integrity value, indicate verification outcome) and when the integrity value of each encoded data slice of the current combination of encoded data slices are affirmatively verified, establishes the that integrity values of at least some encoded data slices are affirmatively verified and exits the loop. When the integrity value of an encoded data slice of the current combination of encoded data slices is negatively verified to produce another potentially compromised encoded data slice, the second loop step includes the verify slice module 586 repeating the loop excluding the other potentially compromised encoded data slice. The verify slice module 586 further functions to, for each encoded data slice of the at least some encoded data slices that fails the verifying of the integrity value, flag the failed encoded data slice as being potentially compromised to include producing the flag slice ID 590. The verify slice module 586 provides encoded data slices 598 received via the responses 596 during the loop to the verify segment module 588 to facilitate further segment level verification as discussed below.

The verify segment module 588, when the integrity value of each of the decode threshold number of encoded data slices of the at least some of the set of encoded data slices are affirmatively verified, performs a series of steps with regards to verifying the integrity value associated with the selected data segment and indicating the encoded data slices as being potentially compromised. In a first step, the verify segment module 588 verifies an integrity value of the data segment. The verify segment module 588 verifies integrity value of the data segment by a series of sub-steps. A first sub-step includes the verify segment module 588 dispersed storage error decoding the decode threshold number of encoded data slices to produce a recaptured data segment. A second sub-step includes the verify segment module 588 calculating an integrity value for the recaptured data segment. A third sub-step includes the verify segment module 588 comparing the calculated integrity value with a retrieved integrity value of the data segment (e.g., retrieved from a portion of at least some of the encoded data slices, retrieved from a local memory, included in one or more responses 596, included in one or more slices 598, etc.). When the comparison is favorable (e.g., substantially the same), a fourth sub-step includes the verify segment module 588 establishing that the integrity value of the data segment is verified. Alternatively, the verify segment module 588 verifies the integrity value of the data segment by retrieving a data segment integrity value from each of the decode threshold number of encoded data slices and when the data segment integrity value from each of the decode threshold number of encoded data slices substantially match, establishing that the integrity value of the data segment is verified.

When the integrity value of the data segment is affirmatively verified, in a second step with regards to verifying the integrity value associated with the selected data segment and indicating the encoded data slices as being potentially compromised, the verify segment module 588 generates a new set of encoded data slices for the data segment in accordance with the dispersed storage error encoding function. For example, the verify segment module 588 encodes the recaptured data segment using the dispersed storage error coding function to produce the new set of encoded data slices. In a third step, the verify segment module 588 verifies concurrency of encoded data slices 598 of the set of encoded data slices with corresponding encoded data slices of the new set of encoded data slices. The verifying may include generating and outputting further requests 600 to the DSN 422 that includes read slice requests for additional encoded data slices and receiving for the responses 602 that includes the additional encoded data slices. The verify segment module 588 verifies concurrency of encoded data slices 598 of the set of encoded data slices with corresponding encoded data slices of the new set of encoded data slices by at least one of performing a bit by bit comparison of each encoded data slice of the set of encoded data slices with the corresponding encoded data slices of the new set of encoded data slices to verify the concurrency and comparing integrity values of each encoded data slice of the set of encoded data slices with integrity values of the corresponding encoded data slices of the new set of encoded data slices to verify the concurrency (e.g., calculate integrity values of the new set of encoded data slices, then compare).

For each of the encoded data slices having a negative concurrency verification, in a fourth step, the verify segment module 588 flags the each of the encoded data slices as being potentially compromised to produce the flagged slice ID 590 for the encoded data slice. The verify segment module 588 functions to flag the each of the encoded data slices as being potentially compromised further by at least one of a variety of approaches. A first approach includes the verify segment module 588 flagging each of the potentially compromised encoded data slices for rebuilding. A second approach includes the verify segment module 588 deleting (e.g., generating and outputting further requests 600 that includes delete slice requests) each of the potentially compromised encoded data slices and replacing (e.g., generating and outputting further requests 600 that includes write slice requests) each of the potentially compromised encoded data slices with corresponding encoded data slices of the new set of encoded data slices (e.g., replacing includes at least one of overwriting, writing to a new storage location in a same DS unit 426, and writing to a another DS unit 426). A third approach includes the verify segment module 588 deleting the set of encoded data slices and replacing the set of encoded data slices with the new set of encoded data slices.

When the integrity value of the data segment is negatively verified, the second step with regards to verifying the integrity value associated with the selected data segment and indicating the encoded data slices as being potentially compromised, includes the verify segment module 588 entering a loop that includes several loop steps. In a first loop step, the verify segment module 588 selects another combination of encoded data slices of the set of encoded data slices totaling the decode threshold number of encoded data slices as a current combination of encoded data slices. In a second loop step, the verify segment module 588 verifies another integrity value of the data segment based on the other combination of encoded data slices (e.g., generating and outputting further requests 600 to acquire slices, integrity values received in further responses 602). When the other integrity value of the data segment based on the other combination of encoded data slices is affirmatively verified, in a third loop step, the verify segment module 588 establishes the that other integrity value of the data segment is affirmatively verified and exits the loop. When the other integrity value of the data segment based on the other combination of encoded data slices is negatively verified, in the third loop step, the verify segment module 588 repeats the loop.

When each of the encoded data slices of the set of encoded data slices does not include the integrity value or the data segment does not include the integrity value of the data segment, the verify segment module 588 performs a series of alternate of steps. In a first alternate step, the verify segment module 588 generates a plurality of recaptured data segments from various combinations of encoded data slices of the set of encoded data slices (e.g., select various combinations of the decode threshold number of encoded data slices, decode each combination of slices to produce the plurality of recaptured data segments). In a second alternative step, the verify segment module 588 generates a plurality of data segment integrity values for the plurality of recaptured data segments. When the plurality of data segment integrity values substantially match, in a third alternative step, the verify segment module 588 indicates the set of encoded data slices has not been compromised. When a data segment integrity value of the plurality of data segment integrity values does not substantially match to other data segment integrity values of the plurality of data segment integrity values, in the third alternative step, the verify segment module 588 identifies, based on the data segment integrity value, an encoded data slice of the set of encoded data slices as being potentially compromised to produce the flagged slice ID 590.

Figure 43B:
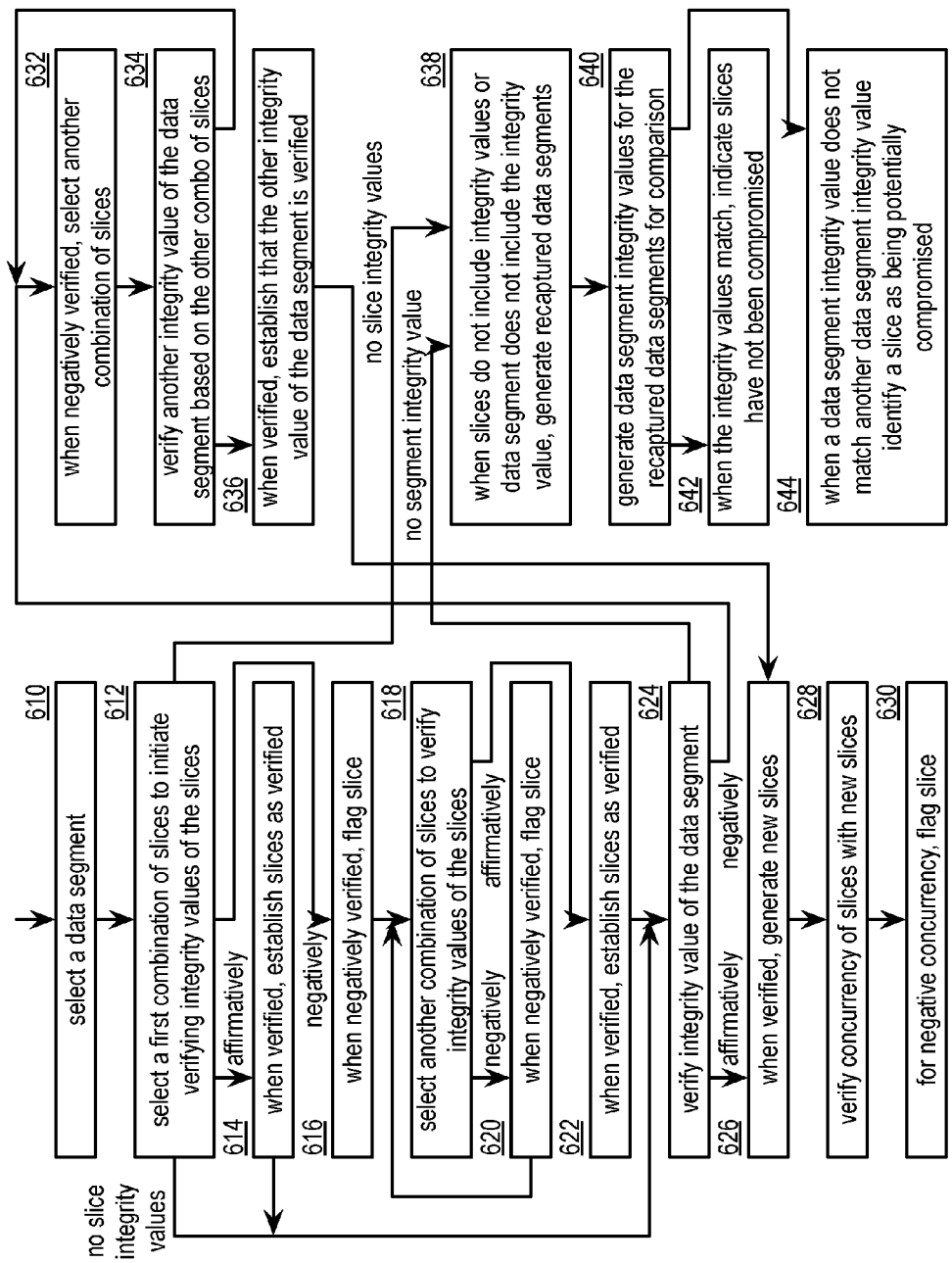
FIG. 43B is a flowchart illustrating an example of identifying a potentially compromised encoded data slice in accordance with the present invention.

FIG. 43B is a flowchart illustrating an example of identifying a potentially compromised encoded data slice. The method begins at step 610 where a processing module (e.g., of a distributed storage and task (DST) processing unit) selects a data segment for determining whether at least a portion of the data segment has been compromised. The method continues at step 612 where the processing module selects a first combination of encoded data slices of the set of encoded data slices totaling a decode threshold number of encoded data slices to initiate verifying integrity values of at least some encoded data slices of a set of encoded data slices. The data segment is encoded in accordance with a dispersed storage error encoding function to produce the set of encoded data slices, which is stored in one or more of distributed storage (DS) units of a distributed storage network (DSN) and DST execution units of a distributed storage and task network (DSTN) module.

The method branches to step 616 when the integrity value of an encoded data slice of the first combination of encoded data slices is negatively verified (e.g., a calculated integrity value is not substantially the same as a stored integrity value). The method branches to one of step 638 and step 624 when each of the encoded data slices of the set of encoded data slices does not include the integrity value. For example, the method branches to step 624 when an integrity value of the data segment is likely to exist. The method continues to step 614 when the integrity value of each encoded data slice of the first combination of encoded data slices are affirmatively verified (e.g., the calculated integrity value is substantially the same as the stored integrity value).

When the integrity value of each encoded data slice of the first combination of encoded data slices are affirmatively verified, the method continues at step 614 where the processing module establishes the that integrity values of at least some encoded data slices are affirmatively verified. The method branches to step 624 to facilitate verification of the data segment. When the integrity value of an encoded data slice of the first combination of encoded data slices is negatively verified to produce a potentially compromised encoded data slice, for each encoded data slice of the at least some encoded data slices that fails the verifying of the integrity value, the method continues at step 616 where the processing module flags the failed encoded data slice as being potentially compromised. The flagging the each of the encoded data slices as being potentially compromised includes at least one of a variety of approaches. A first approach includes flagging each of the potentially compromised encoded data slices for rebuilding. A second approach includes deleting each of the potentially compromised encoded data slices and replacing each of the potentially compromised encoded data slices with corresponding encoded data slices of the new set of encoded data slices. A third approach includes deleting the set of encoded data slices and replacing the set of encoded data slices with the new set of encoded data slices.

The method continues at step 618 where the processing module selects another combination of encoded data slices of the set of encoded data slices totaling the decode threshold number of encoded data slices as a current combination of encoded data slices to continue the verifying of integrity values of at least some encoded data slices of a set of encoded data slices, where the another combination of encoded data slices excludes the potentially compromised encoded data slice. The method branches to step 622 when the integrity value of each encoded data slice of the current combination of encoded data slices are affirmatively verified (e.g., the calculated integrity value is substantially the same as the stored integrity value). The method continues to step 620 when the integrity value of an encoded data slice of the current combination of encoded data slices is negatively verified (e.g., a calculated integrity value is not substantially the same as a stored integrity value).

When the integrity value of an encoded data slice of the current combination of encoded data slices is negatively verified to produce another potentially compromised encoded data slice, the method continues at step 620 where the processing module loops back to step 618 to select another combination of encoded data slices excluding the other potentially compromised encoded data slice. When the integrity value of each encoded data slice of the current combination of encoded data slices are affirmatively verified, the method continues at step 622 where the processing module establishes the that integrity values of at least some encoded data slices are affirmatively verified.

When the integrity value of each of a decode threshold number of encoded data slices of the at least some of the set of encoded data slices are affirmatively verified, the method continues at step 624 where the processing module verifies an integrity value of the data segment. Alternatively, the method continues at step 624 when no slice integrity values exist and an integrity value of the data segment may exist. The verifying the integrity value of the data segment includes a series of segment verification steps. A first segment verification step includes dispersed storage error decoding the decode threshold number of encoded data slices to produce a recaptured data segment. A second segment verification step includes calculating an integrity value for the recaptured data segment. A third segment verification step includes comparing the calculated integrity value with a retrieved integrity value of the data segment. When the comparison is favorable, a fourth segment verification step includes establishing that the integrity value of the data segment is verified. Alternatively, the verifying the integrity value of the data segment includes alternative segment verification steps. A first alternative segment verification step includes retrieving a data segment integrity value from each of the decode threshold number of encoded data slices. A second alternative segment verification step includes, when the data segment integrity value from each of the decode threshold number of encoded data slices substantially match, establishing that the integrity value of the data segment is verified. The method branches to step 632 when the integrity value of the data segment is negatively verified. The method branches to step 638 when the data segment does not include the integrity value of the data segment. The method continues to step 626 when the integrity value of the data segment is affirmatively verified.

When the integrity value of the data segment is affirmatively verified, the method continues at step 626 where the processing module generates a new set of encoded data slices for the data segment in accordance with the dispersed storage error encoding function. The method continues at step 628 where the processing module verifies concurrency of encoded data slices of the set of encoded data slices with corresponding encoded data slices of the new set of encoded data slices. The verifying concurrency of encoded data slices of the set of encoded data slices with corresponding encoded data slices of the new set of encoded data slices includes at least one of a variety of concurrency verification approaches. A first concurrency verification approach includes performing a bit by bit comparison of each encoded data slice of the set of encoded data slices with the corresponding encoded data slices of the new set of encoded data slices to verify the concurrency. A second concurrency verification approach includes comparing integrity values of each encoded data slice of the set of encoded data slices with integrity values of the corresponding encoded data slices of the new set of encoded data slices to verify the concurrency. For each of the encoded data slices having a negative concurrency verification, the method continues at step 630 where the processing module flags the each of the encoded data slices as being potentially compromised.

When integrity value of the data segment is negatively verified, the method continues at step 632 where the processing module selects another combination of encoded data slices of the set of encoded data slices totaling the decode threshold number of encoded data slices as a current combination of encoded data slices. The method continues at step 634 where the processing module verifies another integrity value of the data segment based on the other combination of encoded data slices. The method loops back to step 632 to select another combination of slices when the other integrity value of the data segment based on the other combination of encoded data slices is negatively verified. The method continues to step 636 when the other integrity value of the data segment based on the other combination of encoded data slices is affirmatively verified. When the other integrity value of the data segment based on the other combination of encoded data slices is affirmatively verified, the method continues at step 636 where the processing module establishes that other integrity value of the data segment is affirmatively verified. The method branches back to step 626.

When each of the encoded data slices of the set of encoded data slices does not include the integrity value or the data segment does not include the integrity value of the data segment, the method continues at step 638 where the processing module generates a plurality of recaptured data segments from various combinations of encoded data slices of the set of encoded data slices (e.g., various combinations of the decode threshold number of encoded data slices). The method continues at step 640 where the processing module generates a plurality of data segment integrity values for the plurality of recaptured data segments. When the plurality of data segment integrity values substantially match, the method continues at step 642 where the processing module indicates the set of encoded data slices has not been compromised. When a data segment integrity value of the plurality of data segment integrity values does not substantially match to other data segment integrity values of the plurality of data segment integrity values, the method continues at step 644 where the processing module identifies, based on the data segment integrity value, an encoded data slice of the set of encoded data slices as being potentially compromised.

Figure 44A:
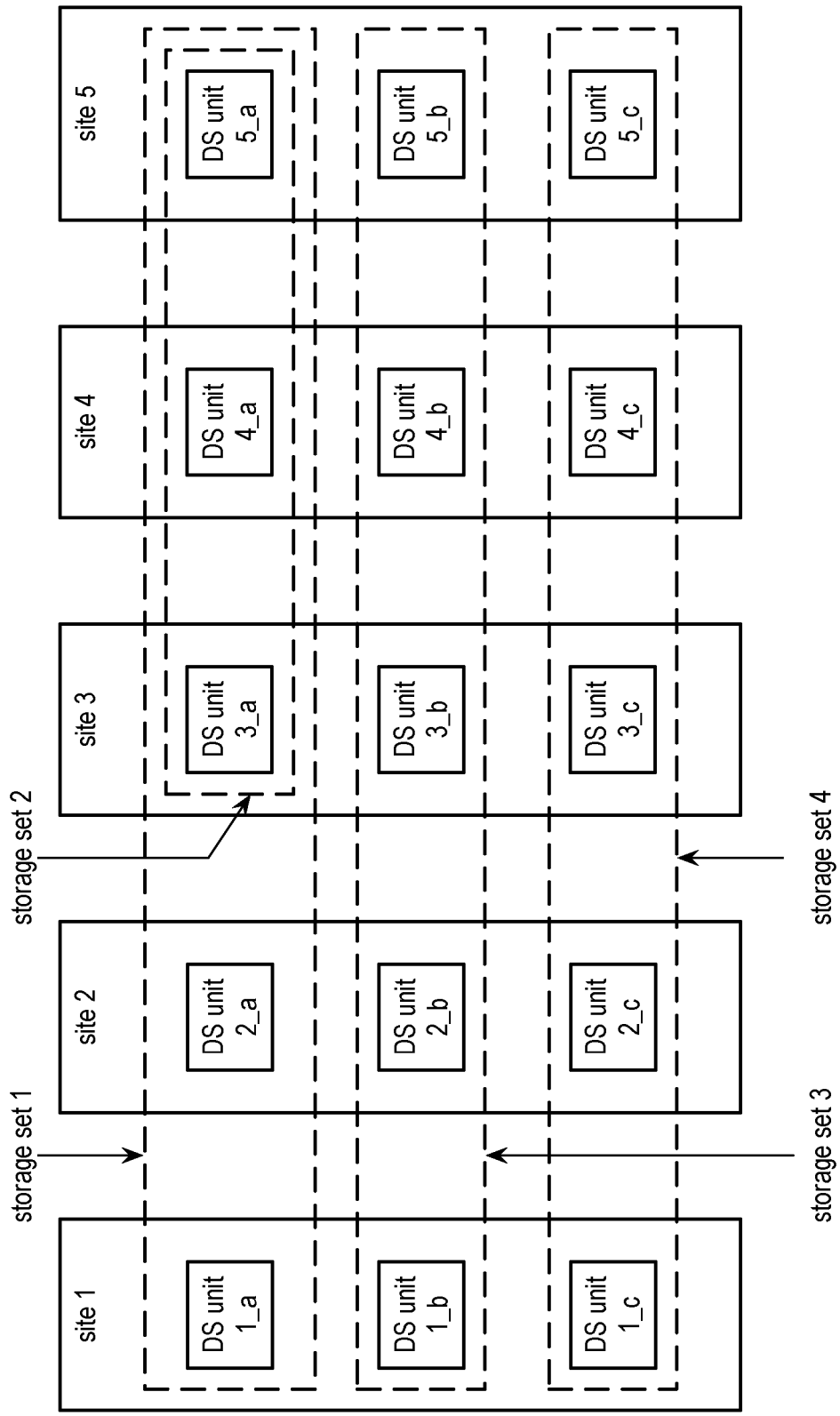
FIG. 44A is a diagram illustrating another example of a dispersed storage system in accordance with the present invention.

FIG. 44A is a diagram illustrating another example of a dispersed storage system to illustrate an example of securely migrating data. The system includes two or more storage sets of dispersed storage (DS) units deployed across at least a pillar width number of sites of a dispersed storage network (DSN). For example, as illustrated, storage sets 1, 3, and 4 are deployed across corresponding sets of DS units implemented at five sites when a pillar width number is 5 for each of the storage sets 1, 3, and 4; and a storage set 2 is deployed across sites 3-5 when a pillar width number is 3 for storage set 2. For instance, as illustrated, storage set 1 includes DS units 1_a, 2_a, 3_a, 4_a, and 5_a; storage set 2 includes DS units 3_a, 4_a, and 5_a; storage set 3 includes DS units 1_b, 2_b, 3_b, 4_b, and 5_b; and storage set 4 includes DS units 1_c, 2_c, 3_c, 4_c, and 5_c. Each storage set of storage sets 1-4 correspond to the unique DSN address ranges. Each DS unit of each storage set is assigned to a sub-DSN address range of a corresponding DSN address range. As such, a DS unit may be assigned to any number of sub-DSN address ranges corresponding to a similar number of storage sets.

Data objects are divided (e.g., partitioned, encoded and sliced) into data partitions in accordance with a data partitioning protocol and the data objects are stored as sets of data partitions in a storage set of DS units. The data partitioning protocol includes a distributed storage error encoding function. The data objects are encoded in accordance with the distributed storage error encoding function to produce sets of encoded data slices, where, from set to set, size of the encoded data slices is substantially the same.

A DS unit may determine to facilitate a secure transfer of data partitions to a candidate DS unit based on one or more of an available storage capacity indicator of the DS unit, an error message, a request, and a predetermined schedule. In an example of operation, DS unit 2_b determines to facilitate the secure transfer of data partitions. Next, DS unit 2_b identifies the candidate DS unit as DS unit 2_a of storage set 1. The identifying DS unit 2_a includes identifying a storage trait of the DS unit 2_a that is also a storage trait of DS unit 2_b of storage set 3 to yield a common storage trait, where the common storage trait includes one or more of a common site identifier of site 2, a common pillar number (e.g., pillar 2 for storage set 1 and 3) in a dispersed storage error encoding system, a reliability requirement of the DSN, access availability, and access speed.

The DS unit 2_b generates and outputs a data migration request to the DS unit 2_a. The DS unit 2_b receives a migration receptiveness message from DS unit 2_a (e.g., the candidate DS unit). The migration receptiveness message includes an indication of availability to receive migrated data and a reported storage utilization of DS unit 2_a for storing a first sub-set of data partitions (e.g., pillar 2 slices of storage set 1) of the sets of data partitions.

The DS unit 2_b generates and outputs a data migration reference message to DS unit 3_a of storage set 1. The DS unit 2_b receives, from DS unit 3_a, a migration reference response that includes an indication of storage utilized by DS unit 3_a for storing a second sub-set of data partitions (e.g., pillar 3 slices of storage set 1) of the sets of data partitions. Alternatively, the DS unit 2_b receives, from multiple DS units of the storage set 1 (e.g., from one or more of DS unit 1_a, 3_a, 4_a, and 5_a), multiple migration reference responses (e.g., with regards to one or more data migration reference messages). When the reported storage utilization of DS unit 2_a does not substantially match the storage utilized by the DS unit 3_a with regards to storage set 1, the DS unit 2_b generates a message indicating that the DS unit 2_a may be compromised.

When the reported storage utilization of DS unit 2_a substantially matches the storage utilized by the DS unit 3_a with regards to storage set 1, the example of operation continues where the DS unit 2_b determines a storage utilization of the DS unit 2_a for storing the first sub-set of data partitions based on the migration reference response from DS unit 3_a and the data partitioning protocol. The determining the storage utilization of the DS unit 2_a includes determining a storage utilization ratio between the DS unit 2_a and the DS unit 3_a based on the data partitioning protocol and multiplying the storage utilization ratio by the storage utilized by the DS unit 3_a with regards to storage set 1 to determine the storage utilization by the DS unit 2_a.

Alternatively, when receiving multiple migration reference responses (e.g., from one or more of DS unit 1 a, 3_a, 4_a, and 5_a), the DS unit 2_b determines the storage utilization of the DS unit 2_a for storing the first sub-set of data partitions based on the migration reference response, the multiple migration reference responses, and the data partitioning protocol. When receiving multiple migration reference responses, the determining includes a series of steps. A first step includes, for each of the multiple DS units (e.g., DS unit 1 a, 4_a, and 5_a), and DS unit 3_a, determining a storage utilization ratio between the DS unit 2_a and the other DS unit based on the data partitioning protocol to produce multiple storage utilization ratios. A second step includes, for each of the multiple storage utilization ratios, multiplying the storage utilization ratio by the storage utilized by a corresponding one of the multiple DS units and the DS unit 3_a to determine multiple storage utilizations by the candidate DS unit. When the multiple storage utilizations substantially match, a third step includes selecting one of the multiple storage utilizations as the determined storage utilization of the DS unit 2_a. When the multiple storage utilizations do not substantially match, the third step includes determining that the determined storage utilization of the DS unit 2_a compares unfavorably to the reported storage utilization of the DS unit 2_a.

When the determined storage utilization of the DS unit 2_a compares unfavorably to the reported storage utilization of the DS unit 2_a, the method of operation continues where the DS unit 2_b generates the message indicating that the DS unit 2_a may have been compromised. The DS unit 2_b identifies another candidate DS unit (e.g., DS unit 2_c) from yet another set of DS units (e.g., storage set 4). The DS unit 2_b executes a similar process for the DS unit 2_c.

When the determined storage utilization of the DS unit 2_a compares favorably to the reported storage utilization of the DS unit 2_a and the indication of availability to receive migrated data is favorable, the method of operation continues where the DS unit 2_b enables transfer of data partitions of other data objects from DS unit 2_b of storage set 3 to the candidate DS unit (e.g., DS unit 2_a). The enabling transfer of the data partitions includes at least one of retrieving the data partitions from a memory of DS unit 2_a and outputting the data partitions to the candidate DS unit (e.g., DS unit 2_a). The determining that the indication of availability to receive migrated data is favorable includes a series of steps. A first step includes ascertaining storage capabilities of DS unit 2_a. A second step includes determining other storage obligations of the DS unit 2_a. A third step includes determining available storage of DS unit 2_a based on the storage capabilities, the other storage obligations, and the reported storage utilization. When the available storage compares favorably to a storage availability threshold, a fourth step includes determining that the indication of availability to receive migrated data is favorable. The DS unit 2_b updates DSN address ranges of the DS unit 2_a and the DS unit 2_b after the transfer is completed. The apparatus and method associated with the secure migration of data is discussed in greater detail with reference to FIGS. 44B and 44C.

Figure 44B:
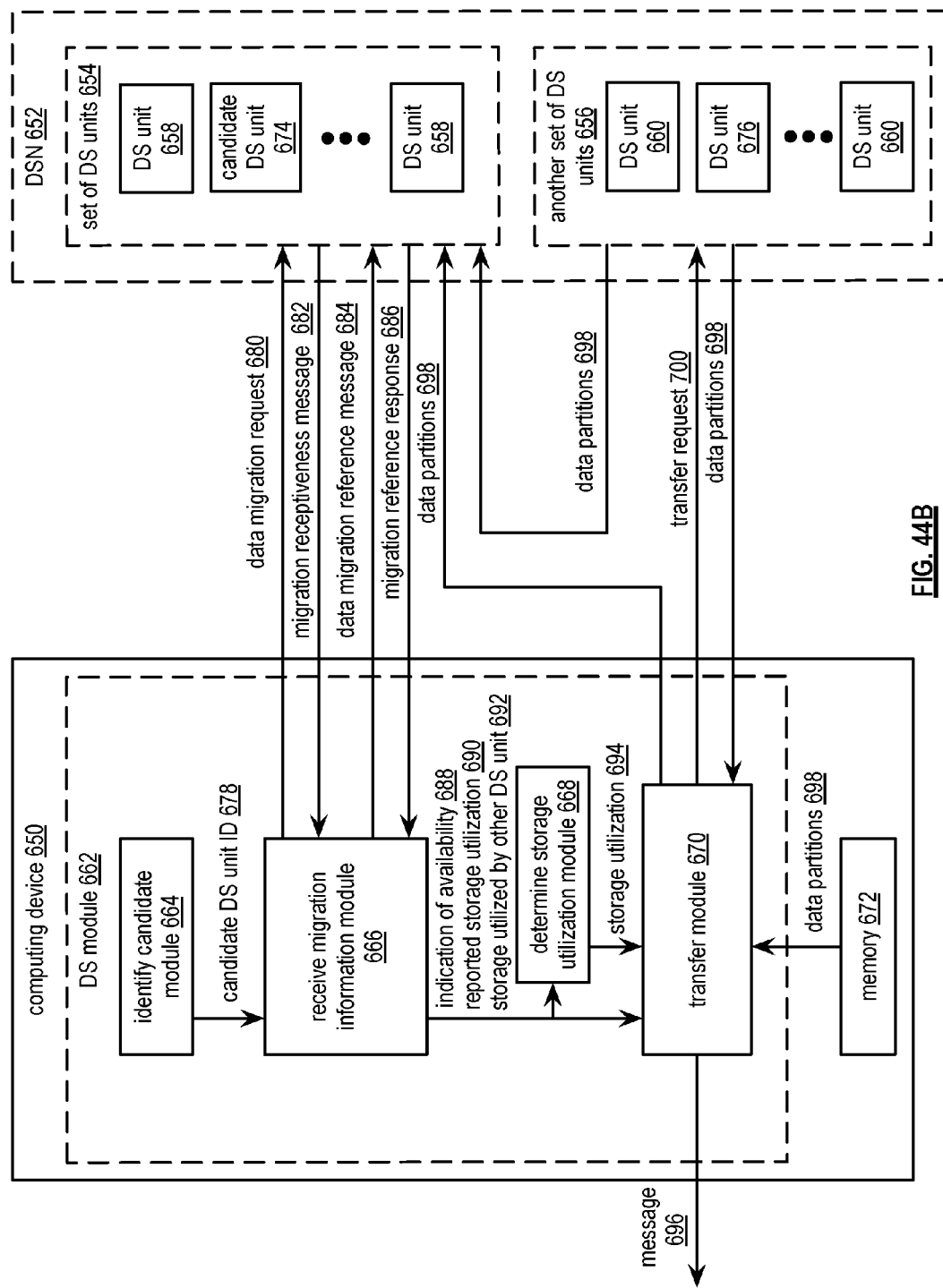
FIG. 44B is a diagram illustrating another example of a dispersed storage system in accordance with the present invention.

FIG. 44B is a diagram illustrating another example of a dispersed storage system that includes a computing device 650 and a dispersed storage network (DSN) 652. The DSN 652 may be implemented utilizing one or more of a DSN memory, a distributed storage and task network (DSTN), and a DSTN module. The DSN 652 includes a set of DS units 654 and another set of DS units 656. Alternatively, the DSN 652 may include any number of sets of DS units. The set of DS units 654 includes a set (e.g., a pillar width number) of DS units 658 that includes a candidate DS unit 674. The set of DS units 656 includes a set (e.g., a pillar width number) of DS units 660 that includes a DS unit 676. Each of the set of DS units 654 and the other set of DS units 656 is assigned to one or more DSN address ranges utilized by one or more DSN vaults. Each DS unit 658-660 may be implemented utilizing at least one of a storage server, a storage unit, a storage module, a memory device, a memory, a distributed storage and task (DST) execution unit, a user device, a DST processing unit, and a DST processing module.

The computing device 650 includes a dispersed storage (DS) module 662 and a memory 672. The memory 672 may be implemented utilizing one or more of a memory device, a memory module, an optical memory, a magnetic memory, a solid-state memory, and a storage server. The DS module 662 includes an identify candidate module 664, a received migration information module 666, a determine storage utilization module 668, and a transfer module 670. The computing device 650 may be implemented utilizing at least one of a server, a storage unit, a storage server, a storage module, a DS processing unit, a DS unit, a DST execution unit, a user device, a DST processing unit, and a DST processing module. For example, the computing device 650 is implemented as a DS unit 660 of the other set of DS units 656.

The system functions to facilitate secure data migration to the candidate DS unit 674 of the set of DS units 654 from the DS unit 676 of the other set of DS units 656 (e.g., from the computing device 650). As such, the DS unit 676 of the other set of DS units 656 may include a corresponding DS unit 660 of the other set of DS units 656 and the candidate DS unit 674 of the set of DS units 654 may include a corresponding DS unit 658 of the set of DS units 654. As such, data is migrated from the DS unit 676 to the candidate DS unit 674. Alternatively, the DS unit 676 may be implemented utilizing the computing device 650 where data is migrated from memory 672 to the candidate DS unit 674. The facilitating of the secure data migration includes identifying the candidate DS unit 674, obtaining migration information, determining storage utilization of the candidate DS unit 674, and enabling data transfer from the DS unit 676 of the other set of DS units 656 to the candidate DS unit 674 of the set of DS units 654.

With regards to identifying the candidate DS unit 674, the identify candidate module 664 identifies the candidate DS unit 674 of the DSN 652 to produce candidate DS unit identity (ID) 678, where data objects are divided into data partitions in accordance with a data partitioning protocol and the data objects are stored as sets of data partitions in the set of DS units 654 that includes the candidate DS unit 674. The data partitioning protocol includes a distributed storage error encoding function, where the data objects are encoded in accordance with the distributed storage error encoding function to produce sets of encoded data slices, where, from set to set, size of the encoded data slices is substantially the same (e.g., size of slices is substantially the same from slice to slice of a set of slices). The identify candidate module 664 identifies the candidate DS unit 674 by identifying a storage trait of the candidate DS unit 674 that is also a storage trait of the DS unit 676 of the other set of DS units 656 to yield a common storage trait, where the common storage trait includes one or more of a common site identifier, a common pillar number in a dispersed storage error encoding system, a reliability requirement of the DSN, access availability, and access speed.

With regards to obtaining migration information, the receive migration information module 666 performs a series of informational steps. A first informational step includes the receive migration information module 666, in response to a data migration request 680, receiving a migration receiveness message 682 from the candidate DS unit, where the migration receiveness message 682 includes an indication of availability 688 to receive migrated data and a reported storage utilization 690 for storing a first sub-set of data partitions of the sets of data partitions. A second informational step includes the receive migration information module 666, in response to a data migration reference message 684, receiving, from another DS unit 658 of the set of DS units 654, a migration reference response 686 that includes an indication of storage utilized 692 by the other DS unit 658 for storing a second sub-set of data partitions of the sets of data partitions. Alternatively, or in addition to, the receive migration information module 666 receives, from multiple DS units 658 of the set of DS units 654, multiple migration reference responses 686.

With regards to determining storage utilization of the candidate DS unit 674, the determine storage utilization module 668 determines a storage utilization 694 of the candidate DS unit 674 for storing the first sub-set of data partitions based on the migration reference response 686 and the data partitioning protocol. The determine storage utilization module 668 determines the storage utilization 694 of the candidate DS unit 674 by determining a storage utilization ratio between the candidate DS unit 674 and the other DS unit 658 based on the data partitioning protocol and multiplying the storage utilization ratio by the storage utilized 692 by the other DS unit 658 to determine the storage utilization 694 by the candidate DS unit 674. Alternatively, or in addition to, when the receive migration information module 666 receives multiple migration reference responses 686, the determine storage utilization module 668 determines the storage utilization 694 of the candidate DS unit 674 for storing the first sub-set of data partitions based on the migration reference response 686, the multiple migration reference responses 686, and the data partitioning protocol.

When the determine storage utilization module 668 determines the storage utilization of the candidate DS unit 674 for storing the first sub-set of data partitions based on the migration reference response 686, the multiple migration reference responses 686, and the data partitioning protocol, the determine storage utilization module 668 utilizes a series of alternative determining steps. A first alternative determining step includes, for each of the multiple DS units 658 and the other DS unit 658, the determine storage utilization module 668 determining a storage utilization ratio between the candidate DS unit 674 and the other DS unit 658 based on the data partitioning protocol to produce multiple storage utilization ratios. A second alternative determining step includes, for each of the multiple storage utilization ratios, the determine storage utilization module 668 multiplying the storage utilization ratio by the storage utilized 692 by a corresponding one of the multiple DS units 692 and the other DS unit 658 to determine multiple storage utilizations by the candidate DS unit 674. A third alternative determining step includes, when the multiple storage utilizations substantially match, the determine storage utilization module 668 selecting one of the multiple storage utilizations as the determined storage utilization 694.

With regards to enabling data transfer from the DS unit 676 of the other set of DS units 656 to the candidate DS unit 674 of the set of DS units 654, the transfer module 670, when the determined storage utilization 694 compares favorably to the reported storage utilization 690 and the indication of availability 688 to receive migrated data is favorable, enables transfer of data partitions 698 of other data objects from the DS unit 676 of the other set of DS units 656 to the candidate DS unit 674. The enabling includes at least one of a variety of enabling approaches. When the data partitions 698 are available from the memory 672, a first enabling approach includes the transfer module 670 retrieving the data partitions 698 from the memory 672 and outputting the data partitions 698 to the candidate DS unit 674. When the data partitions 698 are available from the DS unit 676, a second enabling approach includes the transfer module 670 issuing a transfer request 700 to the DS unit 676, where the transfer request 700 includes a request to retrieve the data partitions 698 from the DS unit 676, receiving the data partitions 698 from the DS unit 676, and outputting the data partitions 698 to the candidate DS unit 674. When the data partitions 698 are available from the DS unit 676, a third enabling approach includes the transfer module 670 issuing the transfer request 700 to the DS unit 676, where the transfer request 700 includes a request to output the data partitions 698 from the DS unit 676 to the candidate DS unit 674.

The transfer module 670 generates a message 696 indicating that the candidate DS unit 674 may be compromised when the reported storage utilization 690 does not substantially match the storage utilized 692 by the other DS unit. Alternatively, or in addition to, when the receive migration information module 666 receives multiple migration reference responses 686, when the multiple storage utilizations 692 do not substantially match, the transfer module 670 determines that the determined storage utilization 694 compares unfavorably to the reported storage utilization 690. When the determined storage utilization 694 compares unfavorably to the reported storage utilization 690, the transfer module 670 further functions to identify another candidate DS unit from yet another set of DS units and generate a message 696 indicating that the candidate DS 674 unit may have been compromised.

The transfer module 670 determines that the indication of availability 688 to receive migrated data is favorable by a series of availability steps. A first availability step includes the transfer module 670 ascertaining storage capabilities of the candidate DS unit 674. A second availability step includes the transfer module 670 determining other storage obligations of the candidate DS unit 674. A third availability step includes the transfer module 670 determining available storage of the candidate DS unit 674 based on the storage capabilities, the other storage obligations, and the reported storage utilization 690. When the available storage compares favorably to a storage availability threshold, a fourth availability step includes the transfer module 670 determining that the indication of availability 688 to receive migrated data is favorable. The transfer module 670 further functions to update address ranges of the candidate DS unit 674 and the DS unit 676 of the other set of DS units 656 after the transfer is completed.

Figure 44C:
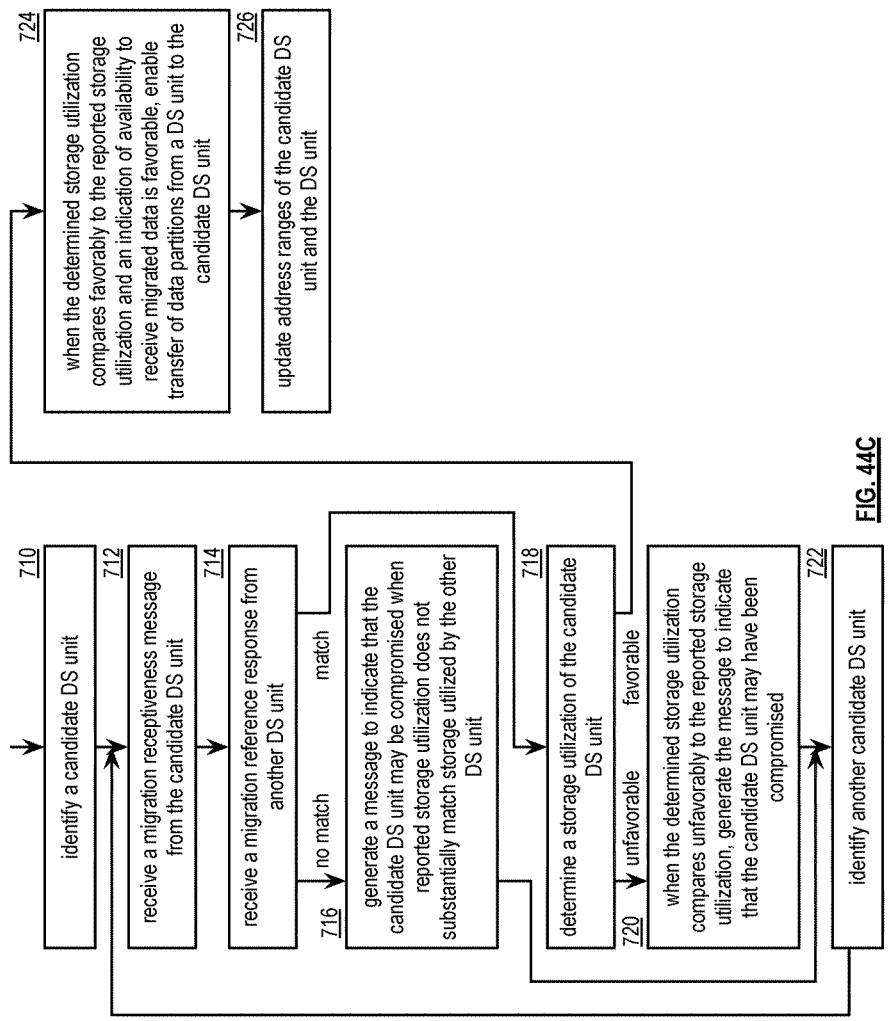
FIG. 44C is a flowchart illustrating an example of migrating slices in accordance with the present invention.

FIG. 44C is a flowchart illustrating an example of migrating slices. The method begins at step 710 where a processing module (e.g., of a dispersed storage (DS) unit) identifies a candidate DS unit of a dispersed storage network (DSN), where data objects are divided (e.g., partitioned, encoded and sliced) into data partitions in accordance with a data partitioning protocol and the data objects are stored as sets of data partitions in a set of DS units that includes the candidate DS unit. The data partitioning protocol includes a distributed storage error encoding function. The data objects are encoded in accordance with the distributed storage error encoding function to produce sets of encoded data slices, where, from set to set, size of the encoded data slices is substantially the same. The identifying the candidate DS unit includes identifying a storage trait of the candidate DS unit that is also a storage trait of the DS unit (e.g., associated with the processing module) of another set of DS units to yield a common storage trait, where the common storage trait includes one or more of a common site identifier, a common pillar number in a dispersed storage error encoding system, a reliability requirement of the DSN, access availability, and access speed.

The method continues at step 712 where the processing module, in response to a data migration request, receives a migration receptiveness message from the candidate DS unit. For example, the processing module generates the migration request, outputs the migration request to the candidate DS unit, and receives the migration receptiveness message from the candidate DS unit. The migration receptiveness message includes an indication of availability to receive migrated data and a reported storage utilization for storing a first sub-set of data partitions of the sets of data partitions.

The method continues at step 714 where the processing module, in response to a data migration reference message, receives, from another DS unit of the set of DS units, a migration reference response that includes an indication of storage utilized by the other DS unit for storing a second sub-set of data partitions of the sets of data partitions. For example, the processing module generates the migration reference message, outputs the migration reference message to the other DS unit, and receives the migration reference response from the other DS unit. Alternatively, the processing module receives, from multiple DS units of the set of DS units, multiple migration reference responses (e.g., with regards to one or more data migration reference messages). The method branches to step 718 when the reported storage utilization substantially match the storage utilized by the other DS unit. The method continues to step 716 when the reported storage utilization does not substantially match the storage utilized by the other DS unit. The method continues at step 716 where the processing module generates a message indicating that the candidate DS unit may be compromised when the reported storage utilization does not substantially match the storage utilized by the other DS unit. The method branches to step 722.

The method continues at step 718 where the processing module determines a storage utilization of the candidate DS unit for storing the first sub-set of data partitions based on the migration reference response and the data partitioning protocol. The determining the storage utilization of the candidate DS unit includes determining a storage utilization ratio between the candidate DS unit and the other DS unit based on the data partitioning protocol and multiplying the storage utilization ratio by the storage utilized by the other DS unit to determine the storage utilization by the candidate DS unit.

Alternatively, at step 718, when receiving multiple migration reference responses, the processing module determines the storage utilization of the candidate DS unit for storing the first sub-set of data partitions based on the migration reference response, the multiple migration reference responses, and the data partitioning protocol. When receiving multiple migration reference responses, the determining includes a series of steps. A first step includes, for each of the multiple DS units and the other DS unit, determining a storage utilization ratio between the candidate DS unit and the other DS unit based on the data partitioning protocol to produce multiple storage utilization ratios. A second step includes, for each of the multiple storage utilization ratios, multiplying the storage utilization ratio by the storage utilized by a corresponding one of the multiple DS units and the other DS unit to determine multiple storage utilizations by the candidate DS unit. When the multiple storage utilizations substantially match, a third step includes selecting one of the multiple storage utilizations as the determined storage utilization. When the multiple storage utilizations do not substantially match, the third step includes determining that the determined storage utilization compares unfavorably to the reported storage utilization. The method branches to step 724 when the determined storage utilization compares favorably to the reported storage utilization. The method continues to step 720 when the determined storage utilization compares unfavorably to the reported storage utilization.

When the determined storage utilization compares unfavorably to the reported storage utilization, the method continues at step 720 where the processing module generates the message indicating that the candidate DS unit may have been compromised. The method continues at step 722 where the processing module identifies another candidate DS unit from yet another set of DS units. The method branches to step 712 to process the method for the other candidate DS unit.

When the determined storage utilization compares favorably to the reported storage utilization and the indication of availability to receive migrated data is favorable, the method continues at step 724 where the processing module enables transfer of data partitions of other data objects from a DS unit of another set of DS units to the candidate DS unit. The determining that the indication of availability to receive migrated data is favorable includes a series of steps. A first step includes ascertaining storage capabilities of the candidate DS unit. A second step includes determining other storage obligations of the candidate DS unit. A third step includes determining available storage of the candidate DS unit based on the storage capabilities, the other storage obligations, and the reported storage utilization. When the available storage compares favorably to a storage availability threshold, a fourth step includes determining that the indication of availability to receive migrated data is favorable. The method continues at step 726 where the processing module updates address ranges of the candidate DS unit and the DS unit of the other set of DS units after the transfer is completed. For example, the processing module associates DSN address ranges associated with the transferred data partitions with the candidate DS unit and disassociates the DSN address ranges with the DS unit.

Figure 45:
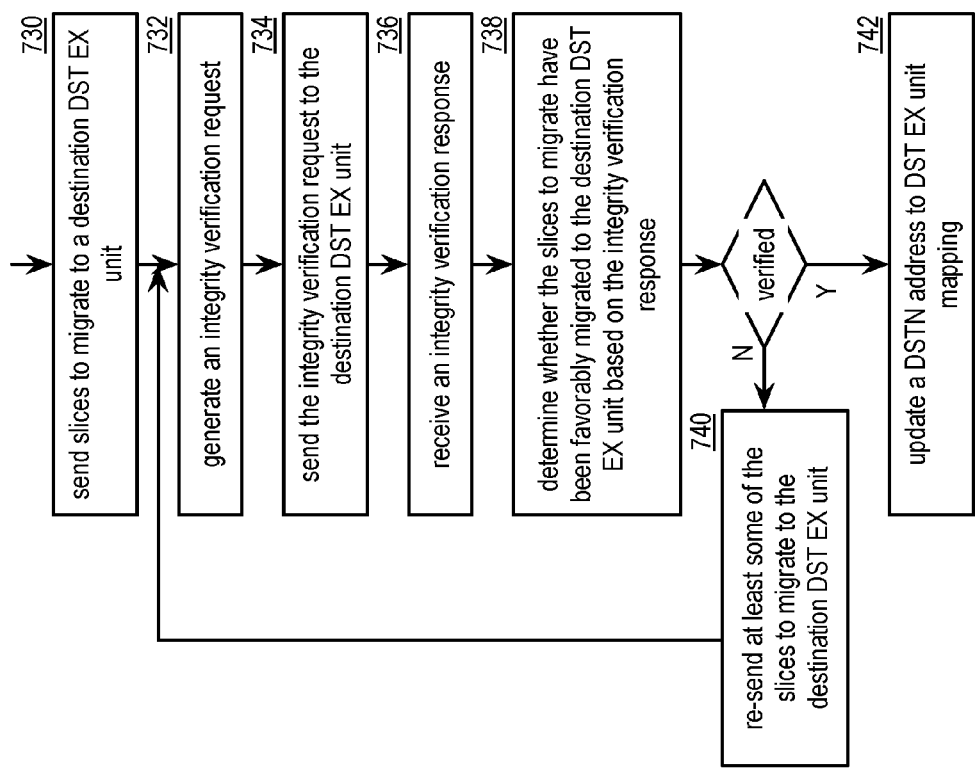
FIG. 45 is a flowchart illustrating an example of verifying the migration of slices in accordance with the present invention.

FIG. 45 is a flowchart illustrating an example of verifying migration of slices. The method begins with step 730 where a processing module (e.g., of a distributed storage and task (DST) execution unit) sends slices to migrate to a destination DST execution unit. The sending may include one or more of determining to send the slices to migrate, selecting the destination DST execution unit, selecting the slices to migrate, identifying slice names associated with the slice to migrate, retrieving the slices to migrate, generating write slice requests that includes the slices to migrate and the slice names associated with the slices to migrate, and outputting the write slice requests to the destination DST execution unit.

The method continues at step 732 where the processing module generates an integrity verification request. The request includes one or more of slice names corresponding to slices to migrate that have not been verified, an integrity verification method indicator, a slice portion indicator, and a nonce. The integrity verification method indicator includes an indicator to indicate which of a plurality of integrity verification methods to utilize to verify the slices to migrate. The integrity verification methods include one or more of providing a cyclic redundancy check (CRC) of one or more of the slices to migrate, providing a result of performing a hashing function on the one or more the slices to migrate, providing a hash based message authentication code (HMAC) for the one or more slices to migrate, providing a signature, and an instruction involving the nonce.

The method continues at step 734 where the processing module sends the integrity verification request to the destination DST execution unit. The method continues at step 736 where the processing module receives an integrity verification response to produce a received integrity verification response. For example, the processing module receives an integrity verification response that includes a hash value of a slice of the slices to migrate and the nonce when a corresponding integrity verification request indicated to provide performed a hashing function on the slice and the instruction involving the nonce indicates to include the nonce with the slice to perform the hash function.

The method continues at step 738 where the processing module determines whether the slices to migrate have been favorably migrated to the destination DST execution unit based on the integrity verification response. The verifying includes generating a local integrity verification response based on the integrity verification request, comparing the local integrity verification response to the received integrity verification response, and indicating that the migration is verified when the comparisons favorable (e.g., substantially the same). For example, the processing module performs the hashing function on the slice of the slices to migrate and the nonce to produce the local integrity verification response, compares the local integrity verification response to the received integrity verification response, and indicates that the migration is not verified when the local integrity verification response is not substantially the same as the received integrity verification response.

The method branches to step 742 when the processing module determines that the slices to migrate have been favorably migrated to the destination DST execution unit. The method continues to step 740 when the slices to migrate have not been favorably migrated to the destination DST execution unit. The method continues at step 740 where the processing module resends at least some of the slices to migrate to the destination DST execution unit. The resending includes selecting the at least some of the slices to resend (e.g., slices not verified) as the slices to resend, retrieving the slices to resend, identifying slice names associated with the slice to resend, retrieving the slices to resend, generating write slice requests that includes the slices to resend and the slice names associated with the slices to resend, and outputting the write slice requests to the destination DST execution unit. The method loops back to step 732.

FIG. 46A is a flowchart illustrating an example of generating an authentication response. The method begins with step 744 where a processing module (e.g., of a first user device of at least two user devices) receives a request to authenticate (e.g., from a service provider). The request may include one or more of a public key element (e.g., element N) and an instruction to provide a digital signature of a variable (e.g., variable m). The method continues at step 746 where the processing module obtains a first password. The obtaining includes at least one of outputting a user prompt, receiving a user input, a query, receiving the password, and a lookup. For example, the processing module outputs the user prompt and receives a user input that includes an eight digit alphanumeric password as the first password.

The method continues at step 748 where the processing module retrieves a first portion of a key based on the first password. The retrieving includes at least one of a lookup utilizing the first password is an index and retrieving the first portion of the key from a distributed key storage system utilizing the first password. The retrieving the first portion of the key from the distributing key storage system utilizing the first password includes one or more of generating a set of blinded passwords based on the first password and a set of random numbers, sending the set of blinded passwords to a set of authentication servers of the distributed key storage system, receiving a set of passkeys from the set of authentication servers, generating a set of keys based on the set of passkeys and the set of random numbers, retrieving a set of encrypted first portion key slices from the set of authentication servers, decrypting the set of encrypted first portion key slices utilizing the set of keys to produce a set of first portion key slices, dispersed storage error decoding the set of first portion key slices to reproduce the first portion of the key (e.g., as x).

The method continues at step 750 where the processing module obtains a factor of a second portion of the key. The obtaining includes generating a factor of a second portion of the key request that includes the variable m, identifying a second user device (e.g., based on a lookup, a list, a query, an affiliation), sending the factor of a second portion of the key request to the second user device, receiving a response from the second user device that includes the factor of a second portion of the key. The second user device may generate the factor of a second portion of the key utilizing an expression of factor=$m^y$. The method of operation of the second user device is discussed in greater detail with reference to FIG. 46B.

The method continues at step 752 where the processing module generates a signature utilizing the first portion of the key and the factor of the second portion of the key. For example the processing module generates a signature utilizing an expression signature (e.g., S)=($m^x * m^y$) mod N. The method continues at step 754 where the processing module generates an authentication response that includes the signature. The method continues at step 756 where the processing module sends the authentication response to a requesting entity (e.g., to a service provider).

FIG. 46B is a flowchart illustrating an example of generating key information. The method begins with step 758 where a processing module (e.g., of a second user device of at least two user devices referenced by the discussion of FIG. 46A) receives a factor of a second portion of a key request (e.g., from a first user device). The method continues at step 760 where the processing module obtains a second password. The obtaining includes at least one of outputting a user prompt, receiving a user input, a query, receiving the password, and a lookup. For example, the processing module outputs the user prompt and receives a user input that includes a fingerprint pattern as the second password.

The method continues at step 762 where the processing module retrieves a second portion of a key based on the second password. The retrieving includes at least one of a lookup utilizing the second password is an index and retrieving the second portion of the key from a distributed key storage system utilizing the second password. The retrieving the second portion of the key from the distributing key storage system utilizing the second password includes one or more of generating a set of blinded passwords based on the second password and a set of random numbers, sending the set of blinded passwords to a set of authentication servers of the distributed key storage system, receiving a set of passkeys from the set of authentication servers, generating a set of keys based on the set of passkeys and the set of random numbers, retrieving a set of encrypted second portion key slices from the set of authentication servers, decrypting the set of encrypted second portion key slices utilizing the set of keys to produce a set of second portion key slices, dispersed storage error decoding the set of second portion key slices to reproduce the second portion of the key (e.g., as y).

The method continues at step 764 where the processing module generates the factor of the second portion of the key based on the second portion of the key and a variable m of the request. The processing module generates the factor of the second portion of the key in accordance with an expression of factor=$m^y$. The method continues at step 766 where the processing module generates a factor of the second portion of the key response that includes the factor of the second portion of the key. The method continues at step 768 where the processing module sends the factor of the second portion of the key response to a requesting entity (e.g., a first user device of the at least two user devices). Alternatively, or in addition to, the processing module sends the response to a service provider.

The service provider may include a server that is operable to receive one or more of the factor of the second portion of the key, a factor of a first portion of the key, a signature utilizing a first portion of the key, and the factor of the second portion of the key to verify an authentication sequence. For example, the service provider may verify the signature by calculating a reproduced variable m' in accordance with an expression $m'=S^e \bmod N$, wherein e is another public key element, and comparing m' to a variable m, and indicating signature verification when the comparison indicates that m' and m are substantially the same.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A dispersed storage (DS) module comprises:
   a first module, when operable within a computing device, causes the computing device to:
      identify a candidate dispersed storage (DS) unit of a dispersed storage network (DSN), wherein data objects are divided into data partitions in accordance with a data partitioning protocol and the data objects are stored as sets of data partitions in a set of DS units that includes the candidate DS unit;
   a second module, when operable within the computing device, causes the computing device to:
      in response to a data migration request, receive a migration receptiveness message from the candidate DS unit, wherein the migration receptiveness message includes an indication of availability to receive migrated data and a reported storage utilization for storing a first sub-set of data partitions of the sets of data partitions; and
      in response to a data migration reference message, receive, from another DS unit of the set of DS units, a migration reference response that includes an indication of storage utilized by the other DS unit for storing a second sub-set of data partitions of the sets of data partitions;
   a third module, when operable within the computing device, causes the computing device to:
      determine a storage utilization of the candidate DS unit for storing the first sub-set of data partitions based on the migration reference response and the data partitioning protocol; and
   a fourth module, when operable within the computing device, causes the computing device to:
      when the determined storage utilization compares favorably to the reported storage utilization and the indication of availability to receive migrated data is favorable, enable transfer of data partitions of other data objects from a DS unit of another set of DS units to the candidate DS unit.

2. The DS module of claim 1, wherein a first module functions to identify the candidate DS unit by:
   identifying a storage trait of the candidate DS unit that is also a storage trait of the DS unit of the other set of DS units to yield a common storage trait, wherein the common storage trait includes one or more of a common site identifier, a common pillar number in a dispersed storage error encoding system, a reliability requirement of the DSN, access availability, and access speed.

3. The DS module of claim 1 further comprises:
   the data partitioning protocol includes a distributed storage error encoding function, wherein the data objects are encoded in accordance with the distributed storage error encoding function to produce sets of encoded data slices, wherein, from set to set, size of the encoded data slices is substantially the same; and
   the fourth module further functions to generate a message indicating that the candidate DS unit may be compromised when the reported storage utilization does not substantially match the storage utilized by the other DS unit.

4. The DS module of claim 1, wherein the third module functions to determine the storage utilization of the candidate DS unit by:
   determining a storage utilization ratio between the candidate DS unit and the other DS unit based on the data partitioning protocol; and
   multiplying the storage utilization ratio by the storage utilized by the other DS unit to determine the storage utilization by the candidate DS unit.

5. The DS module of claim 1 further comprises:
   the second module further functions to receive, from multiple DS units of the set of DS units, multiple migration reference responses; and
   the third module further functions to determine the storage utilization of the candidate DS unit for storing the first sub-set of data partitions based on the migration reference response, the multiple migration reference responses, and the data partitioning protocol.

6. The DS module of claim 5, further comprises:
   the third module further functions to determine the storage utilization of the candidate DS unit to include:
      for each of the multiple DS units and the other DS unit, determining a storage utilization ratio between the candidate DS unit and the other DS unit based on the data partitioning protocol to produce multiple storage utilization ratios;
      for each of the multiple storage utilization ratios, multiplying the storage utilization ratio by the storage utilized by a corresponding one of the multiple DS units and the other DS unit to determine multiple storage utilizations by the candidate DS unit; and
      when the multiple storage utilizations substantially match, selecting one of the multiple storage utilizations as the determined storage utilization; and
   the fourth module further functions to, when the multiple storage utilizations do not substantially match, determine that the determined storage utilization compares unfavorably to the reported storage utilization.

7. The DS module of claim 1 further comprises:
   the fourth module further functions to determine that the indication of availability to receive migrated data is favorable by:
      ascertaining storage capabilities of the candidate DS unit;

determining other storage obligations of the candidate DS unit;

determining available storage of the candidate DS unit based on the storage capabilities, the other storage obligations, and the reported storage utilization; and when the available storage compares favorably to a storage availability threshold, determining that the indication of availability to receive migrated data is favorable.

8. The DS module of claim 1 further comprises:

the fourth module further functions to update address ranges of the candidate DS unit and the DS unit of the other set of DS units after the transfer is completed.

9. The DS module of claim 1 further comprises:

the fourth module further functions to, when the determined storage utilization compares unfavorably to the reported storage utilization:

identify another candidate DS unit from yet another set of DS units; and generate a message indicating that the candidate DS unit may have been compromised.

\* \* \* \* \*